(12) United States Patent
Frouin et al.

(10) Patent No.: US 7,123,614 B2
(45) Date of Patent: Oct. 17, 2006

(54) METHOD AND DEVICE FOR COMMUNICATING BETWEEN A FIRST AND A SECOND NETWORK

(75) Inventors: Laurent Frouin, Rennes (FR); Yacine Smail El Kolli, Rennes (FR); Jean-Paul Accarie, Vern sur Seiche (FR); Falk Tannhauser, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 818 days.

(21) Appl. No.: 09/778,827

(22) Filed: Feb. 8, 2001

(65) Prior Publication Data

US 2001/0040896 A1 Nov. 15, 2001

(30) Foreign Application Priority Data

Feb. 8, 2000 (FR) .................................. 00 01553

(51) Int. Cl.
*H04L 12/28* (2006.01)
(52) U.S. Cl. ....................... 370/389; 710/305
(58) Field of Classification Search ............. 370/462, 370/465, 489, 230.1, 911, 401, 402; 710/100, 710/107, 112, 114, 116, 305
See application file for complete search history.

(56) References Cited

U.S. PATENT DOCUMENTS

| | | | |
|---|---|---|---|
| 5,748,629 A * | 5/1998 | Caldara et al. ............. 370/389 |
| 5,915,127 A * | 6/1999 | Ogawa et al. ................ 710/58 |
| 6,266,727 B1 * | 7/2001 | Smyers et al. .............. 710/105 |
| 6,363,461 B1 * | 3/2002 | Pawlowski et al. ......... 711/158 |
| 6,480,923 B1 * | 11/2002 | Moertl et al. ............... 710/305 |
| 6,584,534 B1 * | 6/2003 | Kobayashi .................. 710/305 |
| 6,631,435 B1 * | 10/2003 | Lym et al. .................. 710/305 |
| 6,717,947 B1 * | 4/2004 | Ghodrat et al. .......... 370/395.1 |
| 6,738,816 B1 * | 5/2004 | Momona .................... 709/226 |
| 2003/0115430 A1 * | 6/2003 | Stone et al. ................ 711/158 |
| 2003/0133476 A1 * | 7/2003 | Stone et al. ................ 370/537 |

FOREIGN PATENT DOCUMENTS

| | | |
|---|---|---|
| EP | 0835037 A2 | 4/1998 |
| EP | 0837579 A2 | 4/1998 |
| FR | 2780838 | 1/2000 |

OTHER PUBLICATIONS

U.S. Appl. No. 09/345,969, filed Jul. 1, 1999.

* cited by examiner

*Primary Examiner*—Wellington Chin
*Assistant Examiner*—Steven Blount
(74) *Attorney, Agent, or Firm*—Fitzpatrick, Cella, Harper & Scinto

(57) ABSTRACT

The invention relates to a method of data-packet transmission from a first network to a second network, one of the networks being a communications bus transporting data packets of isochronous and asynchronous types, characterised in that, with the other network being a packet-switching network, the said method includes, performed within a communications device connected to the communications bus and forming part of the packet-switching network, a step of reserving resources adapted to the types of data packets intended for the second network.

20 Claims, 27 Drawing Sheets

METHOD AND DEVICE FOR COMMUNICATING BETWEEN A FIRST AND A SECOND NETWORK

The present invention relates to a communications network including at least two interconnected communications buses each conveying data of isochronous and asynchronous types.

Communications networks are known which are formed from several serial communications buses in accordance with the IEEE 1394 standard.

This standard relates to high-performance serial communications buses communicating for example, data at speeds lying between 100 and 200 Mbps, or even of the order of 400 Mbps.

These buses are organised into a network; that is to say that they are linked together by interconnection equipment called "bridges".

The bridges linking serial communications buses are more particularly the subject of the standard P1394.1 which is under development.

This standard defines equipment which provides two interfaces, namely an interface between the equipment itself and a 1394 serial communications bus and an interface between this equipment and another 1394 serial communications bus.

The standard P1394.1 makes provision especially to extend the asynchronous and isochronous services already defined for a local high-performance serial communications bus to one or more further high-performance serial communications buses by way of one or more bridges.

Each serial communications bus of such a network links together various pieces of data-processing apparatus or peripherals such as, for example, printers, servers, computers, scanners, set-top boxes, television sets, video recorders, loudspeaker enclosures, digital cameras, digital photographic apparatus, camcorders, etc.

The networking of serial communications buses by way of bridges, however, runs the risk of posing serious problems for those wishing to install them and manage them, especially for individuals, who are not generally network administrators.

This is because, although the technology relating to the serial communications buses in accordance with the IEEE 1394 standard appears very promising for domestic applications, the installation, the management and the use of bridges, in contrast, appears rather complicated for an individual.

If, for example, a user wishes to link two serial communications buses together in the form of a network, one bus connecting a computer to a printer and the other linking together a television, a video recorder, a camcorder and a set-top box, he is going to have to choose a topology for the network.

The choice of this topology is based on the analysis of the user's requirements, of the performance of the various peripherals, of their location in the home, etc.

The user will therefore have to define a network topology by grouping together several pieces of data-processing apparatus or peripherals, for example, on the basis of their relationships in terms of data exchanged, and have to install a bridge providing the interface between the bus at one site rather than another so as to avoid bottlenecks and, more generally, in order to optimise the resources of the network. This will also have to be done while limiting the number of bridges and cables in order to save on the overall cost of the network.

Moreover, the 1394.b standard proposes solutions for interconnecting 1394 peripherals based on plastic or glass optical fibre. These solutions are very difficult to implement because of the fragility of the optical fibre and thus require the attention of specialists. That means that such an installation can therefore not easily be reconfigured at any instant by the user. Moreover, the use of optical fibre means that the distance between the items of equipment is reduced.

Communications networks dedicated to mass-market applications are furthermore known, from the document U.S. Pat. No. 5,940,387. This type of network makes it possible, on the one hand, to host applications of different natures coming from external networks such as a switched network, for example, or else wireless satellite communications networks for conveying applications relating to television and, moreover, for connecting the pieces of equipment. In such a network the connection to the outside network is provided by an adapter. The originality of such a network rests on the fact that each receiving terminal, for example a television, can receive applications from the outside without being directly attached to a network adapter. Each terminal is linked, on the one hand, to a network adapter via Ethernet-type links and, on the other hand, to an electronic device known by the term "set-top box", which is tasked with forwarding the appropriate signal to the receiving terminal. In this type of network based on a gateway represented by the network adapter, the bottleneck problem is posed when several terminals have to access the outside network. The structure of the network does not allow an unlimited increase in the bandwidth but, in contrast, the bandwidth proves to be more and more restricted as the number of terminals increases. It therefore seems difficult, on such a network, to guarantee a sufficient quality of service to convey isochronous traffic on it.

Consequently it would be useful to be able to forward isochronous and asynchronous data from one communications bus to another communications bus, while trying to remedy at least one of the problems mentioned above.

The applicant has thus provided for two communications buses to be linked together via a packet-switching network which is able to forward, from the first bus to the second bus, data of isochronous and asynchronous types conveyed by the said first bus.

By installing a data-packet switching network which provides the interface between two communications buses conveying isochronous and asynchronous data, the topology for the communications network is therefore fixed while avoiding the drawbacks for the user relating to the choice of the topology and thus to the analysis of his requirements, to the performance of the various items of data-processing apparatus or peripherals, to their location in the home, etc.

Moreover, a switched network is relatively simple to manage, which offers an advantage for a user who is not generally a network administrator.

Moreover, in a switched network, with the propagation times being less critical than on a bus, it is possible to increase the length of the cables independently of the propagation time. This advantageously makes it possible to space the communications buses apart from one another, and hence the user can more easily than hitherto arrange peripherals connected to different buses in separate rooms of the building.

According to one characteristic, the switched network is able to reserve resources suitable for the types of data packets to be sent.

More generally, if the communications network includes several communications buses, the present invention advantageously provides for all these buses to be federated by means of a single switched network.

In order to provide for transmission of isochronous and asynchronous data from a first communications bus to a second communications bus by way of a switched network, it is necessary to provide for transmission, on the one hand, from the first bus to the switched network and, on the other hand, from the switched network to the second bus.

Hence, in a general way, in order to provide for such transmission, the present invention envisages a method of data-packet transmission from a first network to a second network, one of the networks being a communications bus conveying data packets of isochronous and asynchronous types, characterised in that, with the other network being a packet-switching network, the said method includes, performed within a communications device connected to the communications bus and forming part of the packet-switching network, a step of reserving resources adapted to the types of data packets intended for the second network.

According to another characteristic, the reserving of resources in so-called connected mode takes place at least on the second network in the case of the isochronous data packets.

Hence the packets are not blocked on the second network which does not constitute a bottleneck for the packets.

According to another aspect, the reserving of resources also concerns resources internal to the communications device.

Hence, when a packet has to be sent, the device possesses the resources necessary for handling it and, for example, a packet is therefore not overwritten by other packets.

According to another characteristic, in the case of the isochronous data packets, the reserving of resources internal to the communications device is performed on the basis of the resources reserved on the second network.

This contributes to better management of the resources and to sharing thereof between the network and the device.

According to one particular characteristic, the internal resources adapted to the isochronous packets comprise at least one memory area of a dual-port memory-storage unit.

This memory area makes it possible to apply flow control between the two networks.

According to another characteristic, the method as proposed by the invention includes a step of storage of isochronous data packets in the reserved internal resources.

By virtue of this characteristic, flow control is easier.

According to another characteristic, the method as proposed by the invention includes a step of transfer of isochronous data packets between the reserved internal resources and a means of interfacing with one of the networks.

According to another characteristic, the reserving of resources for the isochronous data packets is performed before a step of reception of the packets within the communications device.

Hence the data packets are not lost or overwritten within the communications device.

According to one characteristic specific to the asynchronous data packets, the reserving of resources relates only to the resources internal to the communications device.

According to one particular characteristic, the internal resources adapted to the asynchronous packets comprise at least one memory area of a storage means (RAM) associated with a central processing unit (CPU) internal to the communications device.

According to another characteristic, the method as proposed by the invention includes a step of storage of asynchronous data packets in the storage means (RAM).

This is because the asynchronous packets can be transferred in a more discontinuous way on the network since they have no requirements in terms of transfer time. In contrast, the receiving device has to be able to receive them when they arrive at their destination and the sending device has to be able to store them before sending them when the network is saturated.

According to yet another characteristic, the method as proposed by the invention includes a step of intermediate storage of the asynchronous data packets in a dual-port memory-storage unit.

Hence the device can commence receiving data even if the processing unit of the said device cannot process them immediately. The data are stored in the dual-port memory before being stored in the memory associated with the processing means.

According to one particular characteristic, the method as proposed by the invention includes a step of transfer of asynchronous packets between the dual-port memory-storage unit and the storage means (RAM) when the second network is a communications bus.

According to another characteristic the method includes a packet-switching step, performed within a communications device connected to the communications bus and forming part of the packet-switching network.

This offers all the advantages of packet switching, namely the possibility of conveying several packets simultaneously over different links of the network and thus a high throughput of data.

According to one particular characteristic, the packet-switching step consists in receiving a packet coming from the first network, that is to say either from the packet-switching network or from the communications bus, in analysing the header of the packet in order to ascertain its destination and in forwarding the said packet towards the said destination.

According to one particular characteristic, the method as proposed by the invention includes a step of transfer between the storage means (RAM) and the dual-port memory-storage unit when the second network is the packet-switching network.

According to one particular characteristic, the reserving of the internal resources adapted to the asynchronous packets is performed after a step of reception of an asynchronous packet.

Thus no resources are mobilised needlessly in the node.

According to one particular characteristic, the reserving of internal resources is performed packet by packet.

Thus the quantity of resources having to be available is not too high.

According to another characteristic, the resources internal to the communications device are released when the packet has been forwarded on the second network.

According to one characteristic, when the second network is the packet-switching network, the reserving of resources for the isochronous packets relates to the establishing of a connection on this network.

According to another characteristic, the resources reserved in connected mode on the second network are released when the connection is terminated.

Hence the resources internal to the device are not blocked indefinitely, nor are the resources of the switched network.

According to one characteristic, the communications bus is a serial bus which defines a cycle time as a period of time corresponding to an interval at which the isochronous data packets are transmitted in the serial bus, and the step of reserving resources is carried out in a plurality of modes, the plurality of modes including a first mode in which data storing capacity is reserved in the communications device for storing the isochronous data packets before the isochronous data packets are transmitted via the communications device, and a second mode in which data storing capacity is reserved in the communications device for storing the asynchronous data packet after the communications device receives the asynchronous data packet.

According to another characteristic, the data storing capacity reserved in the first mode is prepared for a series of the isochronous data packets transferred in a plurality of the cycle times and the data storing capacity reserved in the second mode is prepared for each asynchronous data packet.

According to one particular characteristic, the method is characterised, when the first network is the communications bus, in that it includes:
- a step of determining, within a communications device known as source connected to the communications bus and forming part of the packet-switching network, for each item of information which it has to transmit, of a path to make the said item of information follow on the said switched network,
- an information step, in the course of which the said source communications device broadcasts, intended for all the other communications devices of the network, information representative of the bandwidth necessary to carry out transmission in connected mode, and
- a step of allocating bandwidth in the course of which, on the one hand, the bandwidth which is necessary for them is allocated to the transmissions in connected mode and, on the other hand, all or part of the bandwidth available is allocated to each transmission to be made in non-connected mode.

Hence, all the communications devices of the network are immediately informed of each connection and of the resources of the network which are allocated to them.

Before transmitting a packet in non-connected mode, each of the communications devices likely to do so can verify that each of the links, or segments, of the path which this packet will follow is available for transmitting this packet. Choke points can thus be avoided.

The regulation of the load dedicated to the traffic in non-connected mode can thus be carried out as a function of the fluctuations in the traffic in connected (real-time) mode, which makes it possible continuously to optimise the use of the network and to prevent choke points.

According to another characteristic, the packet-transmission method is characterised in that, for establishing a connection, it includes:
- performed by the source communications device intended to transmit information on the said path, a step of transmitting for each communications device placed on the said path, called "intermediate" device, of information representative of the bandwidth necessary for the said connection.

By virtue of these provisions, before establishing a connection, it is verified that the network can support the potential load associated with the connection to be established. Moreover, this verification is carried out by each communications device placed on the path associated with this connection.

This taking into account of the estimated load amounts to producing an estimate of the congestion on the network.

According to another particular characteristic, the packet-transmission method is characterised in that, for each information transmission, it includes a step of flow control performed by the source communications device for the path followed by the said information.

By virtue of these provisions, the method according to the invention implements flow control at the level of the links, for connected traffic as well as for non-connected traffic, on a packet-switching network. These provisions amount to implementing detection of the congestion of the network.

According to another characteristic, the packet-transmission method is characterised in that it includes a step of information transmission taking account of several levels of priority.

According to another characteristic, the packet-transmission method is characterised in that at least one priority level is allocated to transmission in the non-connected mode.

By virtue of these provisions, all the traffic in the non-connected mode is transmitted with the same priority level, which guarantees equitable access for all the communications devices of the network.

According to another characteristic, the packet-transmission method according to the invention is characterised in that, in the course of the bandwidth allocation step, the bandwidth associated with the priority level corresponding to the non-connected mode varies as a function of a duration not having given rise to any transmission.

The method according to the invention thus makes it possible to increase the bandwidth allocated to transmissions in the non-connected mode, when the duration not having given rise to any transmission increases, which is a sign of an absence of congestion on the network.

According to a second aspect, the invention relates to a method of transmitting data packets of isochronous and asynchronous types between two interconnected communications buses, characterised in that the said buses are interconnected by a packet-switching network, the said method including a step of reserving resources on the packet-switching network adapted to the types of packets originating from a first bus and intended for the second bus.

According to one characteristic, the method includes a step of reserving resources on the second bus adapted to the types of packets originating from the first bus and intended for the said second bus.

According to another characteristic, the step of reserving resources adapted to the isochronous packets on the packet-switching network is performed more particularly:
- within a communications device known as source device connected to the first bus and forming part of the packet-switching network,
- within a communications device known as destination communications device connected to the second bus and forming part of the packet-switching network,
- on the packet-switching network between the said source and destination devices.

According to one particular characteristic, the method includes:
- a step of determining, within a communications device known as source device connected to the first communications bus and forming part of the packet-switching network, for each item of information which it has to transmit, of a path to make the said information follow on the said switched network,
- for the said source communications device which has to transmit in connected mode, an information step in the course of which the said communications device broadcasts, to all the other communications devices of the network, information representing the bandwidth necessary for the said transmission in connected mode, and a step of allocating bandwidth in the course of which, on the one hand, the bandwidth which they need is allocated to the transmissions in connected mode and, on the other hand all or part of the bandwidth available is allocated to each transmission to be made in the non-connected mode.

According to another characteristic, for establishing a connection, the method includes:

performed by the source communications device intended for transmitting the information on the said path, a step of transmitting for each communications device placed on the said path, called "intermediate" device, of information representative of the bandwidth necessary for the said connection, and performed by each intermediate communications device on the said path, an step of determining the availability of the link leading to the next communications device on the said path and, in the event of unavailability, an step of transmitting to the source communications device of information representing the unavailability of the said path.

According to yet further characteristics:

the method includes, for each information transmission, a step of flow control performed by each of the intermediate communications devices on the path followed by the said information.

in the course of the bandwidth-allocation step, the bandwidth associated with the level of priority corresponding to the non-connected mode varies as a function of a duration not having given rise to any transmission.

According to one characteristic, the two communications buses are the same type of serial buses each of which defines a cycle time as a period of time corresponding to an interval at which the isochronous data packets are transmitted in the serial buses, and the step of reserving resources is carried out in a plurality of modes, the plurality of modes including a first mode in which data storing capacity is reserved in the packet switching network for storing the isochronous data packets before the isochronous data packets are received by the packet switching network and a second mode in which data storing capacity is reserved in the packet switching network for storing the asynchronous data packet after the packet switching network receives the asynchronous data packet.

According to another characteristic, the data storing capacity reserved in the first mode is prepared for a series of the isochronous data packets transferred in a plurality of the cycle times and the data storing capacity reserved in the second mode is prepared for each asynchronous data packet.

The novel communications bus network structure mentioned above is obtained on the basis of novel intermediate structural elements which are communications devices also forming part of the present invention for which protection is sought.

Hence, according to a third aspect, the invention relates to a communications device providing for data packets to be transmitted from a first network to a second network, one of the networks being a communications bus conveying data packets of isochronous and asynchronous types, characterised in that the device, being connected to the said bus and forming part of a packet-switching network constituting the other network, includes means for reserving resources adapted to the types of data packets intended for the second network.

The communications device according to the invention is therefore configured to receive the two types of data conveyed by a communications bus and to transmit them on the switched network in a way which is adapted to each type of data and conversely.

Hence the transmission of isochronous data involves prior intervention by means for reserving resources in the second network (switched network or bus), whereas the transmission of asynchronous data does not require resources to be reserved in the second network.

Such resources particularly comprise the bandwidth necessary for the transmission as well as the virtual channel number used and, in general, the establishment of a connection when the second network is the switched network.

The device according to the invention is able to transmit, on the switched network, isochronous and asynchronous data originating either from the device itself or from other communications devices of the switched network.

The device according to the invention is also able to transmit on the bus isochronous and asynchronous data originating from the device itself.

According to one characteristic, the communications bus is a serial bus which defines a cycle time as a period of time corresponding to an interval at which the isochronous data packets are transmitted in the serial bus, and the means for reserving resources has a plurality of modes, the plurality of modes including a first mode in which data storing capacity is reserved in the communications device for storing the isochronous data packets before the isochronous data packets are received by the communications device and a second mode in which data storing capacity is reserved in the communications device for storing the asynchronous data packet after the packet switching network receives the asynchronous data packet.

According to another characteristic, the data storing capacity reserved in the first mode is prepared for a series of the isochronous data packets transferred in a plurality of the cycle times and the data storing capacity reserved in the second mode is prepared for each asynchronous packet.

According to a fourth aspect, the invention envisages a data-processing apparatus, characterised in that it is suitable for implementing a method as described in the invention.

According to another aspect, the invention envisages a data-processing apparatus associated with a communications device such as briefly described above.

The apparatus can process image data to be transmitted through the communications device and/or process image data received from this device.

According to another aspect, the invention also envisages a communications network including devices suitable for implementing a method according to the invention.

The invention further relates to a communications network including at least two interconnected communications buses each conveying data of isochronous and asynchronous types, characterised in that the said network includes a packet-switching network including at least one device such as briefly set out above and which is connected to one of the buses constituting a network.

According to one characteristic, the packet-switching network includes at least one communications device such as briefly set out above and which is connected to the other bus also constituting a network.

According to another characteristic, the communications network includes at least one data-processing apparatus in accordance with the preceding brief explanation, and which is connected to one of the buses constituting a network.

According to another characteristic, the communications buses are the same type of serial buses each of which defines a cycle time as a period of time corresponding to an interval at which the isochronous data packets are transmitted.

According to yet another characteristic, the packet switching network includes means for reserving memory areas therein, the reserving means having a plurality of modes which includes a first mode in which data storing capacity is reserved for storing the isochronous data packets before the isochronous data packets are received by the packet switching network and a second mode in which data storing capacity is reserved for storing the asynchronous data packet after the packet switching network receives the asynchronous data packet.

According to a further characteristic, the data storing capacity reserved in the first mode is prepared for a series of the isochronous data packets transferred in a plurality of the cycle times and the data storing capacity reserved in the second mode is prepared for each asynchronous packet.

The invention moreover envisages an information-storage means, possibly completely or partially removable, which can be read by a computer or a processor containing instructions of the computer program, characterised in that it allows implementation of the method such as briefly set out above.

The invention further envisages an information-storage means, which can be read by a computer or a processor containing data originating from the implementation of the methods briefly set out above.

The invention moreover envisages a computer program loadable into a programmable device, including sequences of instructions for implementing the steps of the method according to the invention in accordance with the foregoing, when said program is run on the programmable device.

The advantages relating to the communications device, to the data-processing apparatus, to the communications network including the device, to the communications network including a data-processing apparatus as well as to the information-storage means and to the computer program being the same as those set out above relating to the method, they are not reiterated here.

Other characteristics and advantages will emerge in the course of the description which will follow, given solely by way of non-limiting example and by reference to the attached drawings, in which:

FIG. 4 is the diagram of the software architecture implemented within the communications device 90 of FIG. 3a;

Figure 3A:
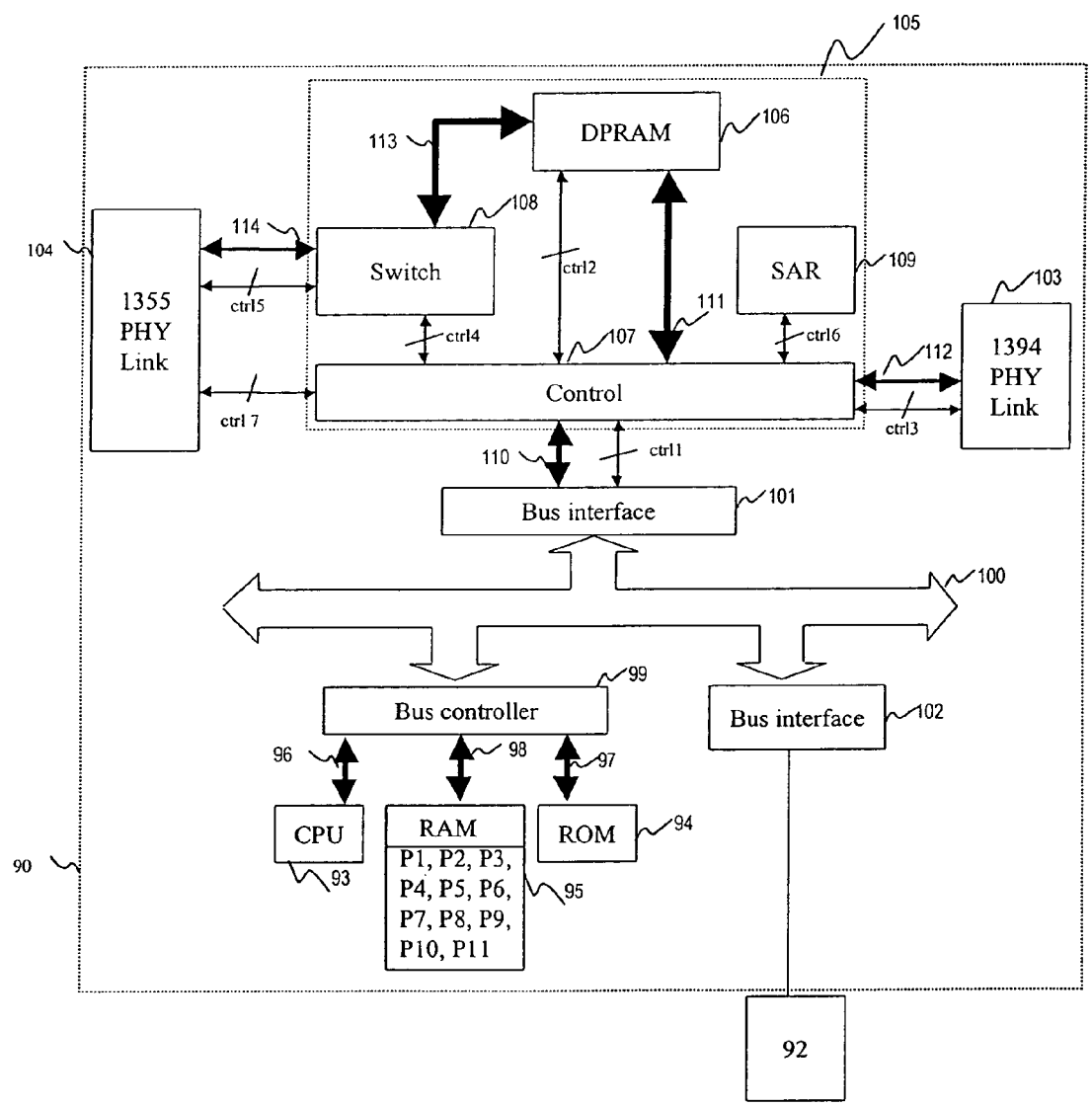
FIG. 3a is the diagram of a communications device according to the invention.
Figure 4:
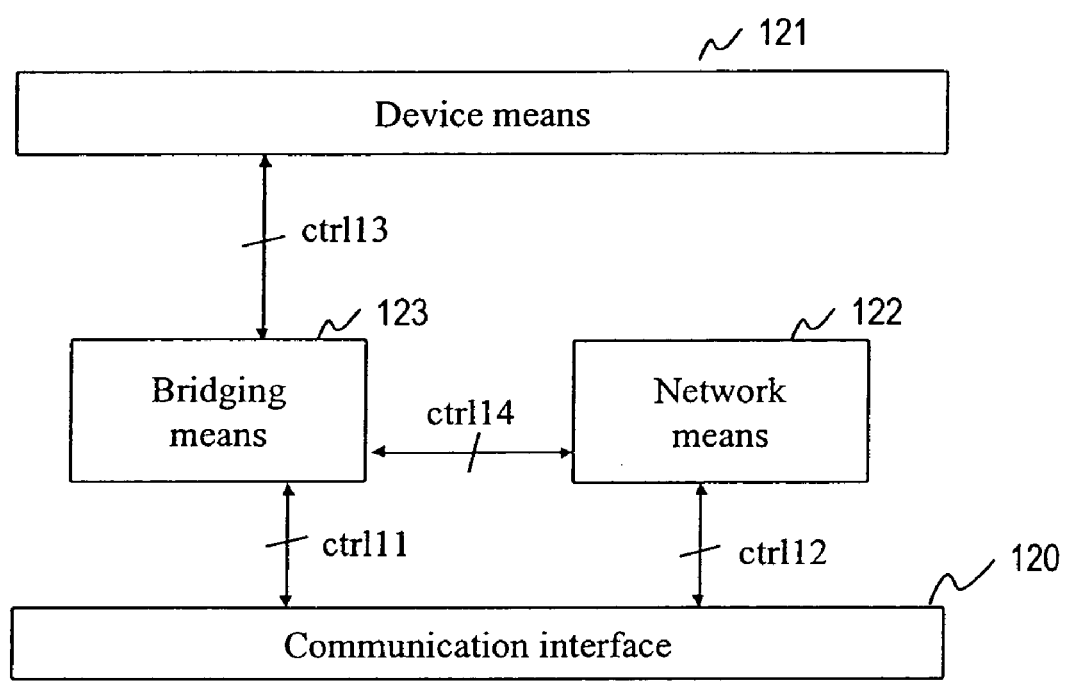
Figure 5:
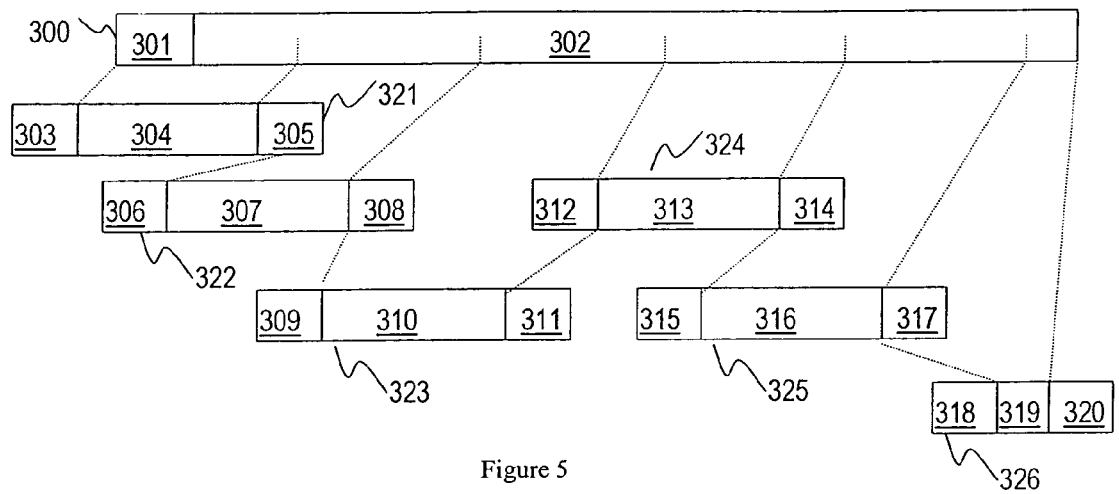
Figure 6:
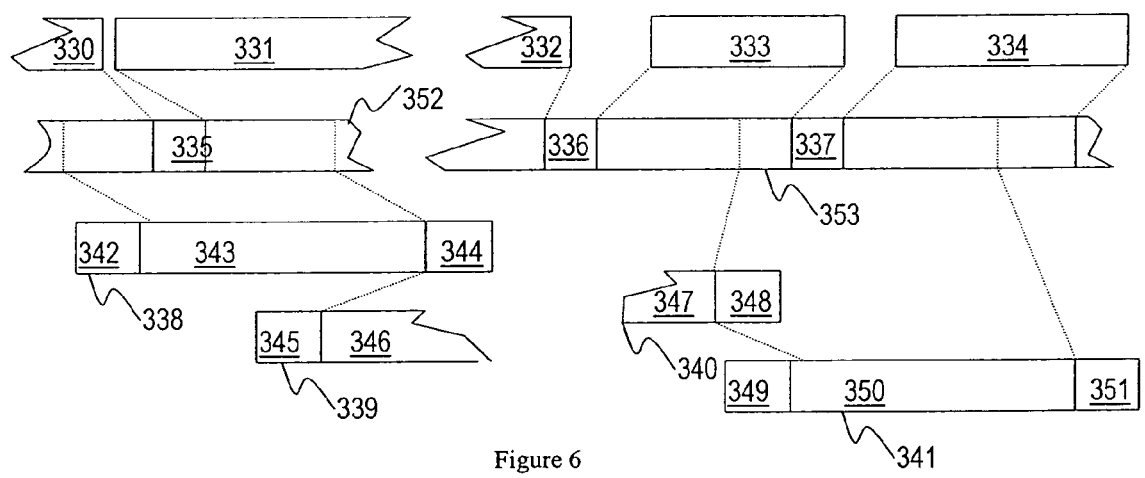
Figure 7:
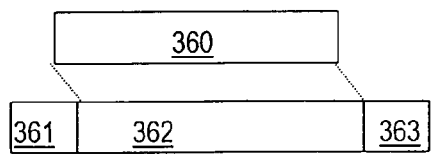
Figure 8A:
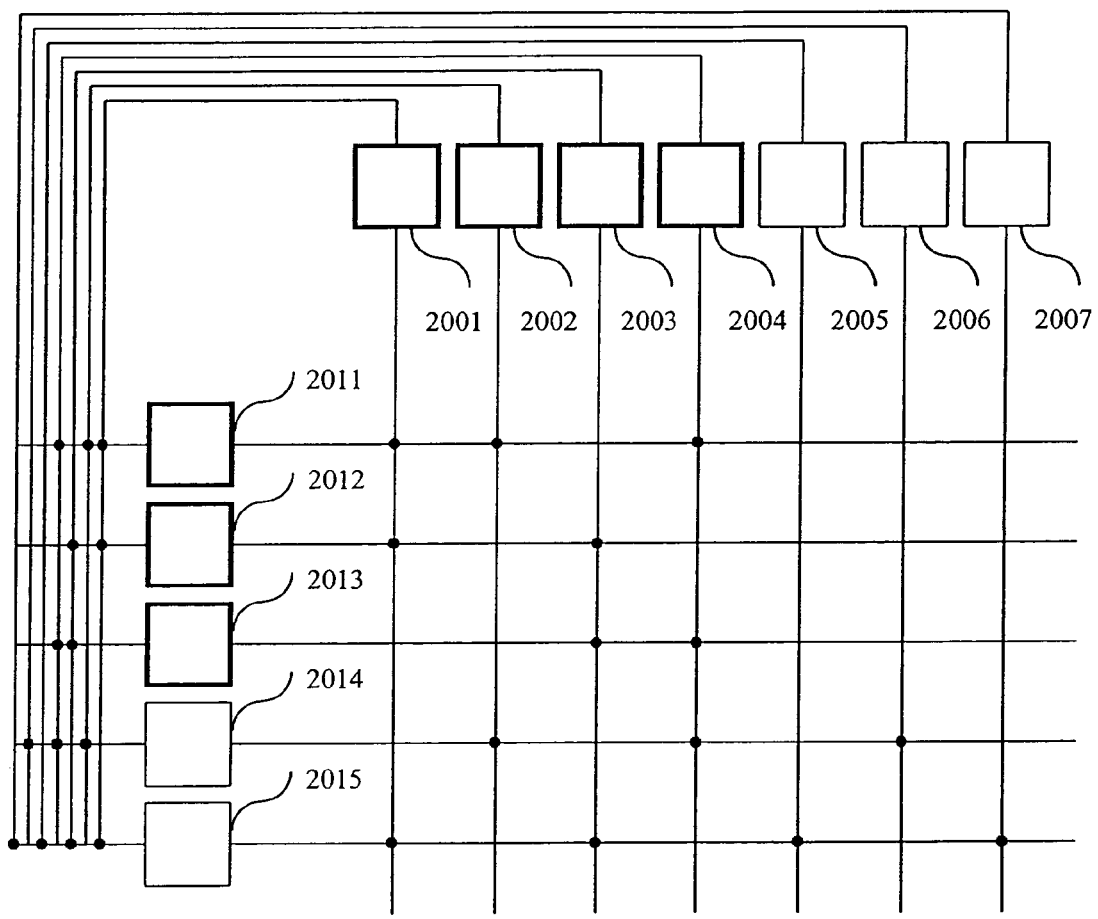
Figure 8B:
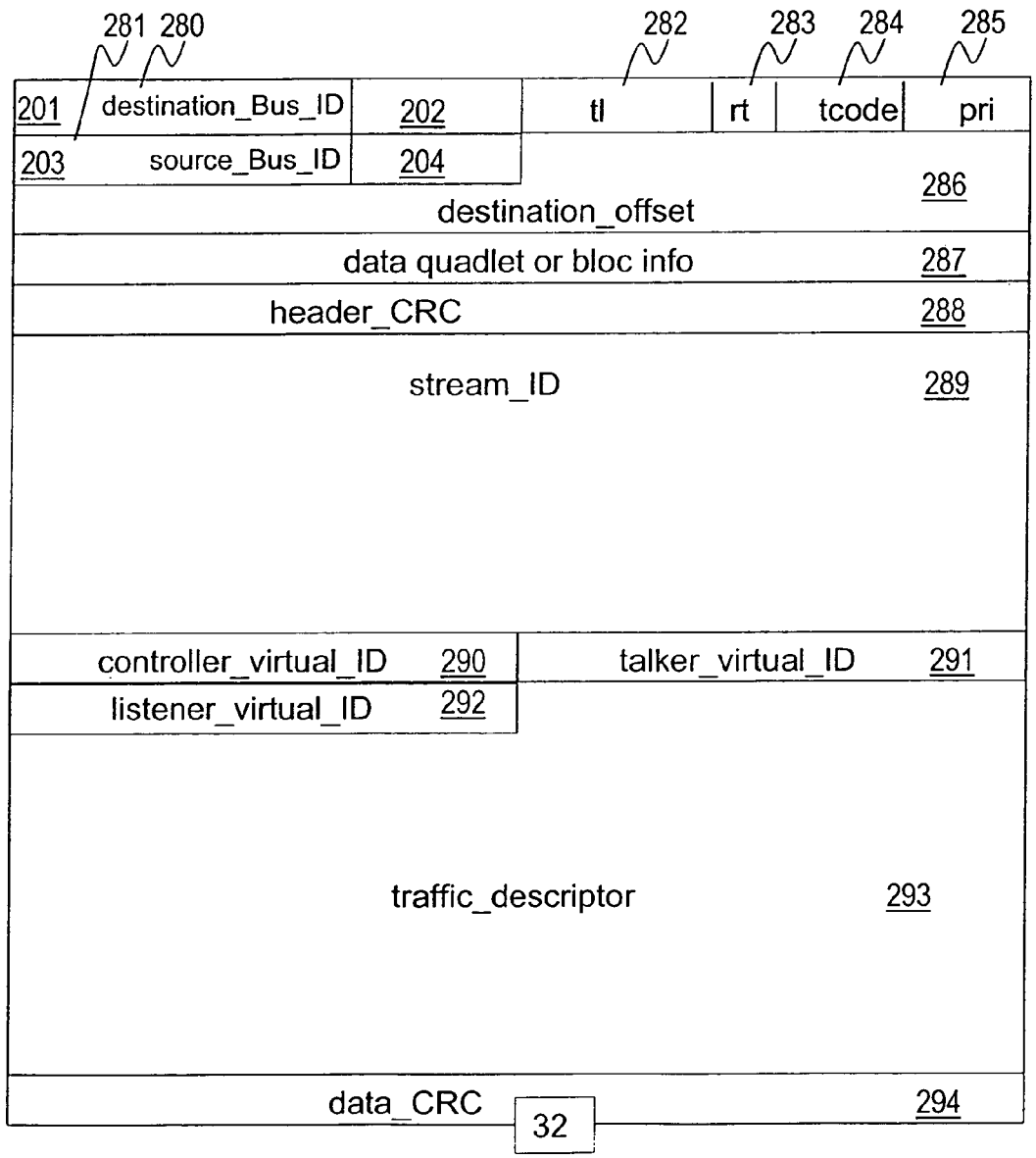
Figure 9A:
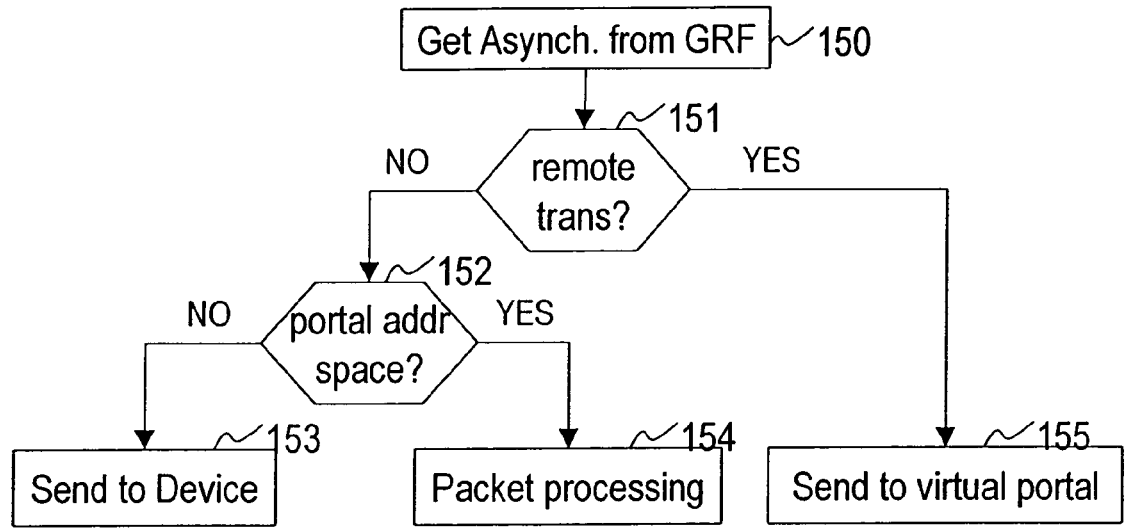
Figure 9B:
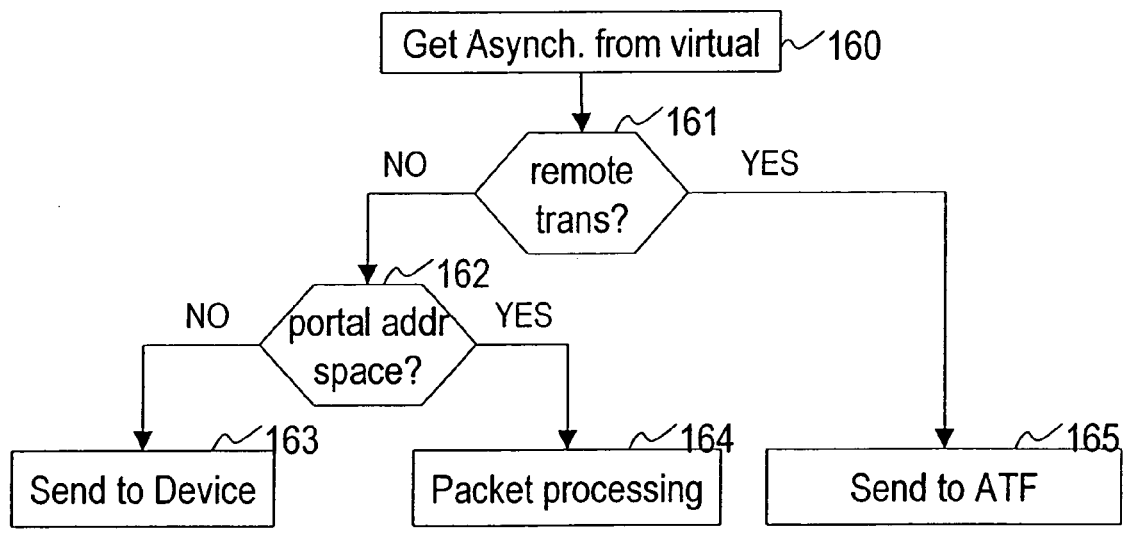
Figure 9C:
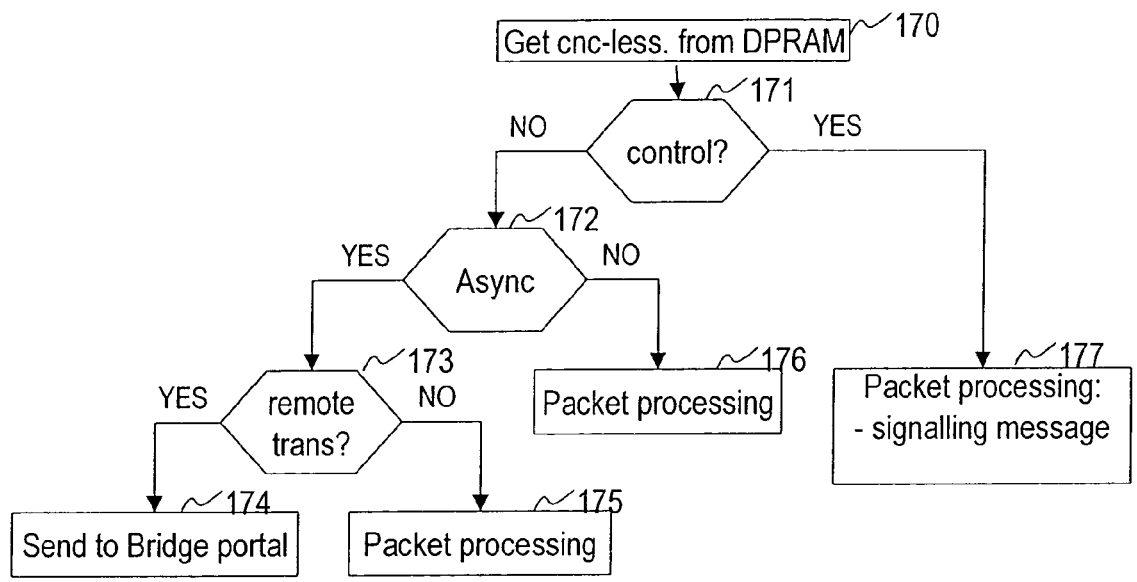
Figure 9D:
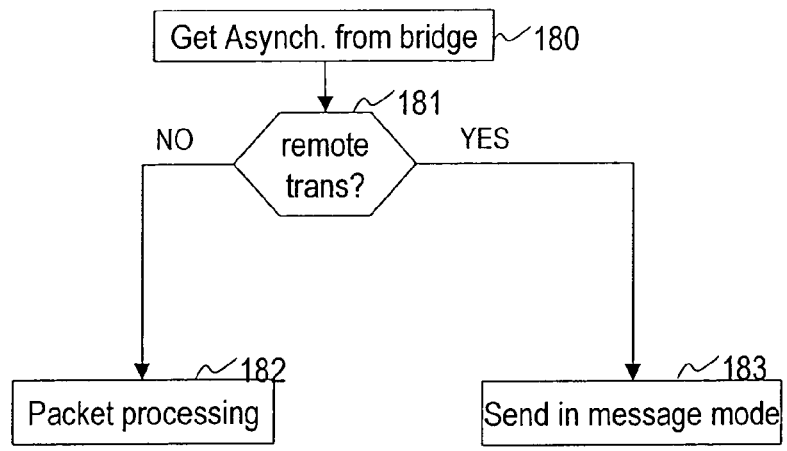
Figure 10:
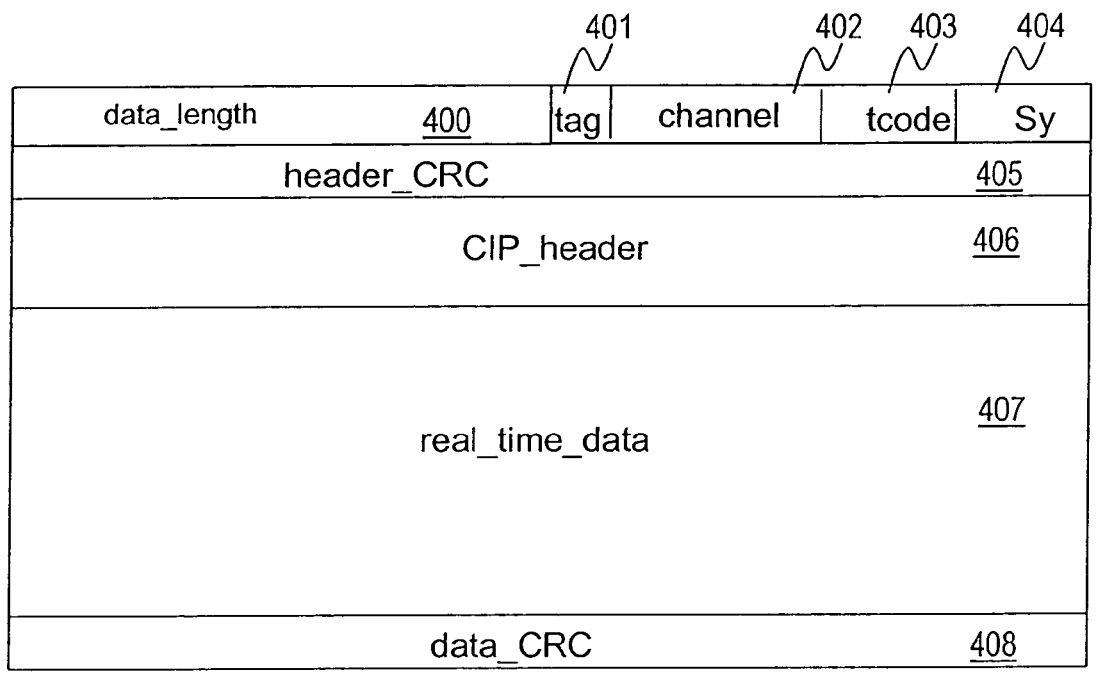
Figure 11:
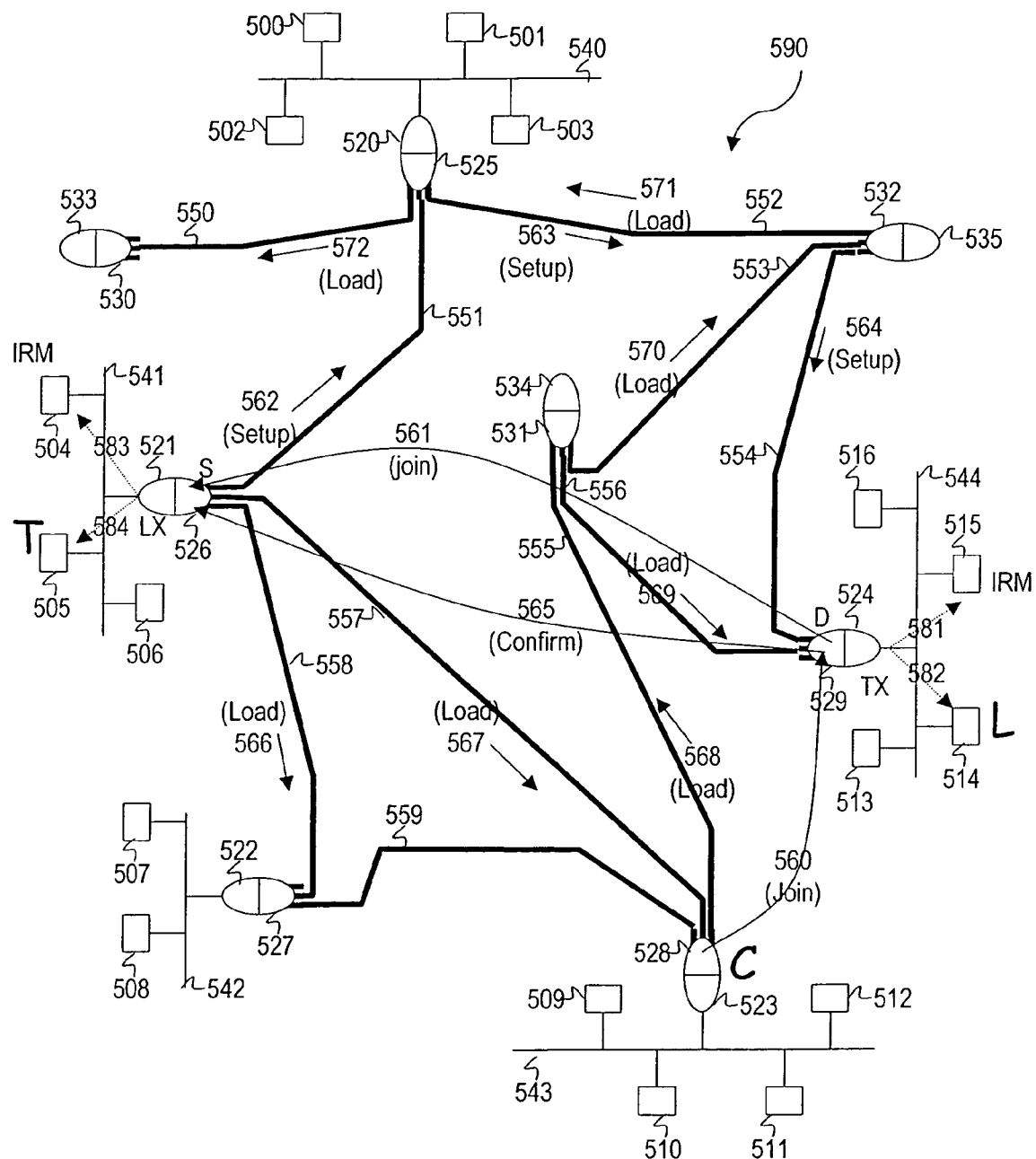
Figure 12:
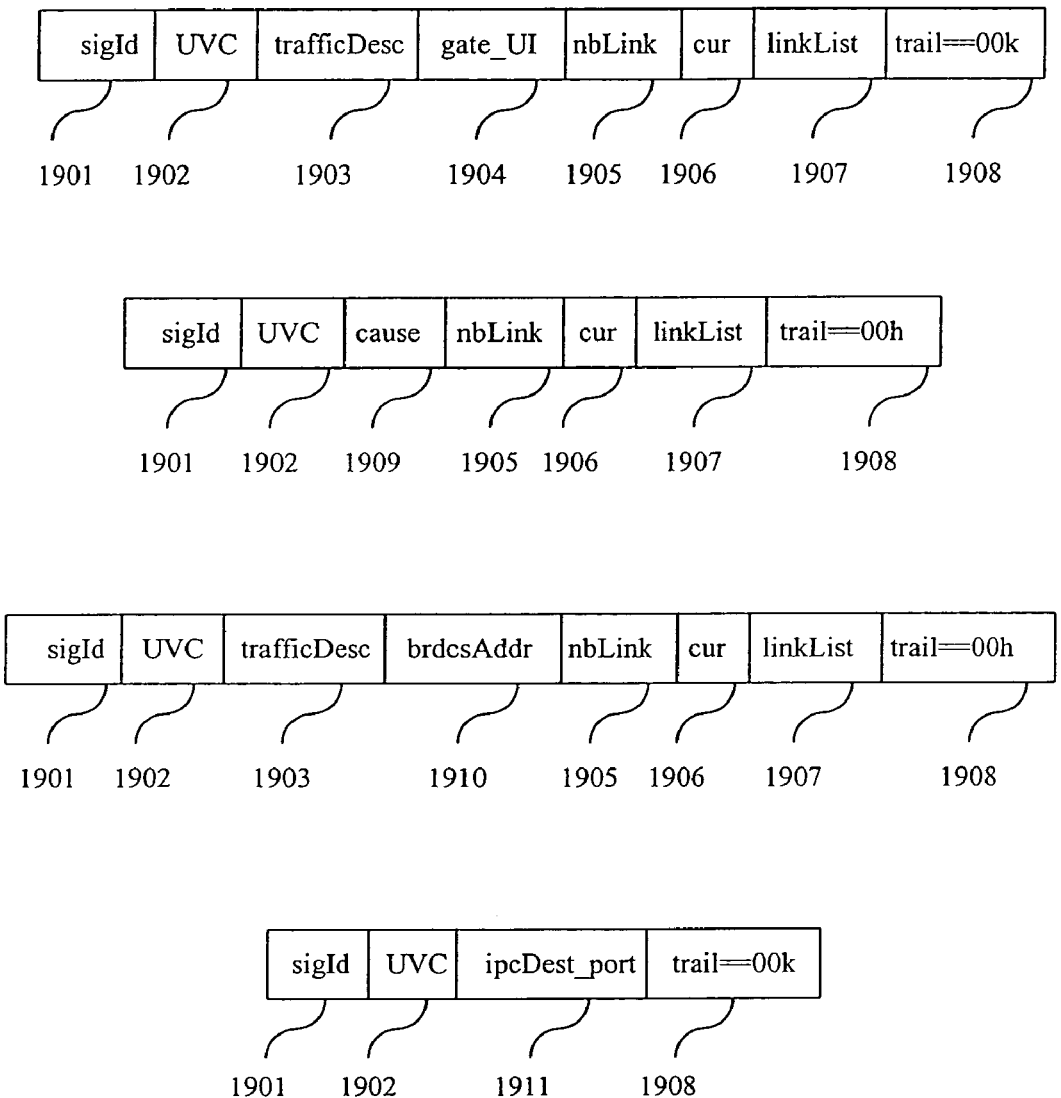
Figure 17:
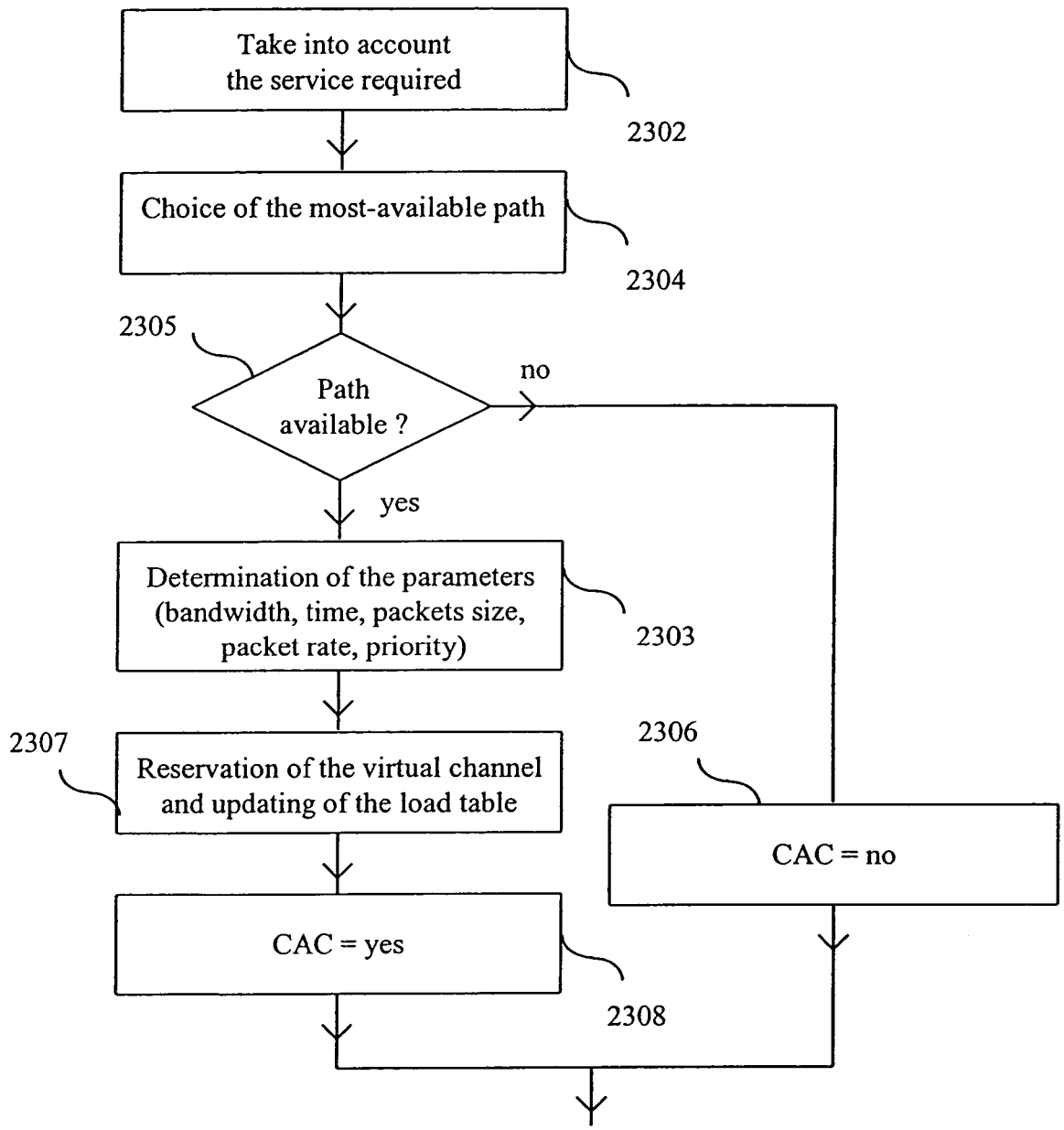
Figure 18:
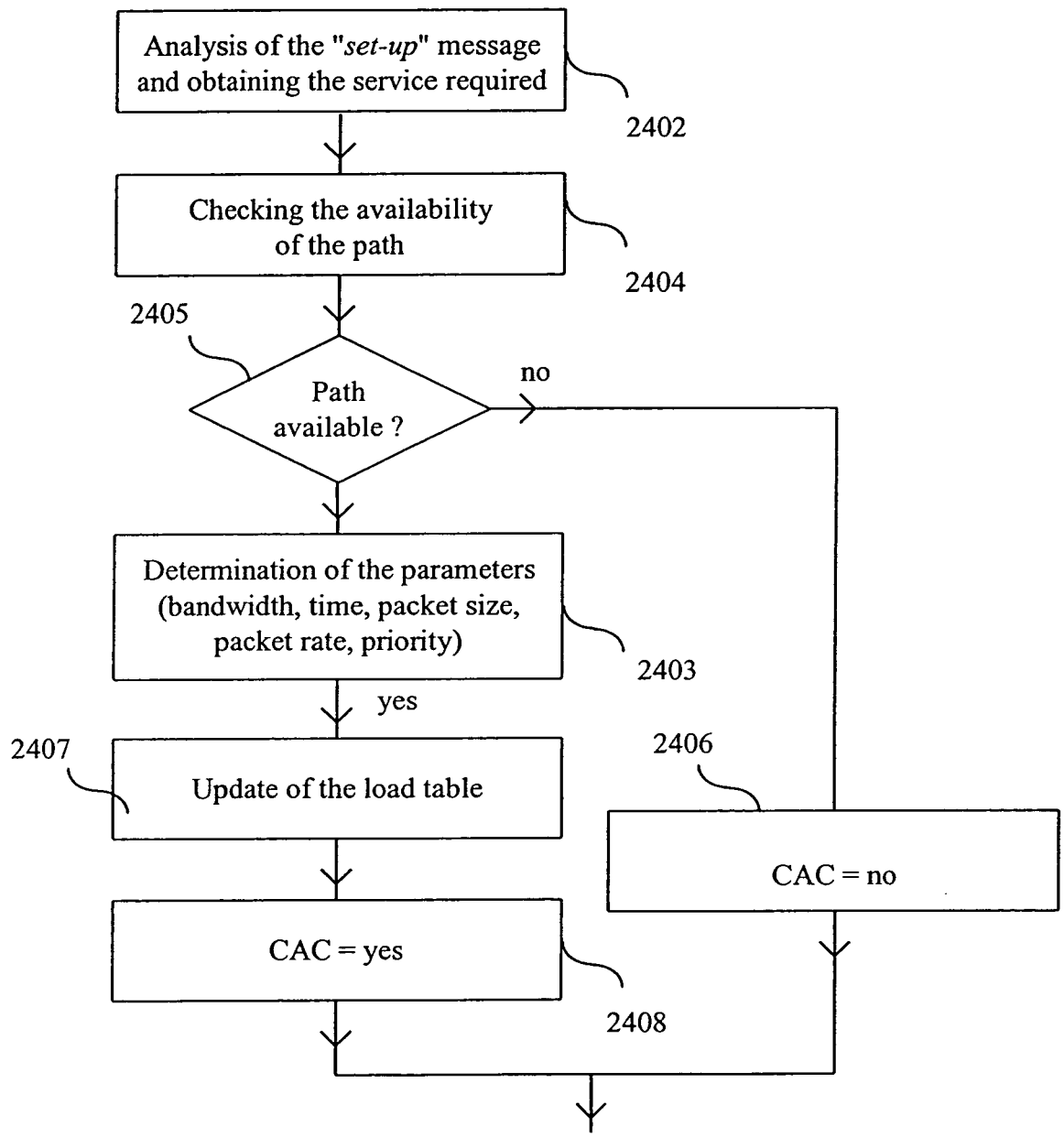
Figure 19:
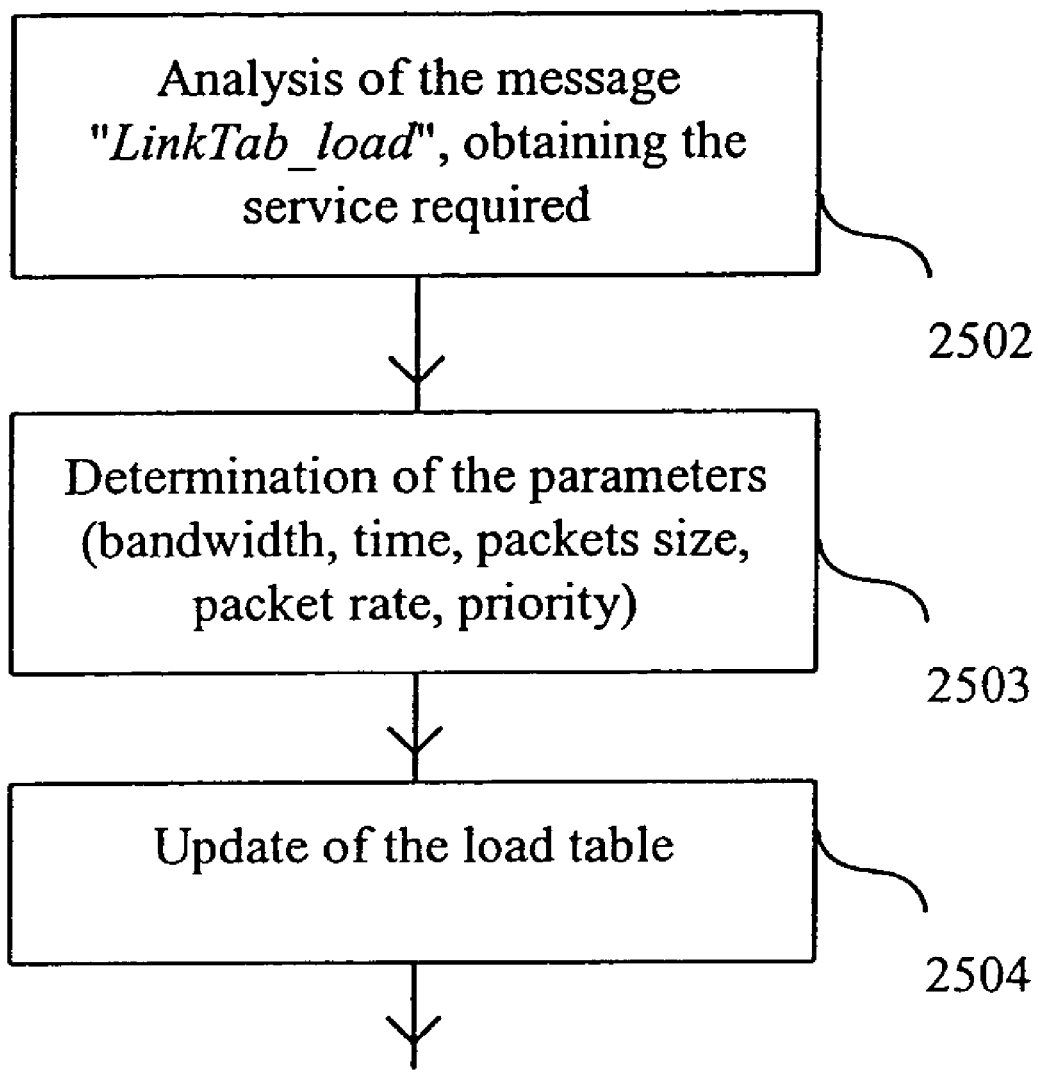
Figure 20:
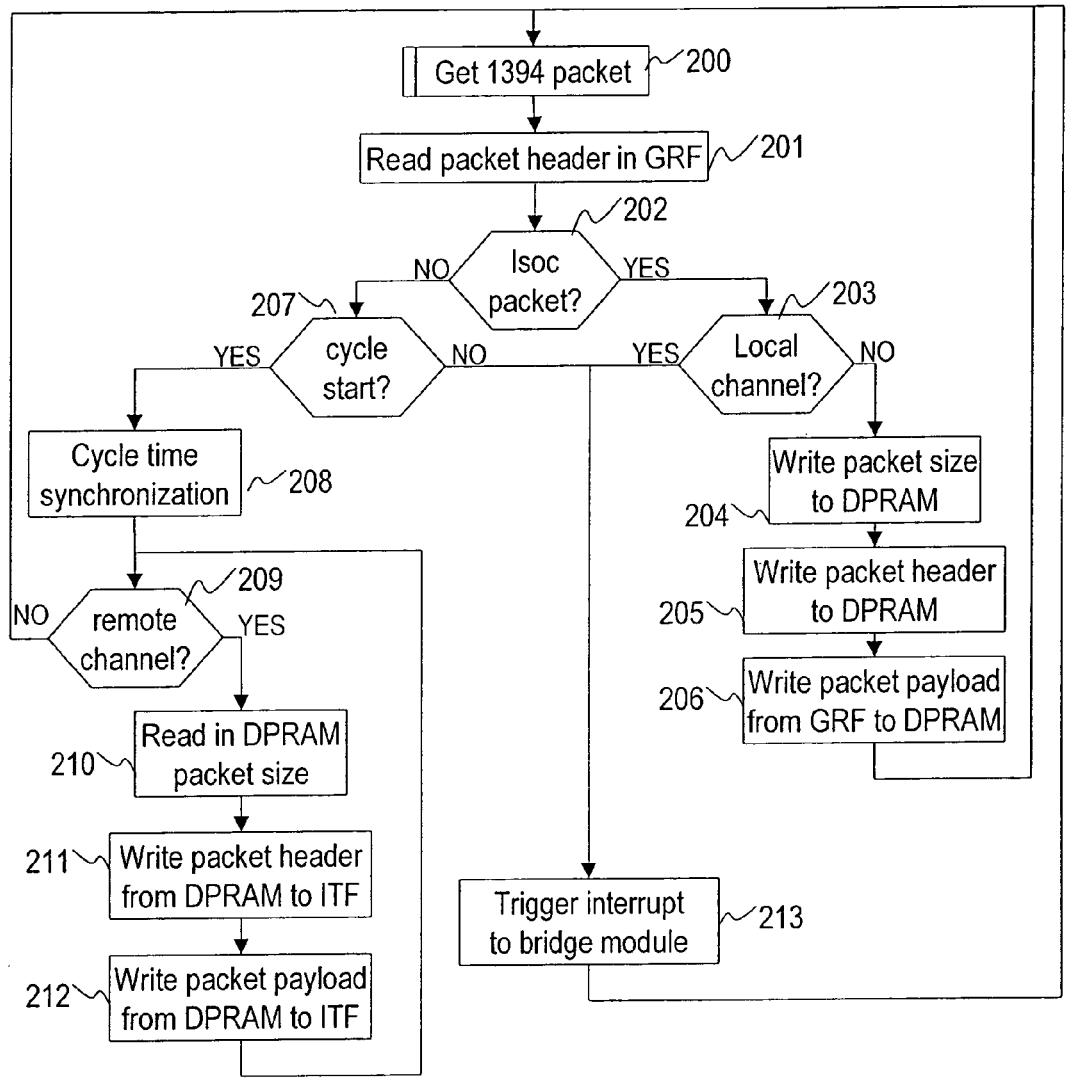
Figure 21:
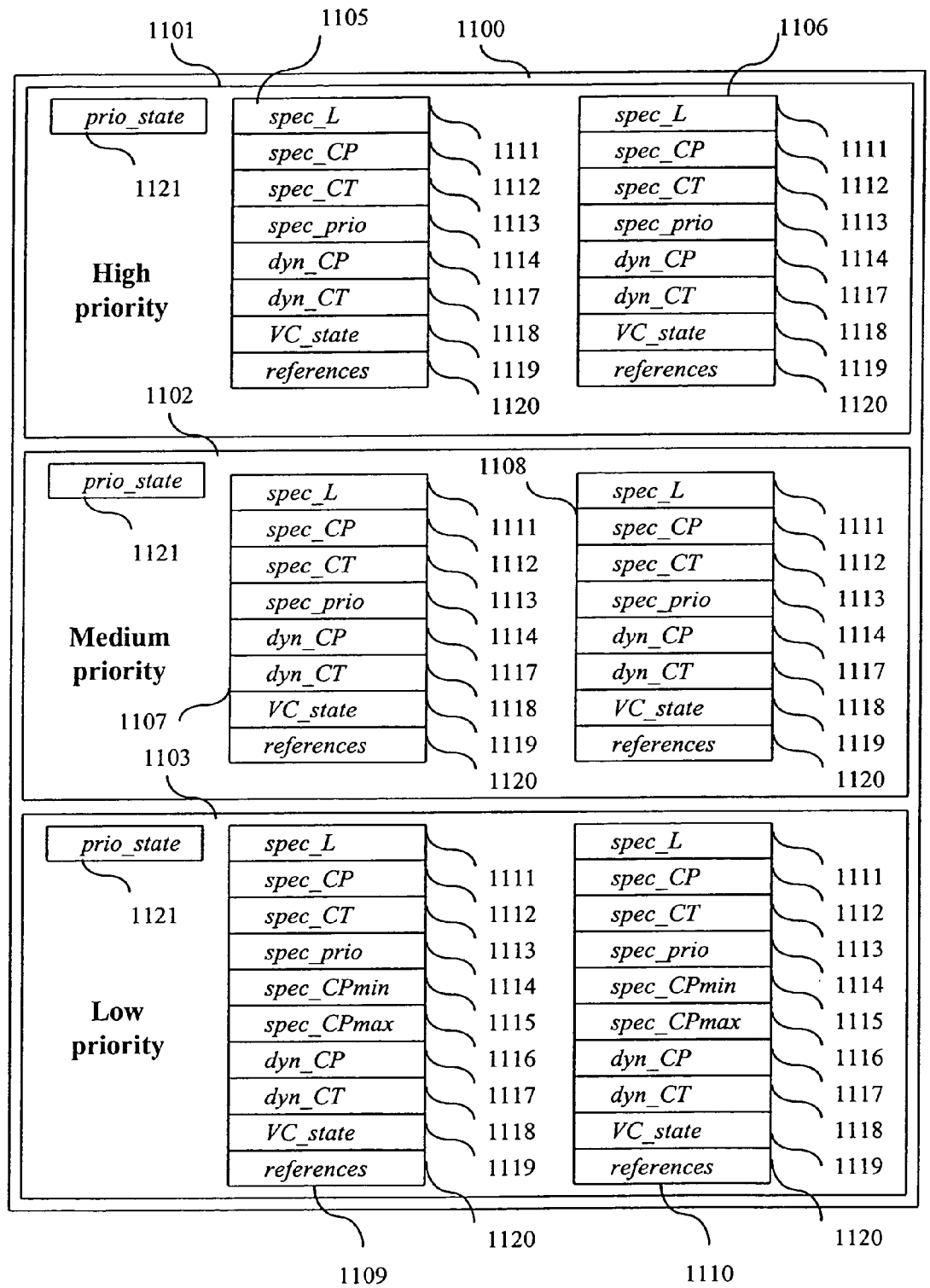
Figure 22:
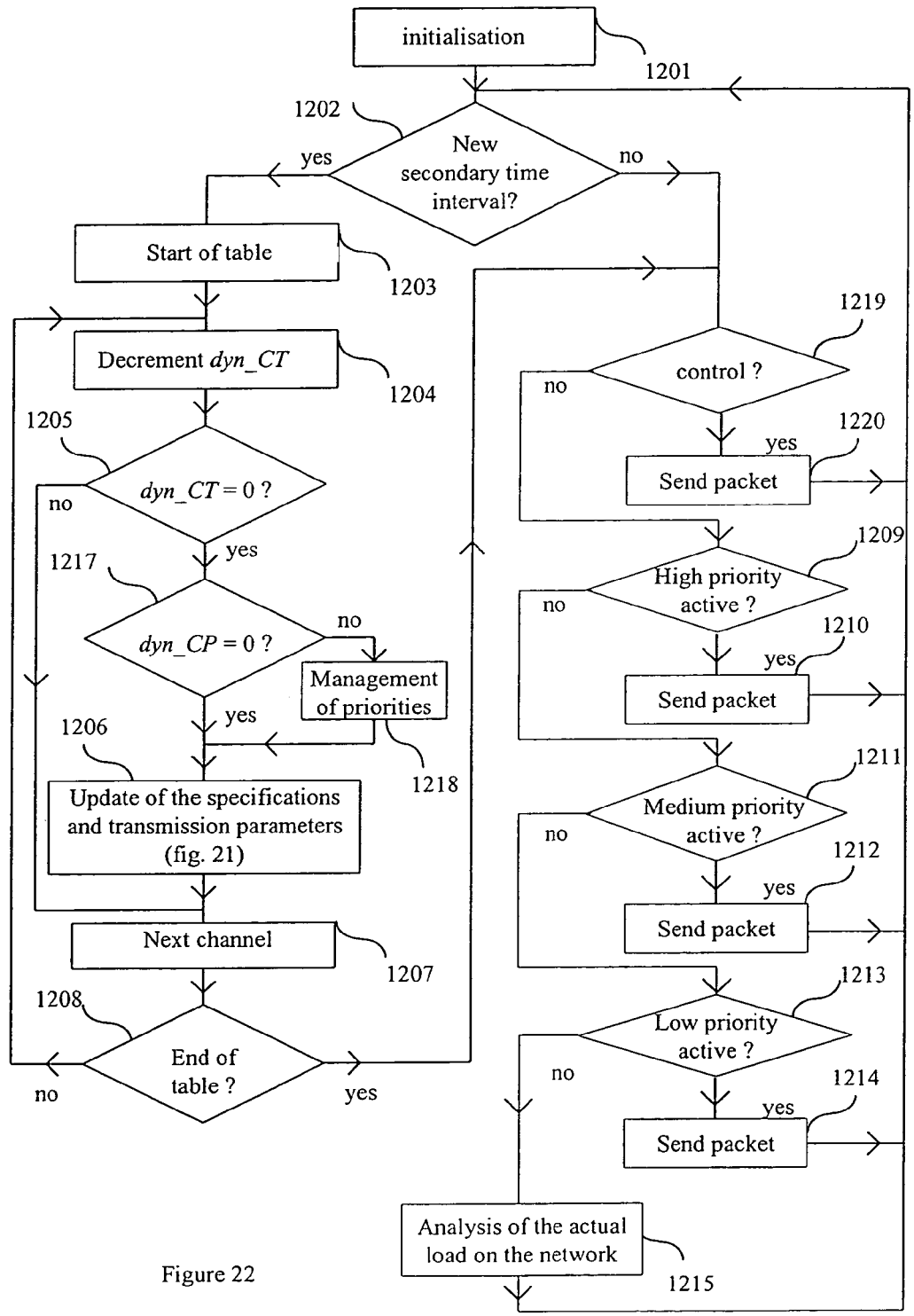
Figure 23:
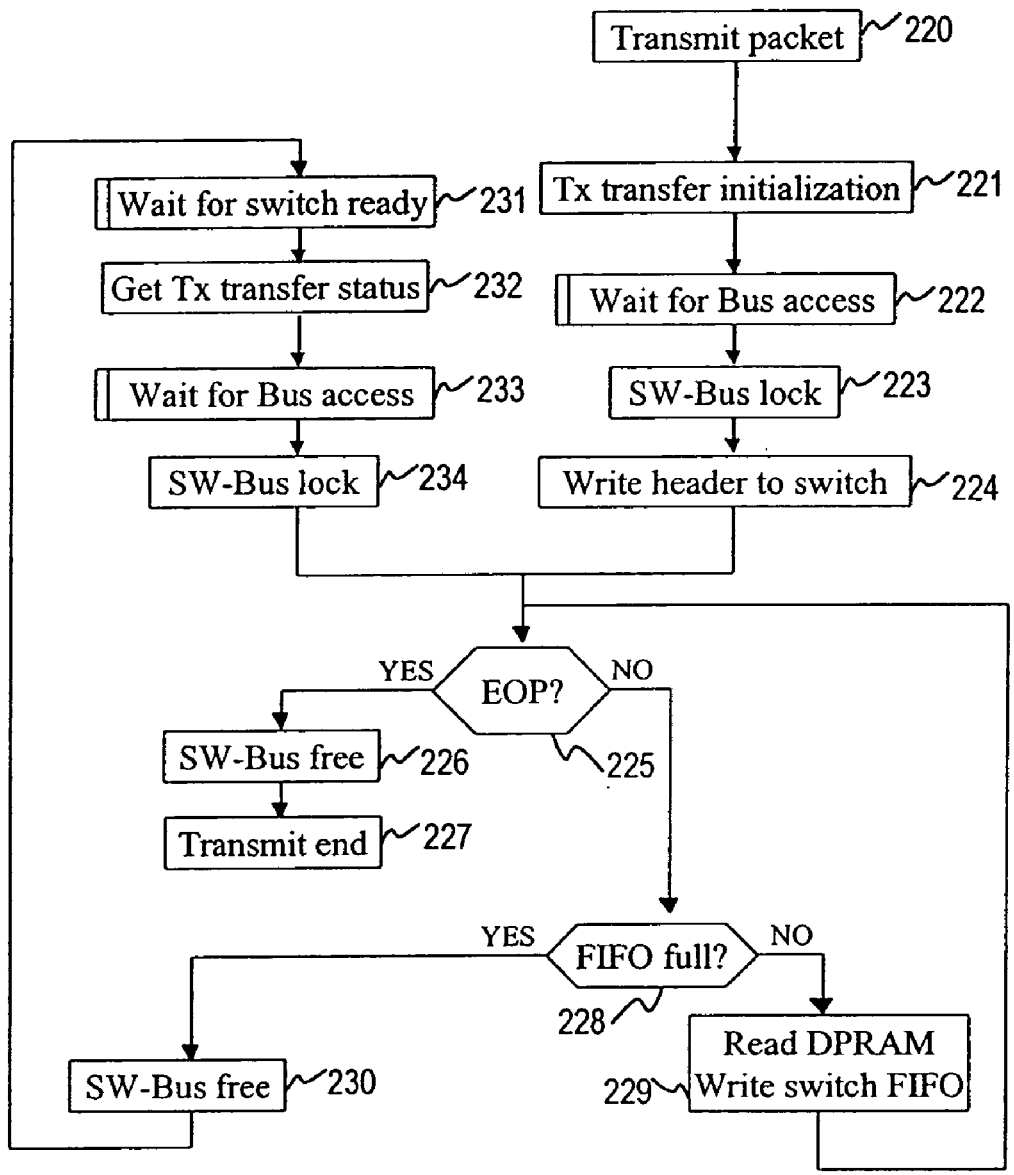
Figure 24:
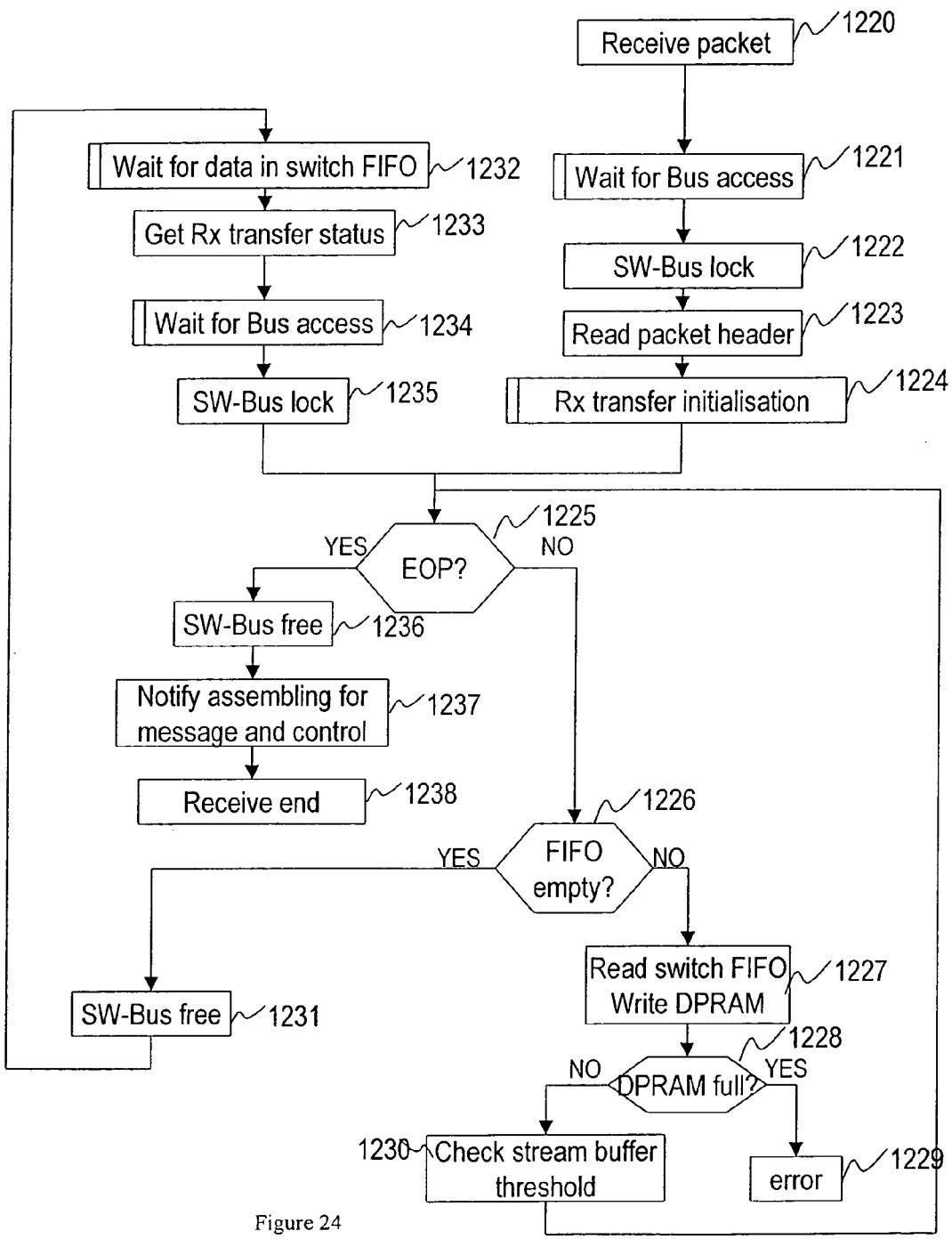
Figure 25:
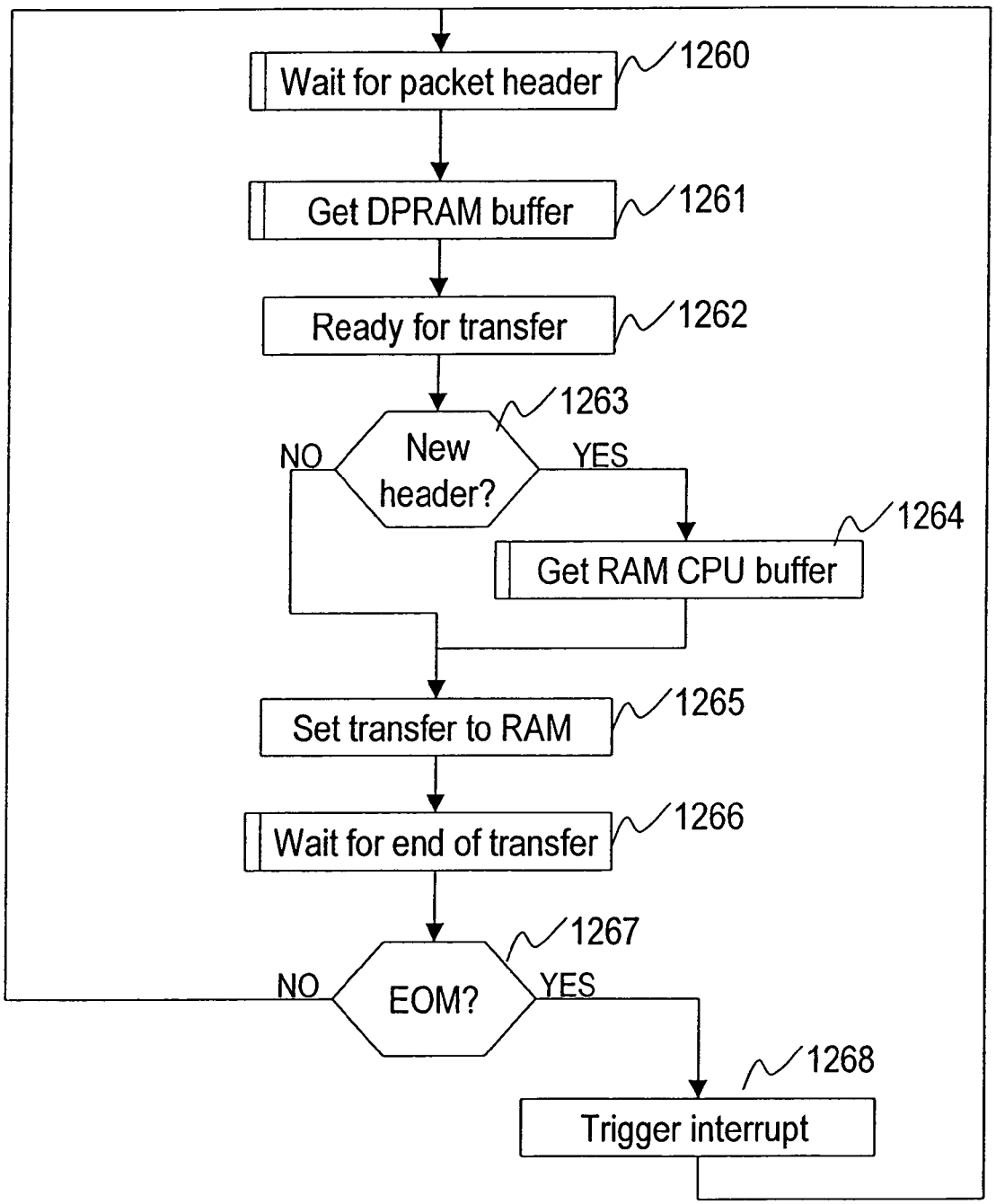
Figure 26:
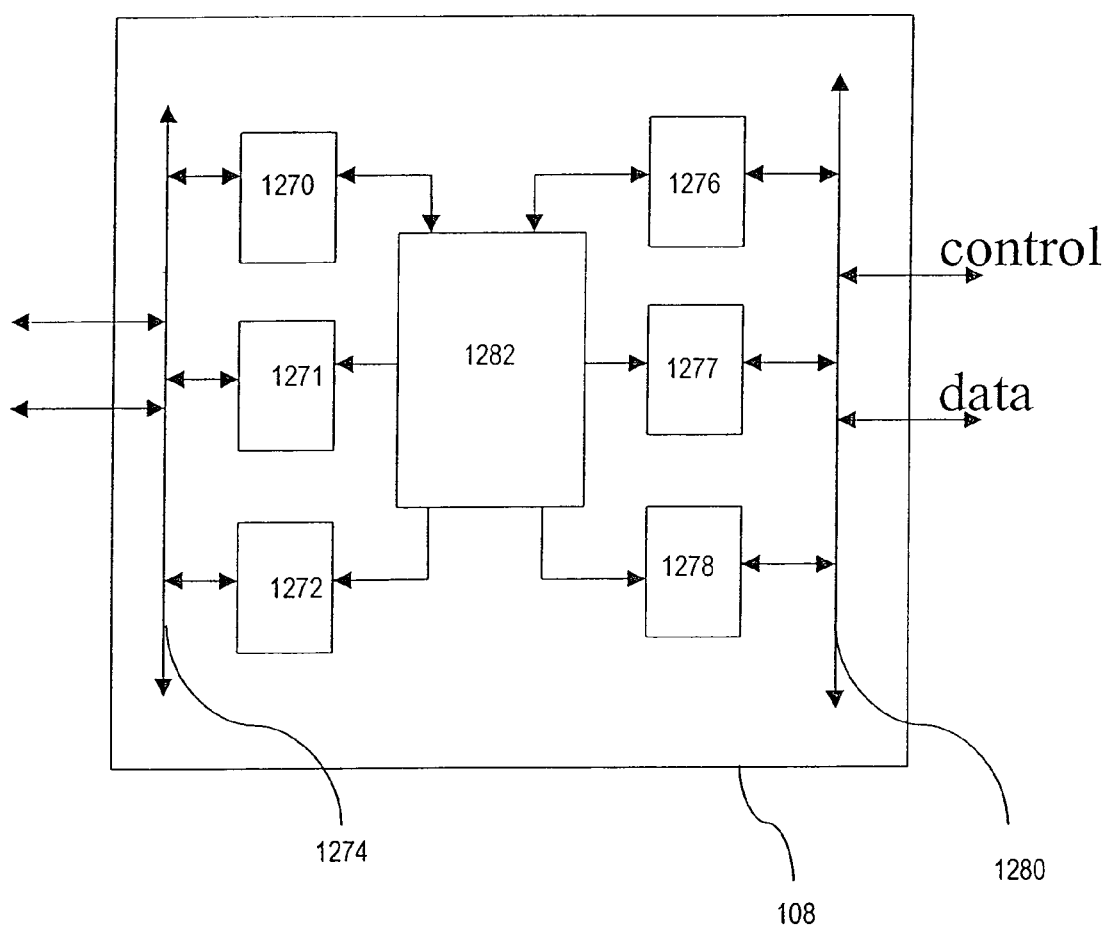

FIG. 5 describes the format of the data transferred in message mode;

FIG. 6 describes the format of the data transferred in stream mode;

FIG. 7 describes the format of the data transferred in control mode;

The subsequent figures relate to the transfer of asynchronous-type packets:

FIG. 8a describes the format of the load table stored in the RAM memory of the communications device 90 and managed by the network module 122 of FIG. 4;

FIG. 8b describes the format of an asynchronous packet of 1394 type used for exchanging commands for managing bridges between different bridge modules 123 of the type represented in FIG. 4;

FIG. 9a describes the flowchart for receiving an asynchronous packet originating from the serial bus, and which is implemented by the bridge module 123;

FIG. 9b describes a flowchart for receiving an asynchronous packet originating from the switched network and which is implemented by the bridge module 123;

FIG. 9c describes the flowchart for receiving a transfer in non-connected mode originating from the switched network and which is implemented by the network module 122 of FIG. 4;

FIG. 9d describes the flowchart for transfer of an asynchronous packet in message mode to the switched network, and which is implemented by the network module 122;

The subsequent figures relate to the transfer of isochronous-type packets:

FIG. 10 describes the format of a 1394-type isochronous packet;

FIG. 11 describes the mechanism for establishing a connection used for isochronous-packet transfer in stream mode via the switched network;

FIG. 12 describes the format of the signalling messages exchanged between different network modules 122 of the switched network for establishing a connection;

FIGS. 13 to 16 describe the flowcharts implemented by the network module 122 for management of the connections;

FIGS. 17 to 19 describe the mechanisms for reserving resources associated with the management of the connections;

FIG. 20 describes the transit of the isochronous packets between the switched network in stream mode and a 1394-type serial bus;

The following figures relate, in a general way, to the transfer of packets on the switched network:

FIG. 21 describes the structure of the data held in the packet-scheduling unit 109 for sending packets in control, message and stream mode;

FIG. 22 describes the flowchart implemented by the packet-scheduling unit 109 for sending packets in control, message and stream mode;

FIG. 23 describes the flowchart for transferring a packet from the memory 106 of FIG. 3a to the switching unit 108 and which is implemented by the control module 107;

FIG. 24 describes the flowchart for transfer of a packet from the switching unit 108 to the memory 106, and which is implemented by the control module 107;

FIG. 25 describes the flowchart for transfer of data in message mode from the memory 106 to the storage means 95, for subsequent processing by the network module 122, and which is implemented by the packet-scheduling unit 109;

FIG. 26 diagrammatically represents the switching unit 108.

TRANSFER MODE, DEVICE AND NETWORK

Figure 1:
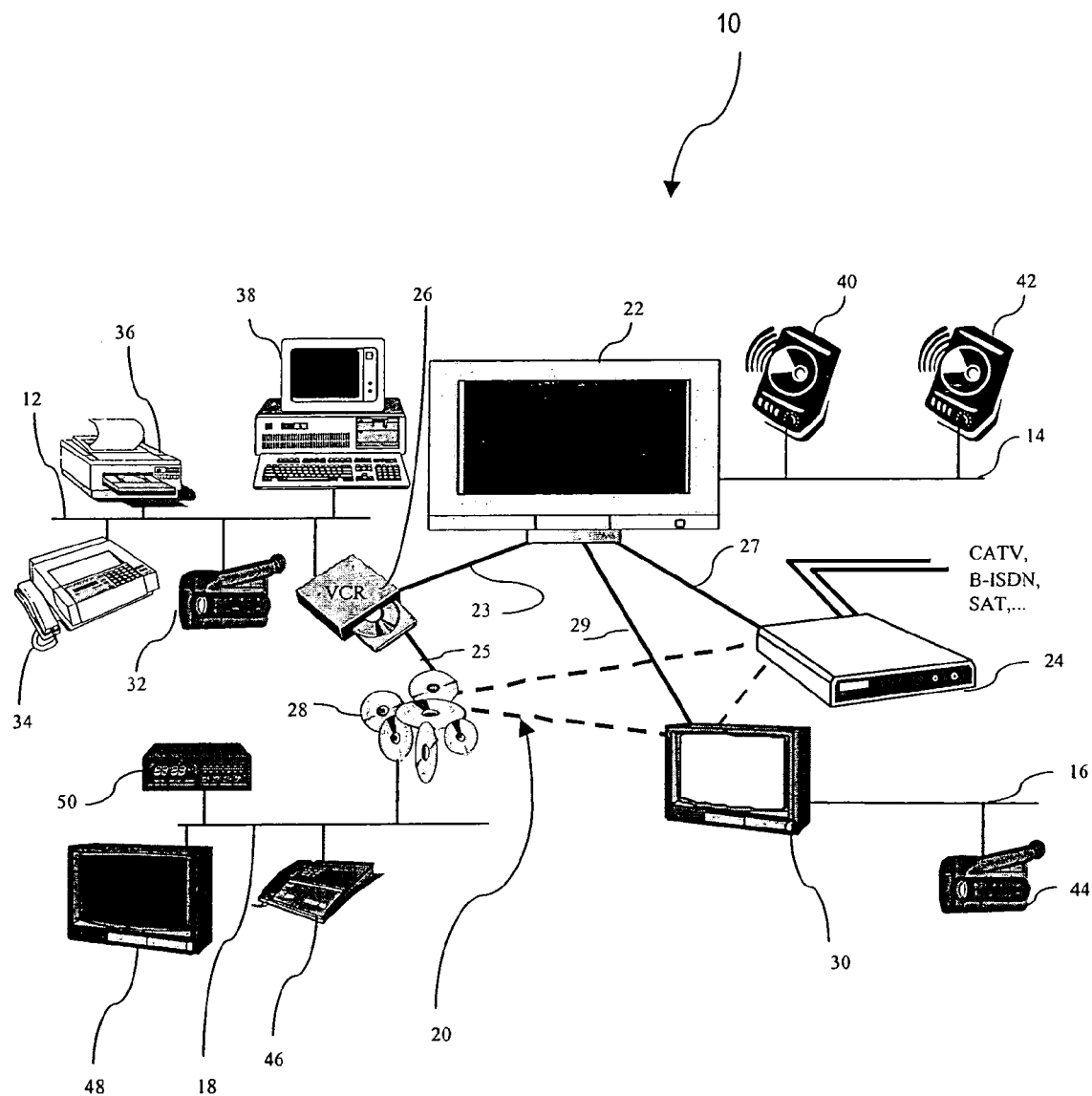
FIG. 1 represents a communications network according to the invention implementing the interconnection of peripherals of audio-visual type.

As represented diagrammatically in FIG. 1 and designated by the overall reference denoted 10, a communications network according to the invention includes several serial communications buses in accordance with the IEEE 1394 standard, denoted 12, 14, 16, 18, and which are all interconnected by a packet-switching network denoted 20, providing the interface between the various buses.

It should be noted that the switched network 20 is, for example, a network of the type in accordance with the IEEE 1355 standard.

This switched network includes several switching nodes denoted 22, 24, 26, 28 and 30, which are considered to be communications devices in the sense of the present invention. Some of them are linked together by physical links denoted 23, 25, 27 and 29 which are high-speed bidirectional links.

These physical links are, for example, cables, or else could, for example, be point-to-point radio links.

It should be noted that the switching nodes 22, 26, 28 and 30 are also communications nodes connected to the respective serial communications buses 14, 12, 18 and 16 and, that being so, each constitute an interface between the said serial communications bus in question and another node of the switched network 20.

By way of example, the nodes 22, 24, 26, 28 and 30 are respectively associated with data-processing apparatus also called peripherals, or else may also constitute data-processing apparatus in themselves.

Hence, for example, the switching node 22 may be associated with or itself be a high-definition television screen.

The switching node 24 may, for example, be associated with or itself constitute a set-top box.

The switching node 26 may, for example, be associated with or itself constitute a video recorder.

The switching node 28 may, for example, be associated with or itself constitute a DVD storage unit.

Finally, the switching node 30 may, for example, be associated with or itself constitute a television set.

Several communications nodes associated with data-processing apparatus or peripherals or else themselves constituting the said data-processing apparatus, are also connected to each serial communications bus.

Each communications node of a bus includes an internal clock, not represented in FIG. 1, from which are generated pulses known as clock pulses at a frequency known as clock frequency, equal for example to 24.576 MHz.

Hence, in addition to the recorder 26 connected to the bus 12, a digital camera 32, a photocopier 34, a printer 36 and a PC-type computer denoted 38 are also connected to the bus 12.

In addition to the screen 22 connected to the bus 14, stereo loudspeakers 40 and 42 are also connected to this bus.

In addition to the television apparatus 30 connected to the bus 16, a digital camera 44 is also connected thereto.

Finally, in addition to the DVD storage unit 28 connected to the bus 18, a photocopier 46, a television set 48 as well as a digital radio 50 are also connected to this same bus.

It should be noted that the network thus constituted typically represents a network which may be installed by a user in his home.

The communications network according to the invention allows any data-processing apparatus or peripheral connected to a first bus of the said network to exchange isochronous or asynchronous-type data with any other data-processing apparatus or peripheral connected to a second bus of the said network, the buses being separated from one another by the switched network.

Moreover, the communications network according to the invention also allows a peripheral connected to a bus to exchange asynchronous and isochronous-type data with any data-processing apparatus or peripheral of the switched network.

The interconnection of the communications buses by means of the switched network 20 makes it possible to resolve the problem of the wiring of the data-processing apparatus over a long distance, for example by arranging each of the switching nodes of the network 20 and the communications bus which is associated with it, including all the item of apparatus which are connected thereto, in a separate room of the dwelling.

Moreover, the fact that all the buses are interconnected by one and the same switched network simplifies the structure of the overall network and renders the management thereof transparent to the non-specialist network user.

Figure 2:
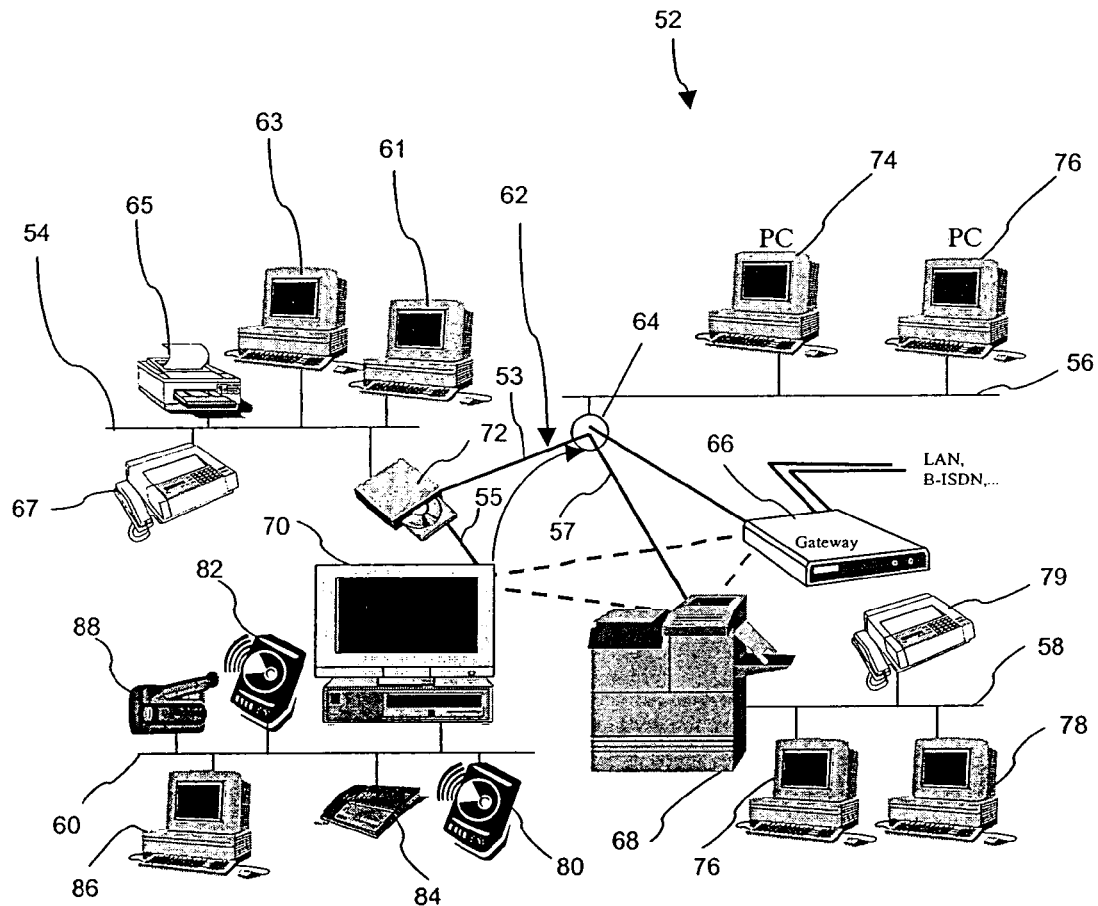
FIG. 2 represents a communications network according to the invention implementing the interconnection of office technology peripherals.

The application illustrated in FIG. 2 envisages connecting together office peripherals or data processing apparatus.

Hence, as represented in this figure, a network 52 comprises several serial communications buses in accordance with the IEEE 1394 standard and denoted 54, 56, 58 and 60, which are interconnected by a packet-switching network denoted 62.

The switched network 62 is a network of the type in accordance with the IEEE 1355 standard, for example.

This network 62 includes several switching nodes denoted 64, 66, 68, 70 and 72, some of which are linked together by physical links denoted 53, 55, 57 and 59 which are high-speed bidirectional links.

Some of these nodes denoted 64, 68, 70 and 72 also constitute communications nodes connected to the respective buses 56, 58, 60 and 54.

Each of the communications nodes of the network 62 may itself constitute or else be associated with a data-processing apparatus also called peripheral.

Hence, the nodes 64, 66, 68, 70 and 72 are respectively associated with or else themselves constitute a PC computer of server type, a gateway, a printer, a PC computer of server type and a DVD storage unit.

Two PC-type computers 61 and 63, a printer 65 and a photocopier 67 are connected to the bus 54 over and above the DVD storage unit 72.

In addition to a server-type computer 64 which is connected to the serial communications bus 56, two PC-type computers denoted 74 and 76 are also connected to this bus.

Two PC-type computers 76 and 78, as well as a photocopier 79, are connected to the serial communications bus 58 in addition to the printer 68.

Two stereo loudspeakers denoted 80 and 82, a photocopier 84, a PC-type computer 86 and a camcorder 88 are also connected to the serial-communications bus 60 over and above the computer 70.

This type of network constituted in the form of a network known as a LAN (the term meaning "Local Area Network") exhibits the same advantages as that described with reference to FIG. 1.

As represented in FIGS. 1 and 2, each of the switched networks 20 and 62 constitutes a communications interface between all the serial communications buses of the overall communications network and federates all these buses.

Each node of each switched network 20 (FIG. 1) and 62 (FIG. 2) includes an internal clock, not represented in the figures, and from which are generated pulses known as clock pulses at a frequency known as clock frequency, equal for example to 24.576 MHz.

Each internal clock defines successive time cycles each having a duration T specific to the said clock in question.

The duration T of the cycle of a node is determined by the number ninit of clock pulses generated by the internal clock of the said node over this duration according to the relationship T=ninit/F.

Hence, for example, 3072 clock pulses are counted in a reference period or cycle with a duration of 125 μs for a clock frequency of 24.576 MHz.

FIG. 3a represents a diagrammatic view of a node or communications device connected to a serial communications bus in accordance with the IEEE 1394 standard, and which also constitutes a switching node of a data packet-switching network similar to the networks described previously and denoted 20 and 62.

The node represented in FIG. 3a is also connected to one or more other switching nodes of the switched network to which it belongs.

In the embodiment examples represented in FIGS. 1 and 2, each of the nodes denoted 22, 24, 26, 28, 30 of the network 20 of FIG. 1 or of the nodes denoted 64, 66, 68, 70, 72 of the network 62 of FIG. 2 possesses, for example, a communications device represented in FIG. 3a and denoted 90.

The communications device is considered to be part of each data packet-switching network.

In the embodiment represented in FIG. 3a, it has been chosen to represent a data-processing apparatus 92 also called peripheral which is associated with the communications device 90.

A communications node consists of a communications device 90 and of a data-processing apparatus 92 associated with the said device and which can, for example, process image data to be transmitted through the communications device and/or process image data received from said device.

By way of a variant, the data-processing apparatus may itself constitute or include the communications device 90.

As far as the nodes 24 and 66 of the respective switched networks 20 and 62 are concerned, the block 92 corresponds in this case to an interface with an external network which is not represented, for example a network of CATV, B-ISDN or SAT type in the case of the node 24 (FIG. 1) and a network of LAN or B-ISDN type in the case of the node 66 (FIG. 2).

The device 90 includes a central processing unit CPU 93, a ROM-type permanent storage means 94 which contains the software architecture illustrated in FIG. 4 and a RAM-type temporary storage means 95 associated with the central unit 93 and into which this software architecture is loaded at initialisation.

The storage means 95 is able to store data packets of different types:
  asynchronous packets of the type in accordance with the IEEE 1394 standard,
  packets constituting messages in non-connected mode (asynchronous messages), of the type in accordance with the IEEE 1355 standard,
  control packets of the type in accordance with the IEEE 1355 standard.

The type of packets in accordance with the IEEE 1355 standard actually have an existence within the component 104 which will be mentioned later but they are not stored in this form in the RAM storage means 95. It should be noted that the storage means 95 contains the information necessary to generate the IEEE 1355 packets.

The routing of such packets to the storage means 95 originating either from the 1394 bus or from the switched network consisting of 1355 links will be detailed later.

The routing of such packets from the storage means 95 until they are transmitted by the switching node, either to the 1394 bus or to the switched network consisting of 1355 links, will be detailed later.

These three elements 93, 94 and 95 communicate by means of respective data and address buses denoted 96, 97 and 98, with a block denoted 99 and known to the person skilled in the art by the name of bus controller.

This block 99 particularly makes it possible to exchange data by means of a principal bus 100 with at least one bus-interface component 101. In the case in which the bus 100 is a PCI-standard bus (PCI standing for "Peripheral Component Interconnect"), the component 101 may be a component denoted AMCC 5933QC marketed by the company Applied Micro-Circuits Corporation.

The bus 100 may also connect together other elements, not represented in the figure, themselves provided with a bus interface and capable, for example, of implementing data-processing functions.

For example, in the case which the bus 100 is a PCI-standard bus, (PCI standing for "Peripheral Component Interconnect"), the block 99 is in fact a set of PCI components such as the Intel 440LX AGP set marketed by the INTEL Company.

Hence, the block 99 comprises, for example, an 82443LX component which provides the interface with the memory 95 via the memory bus 98 and with the central processing unit CPU 93 via the local bus 96. The 82443LX component is itself linked to an 82371AB component which provides an interface with the ISA bus 97 linked to the memory 94. An Intel 82093AA IOAPIC interrupt controller connected to the central processing unit CPU 93 manages the interrupts which may occur in the system.

As represented in FIG. 3a, the device 90 also includes a bus interface 102 which may be similar to the bus interface 101 thus allowing the data-processing apparatus or peripheral 92 to have access to the communications device.

Such an interface is produced, for example, in the form of a SEDNET PCI card marketed by the company SEDERTA under the reference SD-PCI-200 and makes it possible to connect thereto any existing data-processing apparatus designed to operate in conformity with the 1394 standard.

It is, obviously, possible to use an adapter specific to the data-processing apparatus which it is desired to connect thereto. The adapter 102 essentially comprises an interface component similar to the bus-interface component 101.

Depending on the type of data-processing apparatus, the principal bus 100, as well as the bus-interface 101 and bus-controller 99 components may be adapted as a function of the architecture of the type of apparatus. The same goes for the set of elements, CPU 93, RAM 95 and ROM 94.

However, it should be noted that, if the data-processing apparatus is a PC-type computer, then this adapter 102 is not necessary.

As represented in FIG. 3a, the node according to the invention also includes two interfacing means 103 and 104.

The means 103 is intended to provide the interface between the node 90 and the serial communications bus intended to operate according to the IEEE 1394 standard to which the said node is attached.

The interfacing means 103 are a set of 1394 PHY/LINK components which consists, for example, of a TSB21LV03A PHY component and of a TSB12LV01A LINK component which are marketed by the Company Texas Instrument, and of 1394 connectors, for example those marketed by the Company Molex, for example under reference 53462.

The interfacing means 103 includes at least one external port intended to be connected to the data-processing apparatus or peripheral which is attached to the 1394 serial communications bus.

The means 103 includes means for counting the number of pulses as a function of a clock signal generated by the control module 107 which will be defined later. This clock signal is synchronised with the "Cycle Master" of the serial communications bus with which it is related, by means of packets called cycle-start packets. The frequency of the clock signal generated by the control module 107 is equal to 24.576 MHz+/−100 ppm. This signal is represented as being one of the signals denoted ctrl3 in FIG. 3a.

On each serial communications bus of the network, one of the nodes is called "Cycle Master" and the "Cycle Master" of the "root" bus is called "Net Cycle Master".

Moreover, all the "Cycle Masters" of the network exhibit a characteristic which is specific to them, since they depend on the frequency of the internal clock, on the basis of which the duration of one "reference period" or "cycle" is defined.

The duration or period of time of the cycle denoted T is equal to an integer number ninit of clock pulses which is or is not common to all the buses and which is multiplied by the inverse of the frequency of the internal clock specific to the "Cycle Master" node.

The duration of the cycle T is thus equal to 125 microseconds, for example.

This period of time corresponds to an interval at which the isochronous data packets are transmitted in the communication bus.

When two serial communications buses are linked by a bridge, the "Cycle Master" of one of the buses has to synchronise its cycles with respect to the cycles generated by the "Cycle Master" of the adjacent bus.

Hence, in the network 10 of FIG. 1, if it is considered that the "Cycle Master" of the bus 12 is the node 38 and that the "Cycle Master" of the bus 16 is the node 44, the "Cycle Master" 44, which is linked to the bus 12 via the switched network 20 acting as a bridge, synchronises its cycles with respect to the cycles generated by the "Cycle Master" 38.

The "Net Cycle Master" node in FIG. 1, which is node 38 of the bus 12, for example, will then generate a signal called "cycle start" on the bus 12 every 125 microseconds.

This signal is intended for the other nodes 26, 32, 34 and 36 of the bus 12 and advises them that they can send an isochronous data packet associated with each cycle of the bus in question, intended for one or more of the other buses which are linked to the said bus in question via the switched network 20.

In a general way, the communications networks formed by serial communications buses allow transmission of packets which is synchronised on the basis of the cycles of the buses in question. The buses are, for example, used to transmit data packets in real-time of the audio/video type.

Figure 3B:
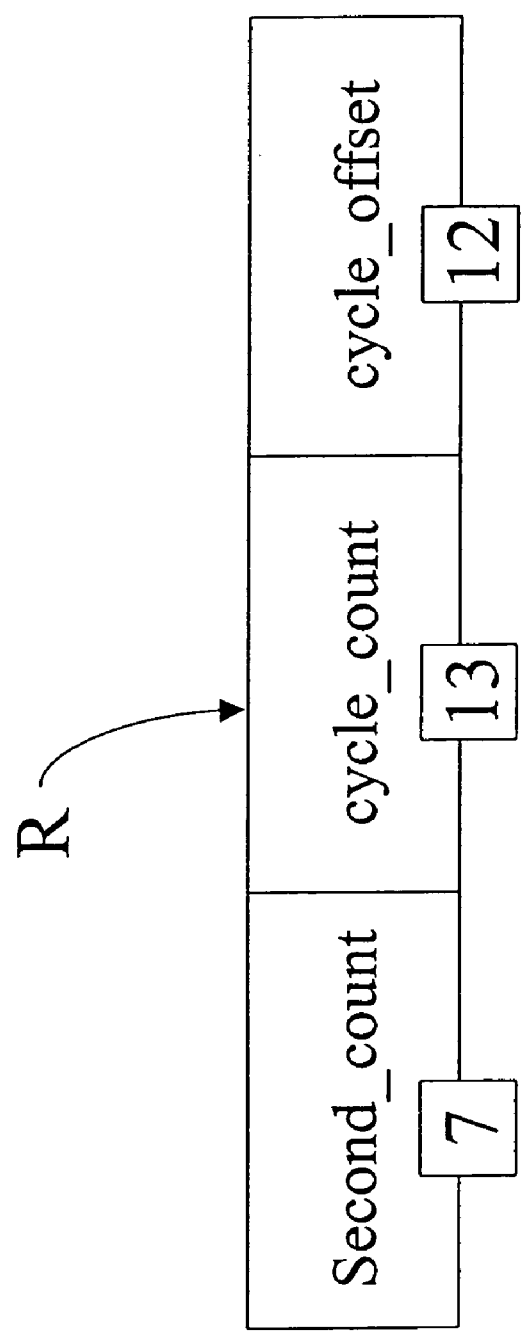
FIG. 3b is a diagrammatic view of a cycle-time register.

The counting means, like those of the interfacing means 103 quoted above, take the form of a register, for example, such as that represented in FIG. 3b.

Such a register, called "Cycle Time Register" includes several areas, especially a first area represented on the right-hand part of FIG. 3b and which is called "cycle-offset".

In this first area, which includes 12 bits, is recorded the number of clock pulses ninit contained within the cycle specific to the communications bus with which the set of 1394 PHY/LINK component 103 is related.

In accordance with what was mentioned above, a count up to 3071 clock pulses is carried out in this first area. At each pulse of the clock in question, the value of this first area of the register is incremented. When the value 3071 is reached and when a further clock pulse is counted, the value of the register which is contained in this first area will change to 0 and a carry will then increment the value of the second area of the register which is situated in the centre of FIG. 3b and is called "cycle count". This second area totals up the number of cycles elapsed, up to a number of 7999, and is recorded over 13 bits. This second area is incremented each time a carry is generated from the first "cycle-offset" area.

However, an incrementing by one unit from the value 7999 in this second area of the register R will cause a return to 0 of the value of this area of the register, thus generating a carry which will increment a third area of the register R, situated to the left in FIG. 3b and called "second count".

The third area, "second count", is recorded over 7 bits. This third area counts the number of times the second "cycle count" area overflows, and does so up to a value of 127. An incrementation of one unit from the value 127 in this third area of the register R thus causes a return to 0 of the value recorded in this area.

Additional information on this register R can be found in paragraph 8.3.2.3.1 of the IEEE 1394-95 standard.

There will be more later on the mechanism for synchronisation between the buses of the network when the data-communication mechanisms within the switched network included in the overall bus network according to the invention have been explained.

The interfacing means 104 mentioned above is a 1355 interface component which includes three ports. It consists especially of a C113 component marketed by the company 4LINKS, as well as of three LUC1141MK interface component marketed by the LUCENT company, themselves linked to 1355 connectors, for example those marketed by the HARTING company. The component C113 is itself produced on the basis of a Spartan XCS30XL FPGA-type programmable component ("Field Programmable Gate Array") marketed by the XILINX Company.

The three external ports of the interfacing means 104 are intended to be connected to ports of the same type on another communications node of the switched network, thus allowing the device 90 to communicate with another node of this network.

The device 90 also includes a data-flow control means 105 which makes it possible to transfer data between the various interface components 101, 103 and 104. This means 105 is produced in programmable logic, executed by an FPGA-type component, referenced Virtex, for example, marketed by the Xilinx Company.

This means 105 particularly employs a dual-port memory-storage unit 106 which makes it possible to store data intended for/or originating from the 1355 switched network.

The dual-port memory-storage unit possesses a storage capacity of less than 2 Mbits and is, for example, produced in the form of a DPRAM-type memory with 32-bit access.

The initials DPRAM stand for "Dual Port Random Access Memory" which can be translated into French approximately as "Memoire volatile a double port".

The memory-storage unit 106 includes a plurality of memory areas which are managed as individual FIFO-type memories, the initials standing for "First-in First-out".

Such a memory area corresponds to a memory in which the data are read in the order in which they were previously written.

These memory areas each includes an associated read pointer and an associated write pointer.

With each memory area being managed as a memory of FIFO type, it can be filled up and emptied at the same time, and in an independent way. This makes it possible to desynchronise the steps of reading and writing data which are carried out by a switching unit 108 which will be defined later with the steps of reading and writing data carried out by the control module 107.

This is because the fill level of the memory area in question is managed in a circular way, and it is known at any instant whether the data contained in a memory area have or have not been read. When these data have been read, it is then possible to come back and write new data in their place.

The dual-port memory-storage unit to some extent constitutes a stack for the packets, and the storage function is carried out independently depending on the port through which the packets reach the memory-storage unit.

In a general way, all the isochronous or asynchronous data originating from the switched network are stored in the memory-storage unit 106.

This storage is temporary in the case of the asynchronous data packets (packets constituting a message transmitted in non-connected mode and for the control packets), which are taken to be transferred later into the RAM storage means 95 for storage for a longer duration.

In contrast, the isochronous data packets (packets of "stream" type, that is to say those transmitted in connected mode), are stored solely in memory areas of this memory-storage unit 106 before they are transmitted onto the communications bus to which the switching node 90 is connected or onto the switched network.

This is explained by the fact that this type of data has to be transferred as rapidly as possible from the switched network to the bus and has therefore to be stored in a storage means which is easily and rapidly accessible.

Likewise, the isochronous data packets originating from the communications bus to which the switching node 90 is connected, and which are intended for the switched network are stored solely in the memory areas of the memory-storage unit 106 and not in the storage means 95, for the same reasons as those set out above.

It should be noted that prior to the storage of either isochronous data packets or asynchronous data packets, an appropriate reservation of resources internal to the communications device is performed in a plurality of modes, for instance in two modes.

In a first mode, data storing capacity (memory-storage unit 106) is reserved for storing isochronous data packets prior to their reception.

The reservation is made for a series of isochronous data packets transferred in a plurality of cycle times defined by the communications bus from which they are originated.

In a second mode, data storing capacity (RAM storage means 95) is reserved for storing an asynchronous data packet after the latter has been received by the communications device.

As represented in FIG. 3*a*, the data-flow control means 105 includes several other elements including a control module 107 (already mentioned above) which provides a function of control of the memory-storage unit 106, a switching unit 108 (already mentioned above) in communication with the interfacing means 104, with the memory-storage unit 106 and with the control module 107, as well as a data-packet scheduling unit 109 which is linked with the control module 107.

It will also be noted that the control module 107 communicates with the interfacing means 103 and 104, as well as with the bus-interfacing component denoted 101.

The control module 107 has the function of multiplexing the read or write accesses to registers of other modules from the principal bus denoted 100.

The module 107 also has control of the bus-interface component 101 for the steps of reading and of writing on the principal bus 100, notably including transfer in "burst mode".

The control module 107 is also tasked with triggering interrupts on the principal bus 100 as a function of particular communications events.

This module exchanges data with the component 101 on an add-on bus 110 depending on the control signals which are denoted ctrl 1.

As stated above, the module 107 is tasked with the control of the memory-storage unit 106 as far as the steps of reading and writing in FIFO mode are concerned, in the special case in which the bus-interface component 101 is an AMCC, by means of a data bus 111 and of control signals ctrl 2.

The interfacing means 103 contains FIFO-type memories which are used during the transfer of data packets of the type in accordance with the IEEE 1394 standard.

It comprises two FIFO transmission memories, called ATF ("Asynchronous Transfer FIFO") and ITF ("Isochronous Transfer FIFO") and a FIFO reception memory called GRF ("General Receive FIFO"). These FIFO memories are more widely described in the documentation associated with the LINK component TSB12LV01A.

The control module 107 and the interface means 103 manage the transfer of data onto a bus 112 depending on control signals ctrl 3.

Moreover, the control module 107 controls the switching unit 108 by means of control signals ctrl 4 so as to transfer data from the switching unit to the memory-storage unit 106 via a data bus 113 and conversely.

The switching unit 108 is connected to the interface means 104 by means of a data bus 114 and of control signals ctrl 5.

The data-packets scheduling unit 109, also denoted SAR (the meaning of which is "Segmentation And Reassembly") informs the control module 107 of the next data packets or packets to be transmitted by means of control signals ctrl 6.

Moreover, the scheduling unit 109 verifies the reception of the data packets and manages the allocation and the releasing of memory areas (known by the term "buffers") of the memory-storage unit 106.

The control signals ctrl 7 exchanged between the interfacing means 104 and the control module 107 especially comprise the clock signals regenerated on the basis of the reception of the 1355 packets on each of the three ports of the interfacing means 104.

A quartz crystal at 49.152 MHz (not represented) is connected both to the means 104 for sending 1355 packets and to the control module 107 which generates a clock signal at 24.576 MHz+/−100 ppm, on the one hand, for the data-packets scheduling unit 109, so as to clock the sending of the 1355 packets and, on the other hand, for the interfacing means 103, so as to clock the sending of 1394 packets.

FIG. 4 represents the functions carried out in software form and which are stored in the ROM memory denoted 94, then loaded upon initialisation into the RAM storage means 95, and then executed by the central processing unit CPU 93.

As represented in FIG. 4, the software architecture according to the invention carries out several functions identified by the following modules:

a communications interface module 120, a processing interface module 121, a network module 122, a bridge module 123.

More particularly, the communications interface module 120 corresponds to the low layer of the protocol which drives both the communications hardware via the bus-interface component 101 and the bus interface 102.

The interface module 120 also has the function of managing the principal bus 100 interrupts.

The isochronous data packets are transferred between the data-processing apparatus 92 and the interfacing means 103 or 104.

Analysis of the header of the asynchronous packets received via the interfacing means 103 and stored in the RAM storage means 95 is then carried out by the bridge module so as to determine whether an asynchronous packet is intended for the data-processing module 121, for the network module 122 or else for the bridge module itself.

Analysis of the header of the asynchronous packets to be sent from the RAM storage means 95 is then carried out by the bridge module so as to determine whether an asynchronous packet is intended for the interfacing means 103, for the network module 122 or else for the bridge module itself.

The asynchronous data packets are transferred between the RAM storage means 95 and the ATF and GRF FIFO memories of the interfacing means 103.

The communications interface module 120 has the function of accessing in read or write mode to the various status or configuration registers arranged in the means 103, 105 and 107 by means of the bus-interface component 101, particularly allowing the network module 122 and the bridge module 123 to carry out initialisation of the means 103, 105 and 107.

FIG. 5 describes the format of the data transferred in message mode on the switched network.

The message 300 consists of a message header field and of a message data field ("Message Payload") 302.

The field 302 is representative of the data to be transmitted. They take the form, for example, of an asynchronous-type 1394 packet as described in the standard. The field 301 is a header field added by the network module 122 representative of the format of the field 302 and describing size information, for example.

In order to be sent on the switched network, the message 300 is broken down into a series of packets 321 to 326 under the control of the scheduling unit.

The packet header fields 303, 306, 309, 312, 315 and 318 contain the routing information representative of the path to be travelled, of the identifier of the node which sent the packet, of the transfer mode (here the "message" mode), as well as of the number of the sending FIFO memory in the dual-port memory-storage unit 106. Conventionally, the value of these fields is identical.

The data fields of the packet ("Packet Payload") 304, 307, 310, 313, 316 and 319 contain the set of data which constitute the message 300, the packets being sent in such a way that the whole of the message 300 is sent in order from left to right.

The end-of-packet fields ("Packet Trailer") 305, 308, 311, 314, 317 and 320 are explicitly added by the interfacing means 104 after the sending of each packet. These fields are all representative of an end-of-packet marker ("EOP"), as described in the IEEE1355-95 standard. The fields 305, 308, 311, 314 and 317 all have the same value of EOP1, whereas only the field 320 which belongs to the last packet of the message has the value EOP2. It will be noted that the size of the field 319 depends especially on the number of data items remaining to be sent in the message 300.

FIG. 6 describes the format of the data transferred in the stream mode onto the switched network.

The data flow partially represented by the fields 352 and 353 consists, on the one hand, of a set of stream data fields ("Stream Payload") represented by the fields 330 to 334 and, on the other hand, of a set of stream header fields represented by the fields 335 to 337.

The fields 330 to 334 are representative of data to be transmitted and each consists, for example, of an isochronous-type 1394 packet. In this case, all the fields 330 to 334 have the characteristic of belonging to the same isochronous data flow and thus contain the same value of channel number.

In order to be sent on the switched network, the data flow partially represented by the sets of fields 352 and 353 is broken down into a series of packets 338 to 341 under the control of the scheduling unit 109.

The packet header fields referenced 342, 345 and 349 contain routing information representative of the path to be travelled, of the identifier of the node which sent the packet, of the transfer mode (here the stream mode), as well as of the number of the sending FIFO memory in the dual-port memory-storage unit 106. Conventionally, the value of these fields is identical.

The data fields of the packet ("Packet Payload" as the terminology has it) referenced 343, 346, 347 and 350 contain a part of the data which constitutes the stream, the packets being sent in such a way that the entire stream is sent in order from left to right.

The end-of-packet fields ("Packet Trailer") referenced 344, 348 and 351 are added explicitly by the interfacing means 104 after each packet has been sent. These fields are all representative of an end-of-packet marker (EOP) as described in the standard IEEE1355-95 and all have the same value of EOP1.

FIG. 7 describes the format of the data transferred in control mode on the switched network.

The field 360 is representative of the data to be sent in control mode and constitutes the whole of a control message, such as a signalling message mentioned in FIG. 1, for example.

The control message is sent onto the switched network under the control of the scheduling unit 109 in the form of a single packet.

The packet header field referenced 361 contains the routing information representative of the path to be travelled, the identifier of the node which sent the packet, the transfer mode (here the control mode) as well as of the number of the sending FIFO memory in the memory-storage unit 106.

The data field of the packet ("Packet Payload") 362 is exactly equivalent to the field 360.

The end-of-packet field ("Packet Trailer") 363 is added explicitly by the interfacing means 104 after the packet has been sent. This field invariably has the value EOP1.

Asynchronous Transfer

FIG. 8a is a diagrammatic view of the data structure of a load table associated with the network module 122 and stored in the storage means 95 of the communications device 90.

In FIG. 8a, link descriptors 2001 to 2007 are observed, arranged side-by-side, and path descriptors 2011 to 2015 arranged on successive rows.

Each path descriptor is a data structure for describing a path between two nodes of the switched network which includes, in particular, the address field of each of the two nodes, the reference of the links involved in the description of this path and the reference of each connection associated with this path.

The address field of a node is associated uniquely with a bus-identification field represented over 10 bits and the value of which corresponds to the identification of the bus to which the communications device is connected. The value of this node-address or bus-identification field is used in the addressing sub-fields denoted 203 of 205 of the 1394-type asynchronous packets which are described later by reference to FIG. 8b.

Each outgoing path descriptor (2011, 2012 or 2013) further includes the routing information used in each packet header transferred along this path. The address field of the first node of all the outgoing paths is identical and corresponds to the address field associated with the communications device of the node in question.

The subset of the load table consisting of the outgoing paths is called routing table in the remainder of the description.

The paths which do not leave from the node in question are called "temporary" paths, and make it possible to know the loads on the links of the outgoing paths. The temporary paths are created by the load-control means which manages all the paths (steps 2307, 2407 and 2504 in FIGS. 17 to 19).

In the embodiment described and represented, the paths 2011, 2012 and 2013 are outgoing paths (in heavy line) and the paths 2014 and 2015 are temporary paths (in fine lines). The paths 2011, 1012 and 1013 described the routing table and are used by the node in question in order to establish paths to any destination node.

Each link descriptor 2001 to 2007 includes, in particular, the reference of each path which passes over the link in question, identified by a rectangle, at the intersection of a vertical line starting from the link descriptor in question and of a horizontal line starting from the path descriptor in question.

The links 2001 to 2004 form part of at least one of the outgoing paths, and are represented in heavy line. Each intersection of two lines which is marked by a dot represents a reference in the memory:
 the external lines (at the top and/or to the left of the rectangles) identify the references kept with each link; these references relate to each path which passes over the said link, and
 the internal lines (at the bottom and/or to the right of the rectangles) identify the references kept with each path: these references relate to each link crossed by the said path.

The updating of the load table carried out by the network module 122 of the device includes the following steps:
 for establishing a connection:
  updating of the loads of all the links referenced by the path (adding load), and
  for each link, updating of the load on each path referenced for this link;
 for clearing a connection:
  updating of the loads on all the links referenced by the path (deducting load), and
  for each link, updating of the load on each path referenced for this link;
 for adding a path:
  either by the network module for initialising a predetermined list of outgoing paths for the node in question, upon the communications device being powered up,
  or by the network module, when the path associated with a new connection, during the addition of load, is not already specified (it is then a matter of a temporary path);
 for deleting a path:
  by withdrawing a temporary path when it is no longer crossed by any connection, after withdrawing a connection, or when the list of connections which is referenced by this path is empty; and
 for deleting a link:
  by withdrawing a link when it is no longer crossed by any path, or when the list of paths which are referenced by the said link is empty.

In the load table, with each link there is associated load information and, with each path, there is associated information representative of the least-available link. Hence, the available bandwidth of the least-available link is also the available bandwidth of the path.

It will be observed that it is by using this path bandwidth availability information that the network module makes the choice of the path by choosing the most available path. For all the information to be transmitted in non-connected mode, the availability of each path of the network is thus estimated, as a function of the traffic in connected mode.

The load on a path is defined on the basis of its least-available link. It is characterised by the total bandwidth which it allows and the maximum share of the bandwidth which is associated with the traffic in connected mode. Given the actual load of the traffic in connected mode, the network module defines the share associated with the traffic in non-connected mode as being equal to the total bandwidth from which is subtracted the share associated with the connected mode.

The network module allocates, to all the transmissions in non-connected mode which it has to make, all or part of the bandwidth (preferably a part, in order to avoid problems of congestion of the network). This share is equally distributed among all the transmissions in non-connected mode and it is therefore dynamically updated at the start and at the end of each transmission in connected mode (when the load of the traffic in connected mode varies).

The allocation of a share is made by defining a range of values of the number of packets to be sent between two extreme values (spec_CPmin 1114 and spec CPmax 1115 described later by reference to FIG. 21). This bandwidth allocation step is carried out before the information is sent.

Moreover, a path which supports more than a predetermined number of outgoing transmissions in the non-connected mode is regarded as not available for additional transmission in non-connected mode.

The events which may influence the allocation of bandwidth to the transmission in connected mode are of two types:
 those which relate to the connected mode, the establishing or the closing of a connection, and which have an influence on the bandwidth which is reserved for them, and, consequently, on the number of packets to be sent in non-connected mode and also on the size of these packets, and
 those which relate to the non-connected mode, the start or the end of a transmission, and which have an influence on the number of packets to be sent in non-connected mode.

For managing the load table illustrated in FIG. 8a, the load on a path is determined by the load on the least-available link, taking into account, for the load on a link, the sum of the loads on the paths which pass over it.

The outgoing paths used are, for example, predetermined statically given a fixed topology of the switched network. It will be noted that the use of routing means making it possible to manage the list of outgoing paths dynamically for a variable topology does not in any way affect the implementation of the invention.

It will be observed here that each node of the packet-switching network controls the flow which it generates by virtue of the packet-scheduling unit 109 and that the information making it possible to control this flow is established on the basis of the load table managed by the network module 122, the scheduling unit 109 of each node keeping this information in the form of a table like the one illustrated in FIG. 21 which will be described later. This table is filled in by the network module 122.

The levels of priority of the messages are established by the network module on the basis of the service required.

FIG. 8b describes the format of an asynchronous packet in accordance with the 1394 standard, used for transfer of a join request or a release request. The structure of an asynchronous packet is described more widely in the IEEE 1394-95 standard. The asynchronous packets are used, among other things, to perform transactions between a source peripheral and a destination peripheral. A transaction is carried out by sending a "Request"-type packet from the source to the destination, then a "Response"-type packet from the destination to the source.

The "destination_ID" field 280 of FIG. 8b ("Destination Identifier"), represented over 16 bits, contains the routing information making it possible to reach the destination peripheral.

The sub-field 201 describes the identification of the bus to which the destination peripheral belongs, whereas the sub-field 202 identifies the destination peripheral itself among the other peripherals of the bus to which it belongs.

The "source-ID" field 281 ("Source Identifier"), represented over 16 bits, contains the routing information making it possible to reach the source peripheral.

The sub-field 203 describes the identification of the bus to which the source peripheral belongs, whereas the sub-field 204 identifies the source peripheral itself among the other peripherals of the bus to which it belongs.

The presence of these two fields 280 and 281 allows a transaction to be routed between the source and the destination.

The field "tl" 282 ("Transaction Label"), represented over 6 bits, makes it possible to number a transaction between peripherals.

The field "rt" 283 ("Retry Code"), represented over 2 bits, makes it possible to identify the attempts to send the same asynchronous packet.

The field "tcode" 284 ("Transaction Code"), represented over 4 bits, makes it possible to identify an asynchronous packet type, such as the type of the transaction, for example.

The field "pri" 285 ("Priority"), represented over 4 bits, makes it possible to identify the priority associated with the asynchronous packet.

The fields 286 and 287 make it possible uniquely to identify the type of packet as well as the processing steps which are associated with it. They particularly make it possible to identify packets of "order" type exchanged between bridges and more particularly the orders for establishing and freeing a connection.

The fields 289, 290, 291, 292 and 293 are fields specific to the orders for establishing and releasing a connection. The field 289 makes it possible uniquely to identify the isochronous connection in the switched network as a whole.

The field 290 contains the identification (or address) of the node called controller node, denoted 523, for example in FIG. 11, which will be described later.

The field 291 contains the identification (or address) of the node called source node ("Talker"), denoted 505, for example, and identified by the letter T in FIG. 11 which will be described later.

The field 292 contains the identification (or address) of the node known as destination mode ("Listener"), denoted 514, for example, and marked with the letter L in FIG. 11, which will be described later.

The field 293 contains the description of the required parameters associated with the connection envisaged for conveying the isochronous stream between the so-called "talker" node and the so-called "listener" node.

The standard fields 288 and 294 are error-detection fields.

The various flowcharts presented in the description which will follow include steps corresponding to instructions which, when they are executed, make it possible to implement all or part of the method according to the invention.

It should be noted that several computer programs denoted P1, P2, P3, P4, P5, P6, P7, P8, P9, P10 and P11, which are stored in the RAM storage means 95 (FIG. 3a) are based respectively on the flowcharts of FIGS. 9a to 9d, 13 to 19.

FIG. 9a describes a flowchart for receiving and processing asynchronous packets originating from the serial bus connected to the interfacing means 103. This flowchart is implemented by the bridge module 123.

The 1394 packets are firstly stored in the FIFO reception memory GRF associated with the interfacing means 103. The packet is then transferred into the RAM storage means 95 by the interface module 120 under the control of the bridge module 123. That describes the set of steps implemented in the course of step 150 of the flowchart.

In the course of the test 151 the bridge module 123 analyses the field 201 described in FIG. 8b in order to determine whether the packet is intended for the switched network. If so, the step 155 is performed and the asynchronous packet is sent to the network module 122 via the interface referenced ctrl14 in FIG. 4.

In the event that the test 151 is negative, the test 152 is performed. In the course of the test 152 the bridge module, by analysing the fields 286 and 287 determines whether the packet is intended for it. If so, step 154 is performed and the processing associated with the data fields of the asynchronous packet (such as the fields 289 to 293 of FIG. 8b, for example) is performed.

If the test 152 is negative, the asynchronous packet is transmitted to the data-processing module 121 via the interface referenced ctrl13 in FIG. 4 (step 153).

FIG. 9b describes the flowchart for receiving an asynchronous packet originating from the switched network, implemented by the bridge module 123.

In the course of step 160, the bridge module 123 receives an asynchronous packet originating from the network module 122 via the interface ctrl14 (see step 174 of FIG. 9c), then the test 161 is performed.

In the course of the test 161, the bridge module 123 analyses the field 201 represented in FIG. 8b in order to determine whether the packet is intended for the serial bus. If so, step 165 is performed and the asynchronous packet, via the interface module 120, is transferred into the sending FIFO memory ATF associated with the interfacing means 103 so as to be sent out on the serial bus.

In the event that the test 161 is negative, test 162 is performed. In the course of the test 162 the bridge module, by analysing the fields 286 and 287, determines whether the packet is intended for it. If so, step 164 is performed and the processing associated with the data fields of the asynchronous packet (such as the fields 289 to 293 of FIG. 8b, for example) is performed.

If the test 162 is negative the asynchronous packet is transmitted to the data-processing module 121 via the interface referenced ctrl13 in FIG. 4 (step 163).

FIG. 9c describes the flowchart for receiving a transfer in the non-connected mode originating from the switched network and implemented by the network module 122.

Step 170 informs the network module 122 of the results of a data transfer in non-connected mode into the storage means 95 (see step 1268 of FIG. 25), then the test 171 is performed.

In the course of the test 171 the network module 122 determines whether what is involved is a packet of control type, on the basis of the packet header information associated with the transfer. If the test is positive, step 177 is performed. This relates, for example, to processing steps associated with the reception of a signalling message as described later with reference to the flowcharts of FIGS. 13 to 16 for the management of the connections.

If test 171 is negative, test 172 is performed. If test 172 is negative, depending on the result of the analysis of the field 301 of FIG. 5, step 176 is performed, otherwise test 173 is performed.

Step 176 consists in a specific processing step associated with any transfer of data in message mode which does not relate to the disclosure of the invention.

Step 173 is performed in the case in which the data transfer in message mode corresponds to an asynchronous packet. In the course of the test 173, the network module 122 determines whether the asynchronous packet is intended for the serial bus by analysing the field 201 represented in FIG. 8b. In the negative, step 175 is performed and the processing associated with the data fields of the asynchronous packet (such as fields 289 to 293 of FIG. 8b, for example), is performed by the network module. In the affirmative, the asynchronous packet is forwarded to the bridge module 123 via the interface referenced ctrl14 in FIG. 4 (step 174).

FIG. 9d describes the flowchart for transfer of an asynchronous packet in message mode to the switched network, implemented by the network module 122.

In the course of step 180, the network module 122 receives an asynchronous packet originating from the bridge module 123 via the interface ctrl14 (see step 155 of FIG. 9a), then test 181 is performed.

In the course of the test 181, the network module 122 determines whether the asynchronous packet is intended for the switched network by analysing the field 201 represented in FIG. 8b. If so, step 183 is performed and the packet is transferred in message mode to the switched network via the interface module 120. If not, the processing associated with the data fields of the asynchronous packet (such as the fields 289 to 293 of FIG. 8b, for example), is performed by the network module (step 182).

Isochronous Transfer

FIG. 10 describes the format of an isochronous packet used for real-time data transfer in accordance with the standard IEC-61883 (IEC-61883 ("Consumer Audio-Video Equipment—Digital Interface—Part 1: General", February 1998).

The field 400 specifies the length of the data field in bytes, which is formed from the fields 406 and 407.

Field 401 describes the format of the isochronous packet and especially the presence of the CIP header ("Common Isochronous Packet"), if its value is equal to "01" in binary representation.

The "channel" field 402 specifies the value of the channel number associated with the isochronous packet.

The field "tcode" 403 makes it possible to identify the packet as being of isochronous type when its value is equal to "1010" in binary representation.

The field "Sy" 404 is a field which is available for certain applications.

The field "CIP_header" 406 contains information describing real-time data.

The standard fields 405 and 408 are error-detection fields.

The figure denoted 11 is a diagrammatic view of a communications network according to the invention similar to those represented in FIGS. 1 and 2 This figure will make it possible to illustrate the circulation of the control messages intended for management of the connected mode.

The network of FIG. 11 includes several serial communications buses for example of the type in accordance with the IEEE 1394 standard, which are denoted 540 to 544 and linked together by way of the switched network for example of the type in accordance with the IEEE 1355 standard, and denoted 590. Various items of data-processing apparatus or peripherals of the type in accordance with the IEEE 1394 standard, denoted 500 to 516, represented by rectangles in this figure, are connected to each of the buses. Other nodes are formed, on the one hand, by a communications device 90 and, on the other hand, by a data-processing apparatus 92 as represented in FIG. 3a.

All the serial communications buses in FIG. 11 can be of the same type and define each a cycle time as a period of time corresponding to an interval at which the isochronous data packets are transmitted in the serial bus.

It should be noted that each communications device 90 according to the invention is represented in this figure by the two halves of an oval in such a way as to depict, on the one hand, all the means associated with the interfacing with the serial bus called "serial-bus access" (or "Serial Bus Portal"), represented by a half-oval and, on the other hand, all the means associated with the interfacing with the switched network called "virtual-bus access" (or "Virtual Bus Portal"), represented by the other half of the oval in question.

The "serial bus portals" of the various communications devices 90 represented in FIG. 11, are denoted 520 to 524 in the case of those which are actually linked to a bus, and 532 to 534 in the other cases.

The "virtual bus portals" of the various communications devices 90 represented in FIG. 11, are denoted 525 to 529, on the one hand, and 530 to 532, on the other hand. The "virtual bus portals" describe the whole of the switched network 590 and are linked together in pairs as indicated in FIG. 11, by bidirectional links of the type in accordance with the IEEE 1355 standard, and denoted 550 to 559.

Hence, for example, the "serial bus portal" 520 and the "virtual bus portal" 525 together constitute a communications device 90.

The "serial bus portal" functions under the control of flowcharts implemented by the bridge module 123 while the "virtual bus portal" operates under the control of flowcharts implemented by the network module 122.

A "serial bus portal" is intended to communicate either with an access of the same type or else with an apparatus of the type in accordance with the IEEE 1394 standard.

A "virtual bus portal" is intended to communicate solely with an analogue access from another communications device of the switched network.

FIG. 11 will make it possible to illustrate the circulation of control messages, in a communications network according to invention, which are intended for managing the connected mode, particularly with a view to the transmission of isochronous data between two peripherals situated respectively on buses which are separated from each other by the abovementioned switched network 590.

The arrows represented by solid lines illustrate the messages exchanged between the network modules and the various "virtual bus portals". It will be noted that all the "virtual bus portals" of the switched network 590 are concerned.

The arrows represented by dashed lines illustrate the messages of 1394 type, well known to the person skilled in the art, exchanged between "serial bus portals" and 1394 peripherals belonging to the respective buses. It will be noted that only the "serial bus portals" 521 and 524 are concerned.

It should be noted that, in FIG. 11, one of the peripherals 505 connected to the bus 541 is identified by the letter T (for "Talker"), and identifies the peripheral or node which wishes to send a stream of isochronous data, while another peripheral 514 connected to the bus 544, is denoted L (for "Listener"), and identifies the peripheral or node which will receive the isochronous data stream in question, after it has been transmitted by means of the switched network 590.

At the initiative of a user, a connection request order, "Join Request", described by reference to FIG. 8b is transmitted from the "serial bus portal" 523 denoted C (for "Controller"), called "controller" peripheral, intended for the "serial bus portal" 524 denoted TX.

The join request is conveyed on the switched network using a message-mode transfer 560 (non-connected). Thus the "serial bus portal" 523, associated with the node C transmits the message to its adjacent access (or "Adjacent Portal"), the "virtual bus portal" 528. The message is then transmitted in message-transfer (non-connected) mode from the "virtual bus portal" 528 to the "virtual bus portal" 529 denoted D. Finally, the "virtual bus portal" D transmits the join request, to its adjacent portal 524, denoted TX, connected to the bus 544 to which the node 514, denoted L, is also connected.

Finally the "serial bus portal" 524, denoted TX, determines whether it is to play the part of source node 505, denoted T, for the destination node 514, denoted L, by analysing the content of the join request.

Next, the "serial bus portal" TX has to reserve resources for an isochronous data stream on the local bus in question 544, addressing itself (request 581) to a peripheral 515 called IRM connected to this bus.

It will be noted that the buses 541 and 544 are regarded respectively as a first and a second bus in the sense of the present invention.

The peripheral IRM is an "isochronous resource manager".

The management of the isochronous resources on a local communications bus is described in the IEEE standard 1394-1395 (IEEE Computer Society, "Standard for High Performance Serial Bus", IEEE Standard 1394-1995, IEEE), and supplemented in the draft standard P1394a (IEEE Computer Society, "Draft Standard for High Performance Serial Bus (Supplement)", P1394a draft 4.0, September 1999).

The "serial bus portal" of the communications device TX will then open an input connection control register iPCR (for "input Plug Control Register"), in the destination peripheral L (request 582).

It will be noted that the connection control register denoted PCR is a concept described in the IEC-61883 standard (IEC—61883 "Consumer Audio-Video Equipment Digital Interface—Part 1: General", February 1998).

The "serial bus portal" TX then transmits the connection request to its "adjacent portal", denoted D, and which is found to be the "virtual bus portal" 529.

The "virtual bus portal" D transmits, in message mode 561, the join request intended for the "virtual bus portal" 526 denoted S.

The "virtual bus portal" S selects a path through to the "virtual bus portal" D from the predetermined routing table.

As illustrated in FIG. 17, the "virtual bus portal" S carries out the reserving of internal resources of the communications device with which it is associated, and particularly in the dual-port memory-storage unit 106 of FIG. 3a, this being done so as to allot a FIFO memory associated with the isochronous channel of the isochronous packets to be transmitted from the bus 541 to the switched network 590.

The "virtual bus portal" S then transmits, on the switched network, a message for setting up a connection (or "set-up message" in the terminology), the final destination of which is the "virtual bus portal" D.

In the example represented in FIG. 11, the path selected passes through the nodes or so-called intermediate communications devices denoted 525 and 532, and the abovementioned connection set-up message is represented respectively by the arrows denoted 562 to 564.

When the "virtual bus portal" D receives this set-up message, it reserves internal resources of the destination communications device with which it is associated, as described in FIG. 18, and particularly in the dual-port memory-storage unit 106 of FIG. 3a, so as to allocate an associated FIFO memory to the isochronous channel for the isochronous packets to be transmitted from the switched network 590 to the bus 544, intended particularly for the node 514 denoted L.

In the event of the connection being accepted, the "virtual bus portal" D transmits, via the switched network to the "virtual bus portal" S, a connection-confirmation message (or "Connect" message as the terminology has it), as indicated by the arrow denoted 565 in FIG. 11.

As soon as the "virtual bus portal" S receives this message, it informs each node or communications device of the switched network of the establishment of a new connection by means of a load-table update message, 562 to 572, broadcast to all the nodes of the said network 527, 528, 531, 529, 532, 525 and 530.

The "virtual bus portal" S transmits the join request to its "adjacent portal" LX. The analysis of the join request allows the "serial bus portal" 521, denoted LX to determine whether it is playing the part of the destination node 514, denoted L, for the source node 505, denoted T.

The "serial bus portal" LX then reserves isochronous resources on the local bus denoted 541, addressing itself (request 583) to an IRM peripheral connected to this bus and the function of which is the same as that of the peripheral 515 of the same name connected to the bus 544 mentioned above.

This resource-reserving step is carried out in the same way as that previously indicated for the other bus.

The "serial bus portal" LX will then (request 584) open an output connection control register oPCR (standing for "output Plug Control Register"), in the source peripheral 505, denoted T.

In this way, the signalling phase which precedes the transfer of isochronous packets via the switched network 590 is terminated.

FIG. 12 represents the structure of control messages exchanged between the modules 122 of the various nodes of the network which are intended for management of the connected mode.

In FIG. 12 can be seen, on four successive rows, the structures of the set-up, release, load-table update LinkTabLoad or LinkTabFree and connect messages.

The set-up message successively includes the fields:
- 1901, for identification of the type of message (setup, LinkTabLoad, LinkTabFree, Connect or Release),
- 1902, for connection identification on the switched network,
- 1903, for traffic description, representative of the service required; this field is representative of the information contained in the field 293 of the connection-setup order represented in FIG. 10,
- 1904, for data specific to the communications device, particularly making it possible to identify the bridge modules of the source or destination as well as the inter-bridge set-up request orders transmitted by the destination node, which is described in the fields 289 to 292 of the set-up order represented in FIG. 10,
- 1905, for the number of links which are using the path associated with the connection,
- 1906, for the situation of the link on which the message transits, on the path associated with the connection,
- 1907, for the descriptors of successive links of the path corresponding to the desired connection, and
- 1908, for protocol data.

The release message successively includes the fields:
- 1901, for identification of the type of message (set-up, LinkTabLoad, LinkTabFree, Connect or Release),
- 1902, for connection identification,
- 1909, for the cause of the release request,
- 1905, for the numbers of the links which are using the path associated with the connection,
- 1906, for the situation of the link on which the message transits, on the path associated with the connection,
- 1907, for the descriptors of successive links of the path corresponding to the desired connection, and
- 1908, for protocol data.

A load-table update message successively includes the fields:
- 1901, for identification of the type of message (set-up, LinkTabLoad, LinkTabFree, Connect or Release),
- 1902, for connection identification,
- 1903, for traffic description, representative of the service required,
- 1910, for information relating to the broadcast coverage tree employed,
- 1905, for the numbers of the links which are using the path associated with the connection,
- 1906, for the situation of the link on which the message transits, on the path associated with the connection,
- 1907, for the descriptors of successive links of the path corresponding to the desired connection, and
- 1908, for protocol data.

The connect message successively includes the fields:
- 1901, for identification of the type of message (set-up, LinkTabLoad, LinkTabFree, Connect or Release),
- 1902, for connection identification,
- 1911, for protocol data, capable of being used by the network module 122 of the source node,
- 1908, for protocol data.

FIGS. 13 to 16 describe the various algorithms employed by the network module 122 of each of the nodes depending on their role in establishing the connection. In the example of FIG. 11 it is thus possible to identify the roles of the various nodes of the switched network 590:

The communications device of the so-called source node incorporates the "virtual bus portal" 526, denoted S.
- the communications device of the so-called destination node incorporates the "virtual bus portal" 529, denoted D.
- the "virtual bus portals" 525 and 532 are elements of the communications devices associated with the so-called intermediate nodes.
- the "virtual bus portals" 527, 528, 530 and 531 are elements of the communications devices associated with the so-called adjacent nodes.

Figure 13:
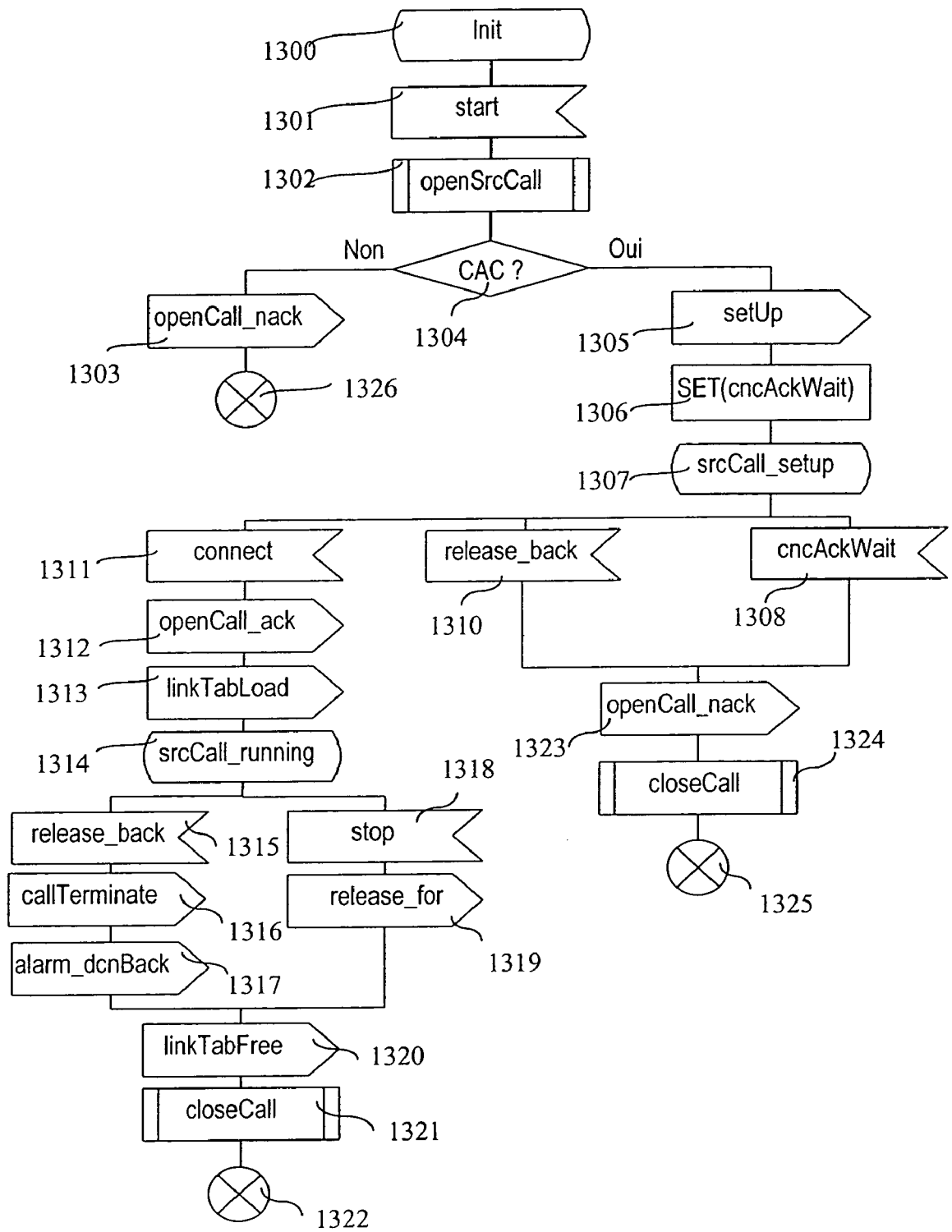

FIG. 13 represents an algorithm implemented by the network module 122 of the source node, for a transmission in connected mode.

As far as the network module 122 is concerned, after it has been in an initialisation state 1300, a join request is received in message mode in the course of an step 1301, via the interface module 121, originating from the network module of the destination node. The "traffic_descriptor" field 293 of this order described in FIG. 8b makes it possible to determine the service required for the connection envisaged, including the bandwidth and the transmission mode. The network module 122 of the source node then makes the selection of a path allocated to the connection, calculates the transmission parameters on the basis of the service required, then updates the load table if a path is available (FIG. 17), in the course of a step 1302.

Next, in the course of a test 1304, the network module 122 of the source node verifies whether the bandwidth necessary for the connection envisaged is available on the path selected, or not. This test procedure 1304 is known by the name of "Connection Admission Control" or just "CAC". When the result of the test 1304 is negative, in the course of an step 1303, the network module sends a connection-refusal error message.

Next, the resources associated with the management of the connection are released.

When the result of the test 1304 is positive, in the course of a step 1305, the network module sends the set-up message intended for the network module of the destination node, by way of each of the network modules of any intermediate nodes. This message describes the connection to be established (FIG. 12).

Next, in the course of a step 1306, a clock counter (or "timer") "cncAckWait" is initialised at a value which corresponds to a maximum period allowed for the connection requested to be established. The network module then places itself in a standby state for the response from the network as to the establishing of the connection, state 1307.

In this state 1307, three different events may occur, in the course of steps 1308, 1310 or 1311.

When, in the state 1307, the incoming message is a cncAckWait message originating from the zero-crossing of the value of the clock signal counter cncAckWait initialised in the course of the step 1306, step 1308, or when the incoming message is a release_back message, originating from the destination node or from one of any intermediate nodes, step 1310, step 1323 is carried out, or the network module sends a connection-refusal error message.

Following the step 1323, in the course of a step 1324, the network module of the source node carries out updating of the load tables associated with the connection which has been rejected. Then, in the course of a step 1325, the resources associated with the management of the connection are released.

Finally, when, in the state 1307, the incoming message is a connection message connect (FIG. 12), originating from the destination node, step 1311, following which it notifies the bridge module of the establishing of the connection and of the reserving of the resources, via the interface ctrl14 of FIG. 4 (step 1312). In the course of step 1313, the network module broadcasts a message LinkTabLoad particularly including the description of the service required, the bandwidth used as well as the description of the path corresponding to the connection, in terms of links. This message is broadcast for all the nodes of the network, which has the effect that each node of the network updates its load tables. The broadcasting of this message is carried out by following a predetermined spanning tree which is associated with the switched network.

The network module of the source node then places itself in state 1314 in the course of which it awaits a change in the connection which allows the transfer of isochronous packets from the bus 541 to the switching network 590 (FIG. 11) via the memory-storage unit of the communications device associated with the "virtual bus portal" 526.

Two messages can then enter the network module, in the course of steps 1315 and 1318.

When, in state 1314, the incoming message is a release message originating from another node of the network release back, step 1315, the network module of the source node sends a communication-termination message callTerminate, release_ind via the interface denoted ctrl14 in FIG. 4, intended for the bridge module (step 1316), in order to inform it of the closure of the connection.

Next, the network module 122 sends an alarm message alarm_dcnBack (step 1317) intended for the bridge module 123 of the source node, which has the effect of triggering the processing of an alarm by this processing means since the connection has been interrupted abnormally. The network module then broadcasts, to all the other nodes of the network, a message for updating load tables LinkTabFree, particularly including the description of the service required and of the path corresponding to the connection, in terms of links (step 1320).

The network module then carries out an step 1321, identical to step 1324, then a step 1322 in the course of which the resources associated with the management of the connection are discarded.

When, in state 1314, the network module receives a connection release order (release request) in message mode, originating from the network module of the destination node (step 1318), the network module sends a release message (FIG. 12), step 1319, then carries out the steps 1320, 1321 and 1322.

Figure 14:
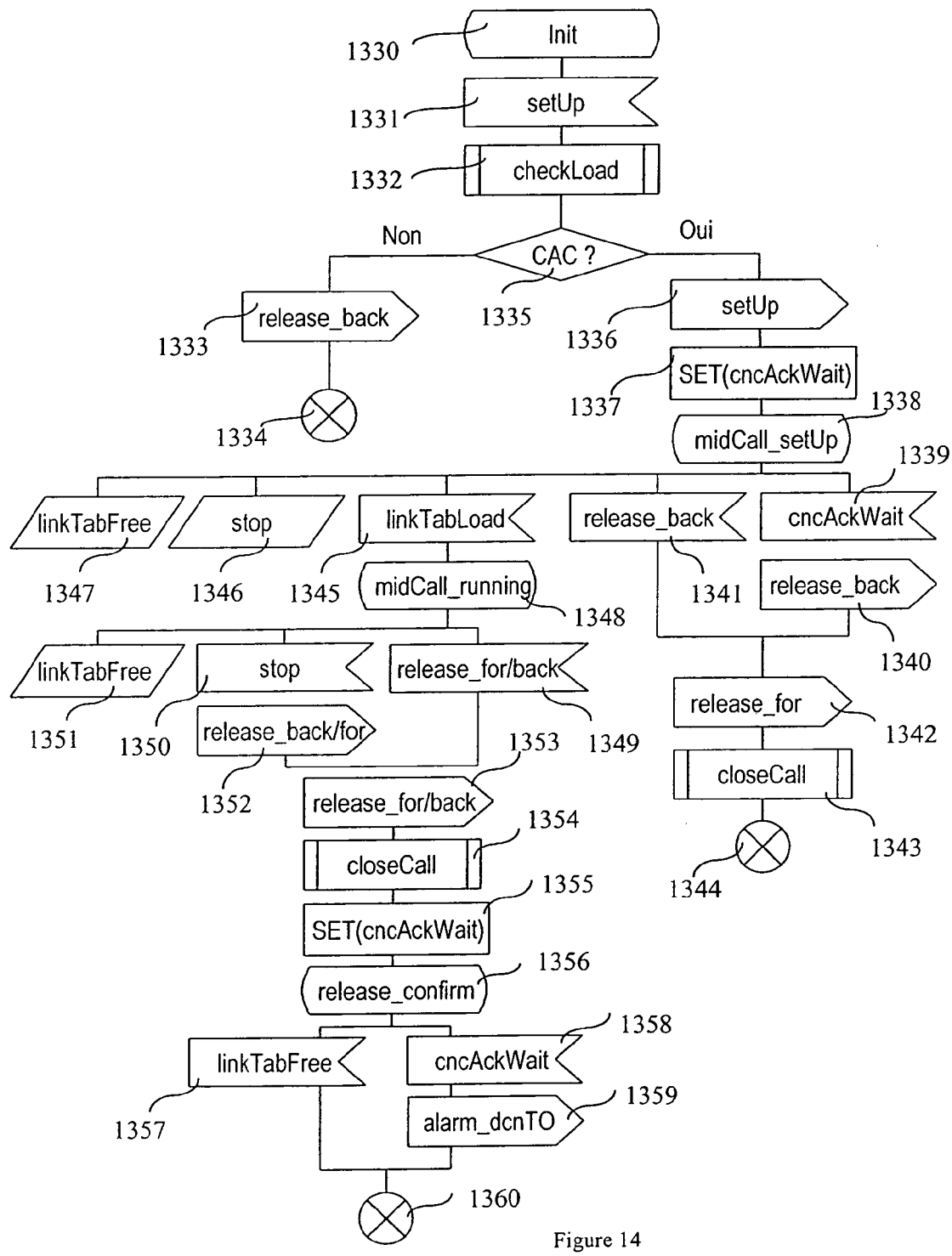

FIG. 14 represents an algorithm implemented by the network module 122 of an intermediate node, for a transmission in connected mode.

As far as each intermediate node is concerned, after having been in an initialisation state 1330, an incoming set-up message (FIG. 12) is received in the course of a step 1331, on the part of a source node (see step 1305 in FIG. 13). The service required for the connection in question is then extracted from this set-up message. The network module of the intermediate node then calculates the transmission parameters, on the basis of the service required, then, if the load is acceptable, updates its load tables in the course of a step 1332, detailed on FIG. 26.

Next, in the course of a test 1335, the network module of the intermediate node determines whether or not the bandwidth necessary for the connection envisaged is available on the path selected (see test 1304).

When the result of the test 1335 is negative, in the course of a step 1333, the network module of the intermediate node sends a connection-release message release_back intended for the source node (see step 1310 in FIG. 13). Next the network module of the intermediate node releases the resources associated with the management of the connection in question, step 1334.

When the result of the test 1335 is positive, in the course of an step 1336, the network module sends an initialisation set-up message intended for the network module of the destination node, by way of each of the network modules of any intermediate nodes remaining to be crossed. This message is sent after updating of the field identifying the position of the node in the path, on the basis of the description of the path in terms of links (see FIG. 12).

Next, in the course of a step 1337, the clock counter cncAckWait is initialised at a value which corresponds to the maximum duration allotted for establishing the connection. The network module then places itself in state 1338 for awaiting the response from the network as to the establishing of the connection.

In this state 1338, five different events may occur, in the course of steps 1339, 1341, 1345, 1346 and 1347.

When the incoming message is a cncAckWait message originating from the zero-crossing of the value of the clock-signal counter cncAckWait initialised in the course of step 1337 (step 1339), the network module sends a release message (step 1340), intended for the destination node, by way of any other intermediate nodes which separate it from the destination node, and sends a release_back message, intended for the source node, by way of any other intermediate nodes which separate it from the source node (step 1342). Next, in the course of a step 1343, the network module of the intermediate node in question updates the load tables associated with the connection which has been rejected. In the course of a step 1344, the resources associated with the management of the connection are then released.

When the incoming message is a release message, originating from any other source node or from an intermediate node between the source node and the intermediate node in question, (step 1341), the network module carries out the steps 1342 to 1344.

When, in the state 1338, the incoming message is a LinkTabFree message (step 1347), this message is stored in memory and the network module remains in state 1338.

When, in state 1338, the incoming message is an end-of-connection request message sent by the bridge module 123 of the node in question (step 1346), this message is stored in memory and the network module remains in state 1338.

Finally, when the incoming message is a LinkTabLoad message, especially including the description of the service required, as well as the description of the path in terms of links, originating from the source node (see step 1313 in FIG. 13), step 1345, the network module places itself in a state 1348 in the course of which it awaits a change in the connection and transmits all the data intended to be transmitted in connected mode, on the connection put in place.

It is observed here that the LinkTabLoad message has the function, as regards an intermediate node (and the destination node), of confirming the establishing of the connection, in the course of step 1345.

In state 1348, three events may occur, in the course of steps 1349, 1350 and 1351.

When, in state 1348, the incoming message is a LinkTabLoad message, step 1351, this message is stored in memory and the network module remains in state 1348.

When, in state 1348, the incoming message is a release message, step 1353 which will be described later is performed.

Finally, when, in state 1348, the incoming message is an end-of-connection request message, sent, for example, by the bridge module 123 of the node in question (step 350), the network module sends a release_back message intended for the source node (step 1352), by way of each of any other intermediate nodes which separate the intermediate node in question from the source node.

Following one of the steps 1349 or 1352, the network module, in the course of an step 1353, sends a release message intended for the destination node, by way of each of any other intermediate nodes which separate the intermediate node in question from the destination node.

The network module then carries out an step 1354 identical to step 1324, then an step 1355 in the course of which the clock counter cncAckWait is initialised at a value which corresponds to the maximum duration allotted for releasing the connection. The network module then places itself in state 1356 to await the response of the network as to the releasing of the connection.

In state 1356, two messages may arise, in the course of steps 1357 and 1358.

When the incoming message is a LinkTabFree message, step 357, the resources associated with the management of the connection are released in accordance with step 360.

When, in state 1356, the incoming message is a cncAckWait message originating from the zero-crossing of the value of the clock-signal counter cncAckWait initialised in the course of step 1355 (step 358) the network module sends an alarm message alarm_dcnTO (step 359) intended for the bridge module of the node in question, which has the effect of triggering the processing of an alarm by this processing means since the connection has not been released in the normal way.

Following one of steps 1357 or 1359, the resources associated with the management of the connection are released, in accordance with step 360.

Figure 15:
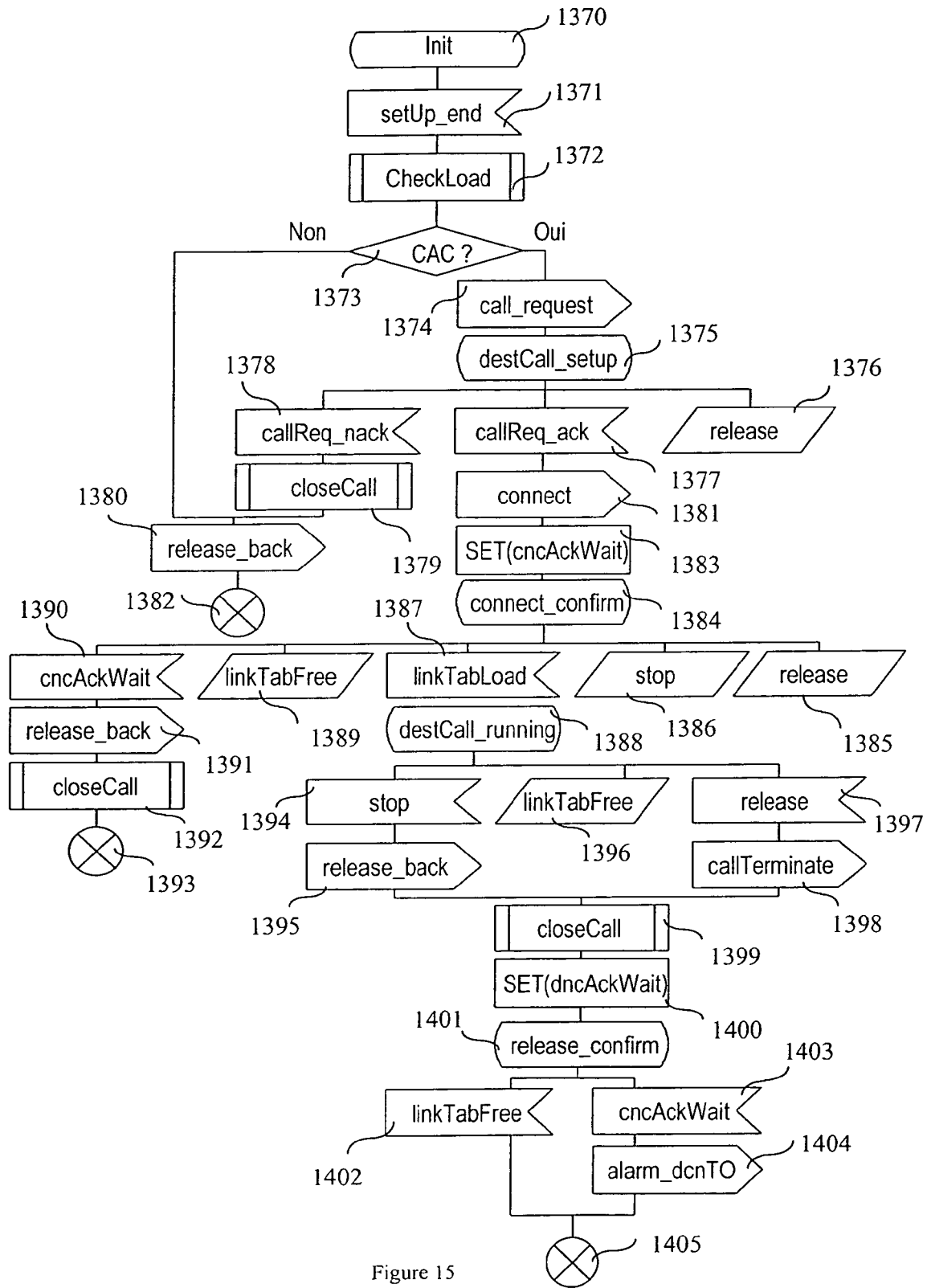

FIG. 15 represents a flowchart implemented by the network module 122 of the destination node, for a transmission in connected mode.

As far as the destination node is concerned, after having been in an initialisation state 1370, an incoming "setUp_end" message is received in the course of a step 1371, on the part of the source node or of an intermediate node. The network module of the destination node then extracts the service required (step 1371), then calculates the transmission parameters on the basis of the service required, and, if the load is acceptable, updates the load table, in the course of a step 1372 similar to the step 1332 described with reference to FIG. 14.

Next, in the course of a test 1373, the network module of the destination node determines whether or not the bandwidth necessary for the connection envisaged is available on the selected path (see tests 1304 and 1335 on the respective FIGS. 13 and 14).

When the result of the test 1373 is negative, in the course of a step 1333, the network module of the destination node sends to the source node and to all of any intermediate nodes, such as the node 22 of the network of FIG. 1, a release_back message, in the course of a step 1380. Next, the resources associated with the management of the connection are released (step 1382).

When the result of the test 1373 is positive, the network module of the destination node sends the bridge module of the same node a connection-request message ("connect_ind"), in the course of a step 1374.

Next, the network module places itself in state 1375 to await the response from the bridge module.

In the state 1375, three events may occur, in the course of steps 1376, 1377 and 1378.

When the incoming message is a release message, originating from the source node or from one of the intermediate nodes, it is stored in memory in the course of step 1376.

When, in state 1375, the incoming message is an unfavourable response "callReq_nack", corresponding to a negative "connect_ans" message, originating from the bridge module (step 1378) in the course of an step 379, the network module updates the load tables associated with the connection which has been rejected.

Steps 1380 and 1382 are then performed.

Finally, when, in state 1375, the incoming message is a favourable message "callReq_ack", corresponding to a positive connect_ans message, originating from the bridge module of the destination node (step 1377), the network module sends a connect message, directly to the source node. The routing information representative of the path used by the message is determined by the network module from the routing table described with reference to FIG. 8*a*.

Next, in the course of an step 1383, the clock counter cncAckWait is initialised at a value which corresponds to a maximum period allotted for establishing the connection request. The network module then places itself in the standby state for the response from the network as to the establishing of the connection, state 1384.

In this state 1384, five events may occur in the course of steps 1385, 1386, 1387, 1389 and 1390.

When the incoming message is a release message, originating from the source node or from one of the intermediate nodes, it is stored in memory in the course of step 1385.

When, in state 1384, the incoming message is a load-table update message (LinkTabFree), originating from the source node, it is stored in memory in the course of step 1389.

When, in state 1384, the incoming message is an end-of-connection request message originating from the bridge module of the node in question, it is stored in memory in the course of step 1386.

When, in state 1384, the incoming message is a cncAckWait message, originating from the zero-crossing of the value of the clock-signal counter cncAckWait initialised in the course of step 1383 (step 1390) the network module sends arelease_back message, step 1391, intended for the intermediate node or nodes and for the source node.

Next, in the course of a step 1392, the network module of the destination node updates the load tables associated with the connection which has been rejected. Then, in the course of a step 1393, the resources associated with the management of the connection are released.

Finally, when in state 1384 the incoming message is a LinkTabLoad message, the message particularly including the description of the service required as well as the description of the path in terms of links (message for the purpose of confirming the establishing of the connection), in accordance with step 1387, the network module of the destination node places itself in a state 1388 to await a change in the connection.

It is observed here that the LinkTabLoad message has the function, as regards an intermediate node, of confirming the establishing of the connection.

In state 1388, three events may occur, in the course of steps 1394, 1396 and 1397.

When, in state 1388, the incoming message is a LinkTabFree message, originating from the source node, it is stored in memory in the course of step 1396.

When, in state 1388, the incoming message is a release message (step 1397), the network module gives the notification "callTerminate", corresponding to a "release_ind" message of the breaking-off of the connection to the bridge module of the destination node (step 1398). Next, step 1399 which will be described later is performed.

Finally, when, in state 1388, the incoming message is an end-of-connection request message sent by the bridge module of the node, step 394, the network module sends a release_back message intended for the source node and for the intermediate nodes in accordance with step 1395.

Following one of the steps 1394 or 1398, the network module carries out an step 1399 identical to step 1324 in FIG. 13, then a step 1400 in the course of which the clock counter cncAckWait is initialised at a value which corresponds to the maximum duration allotted for the releasing of the connection. The network module then places itself in state 1401 to await the response of the network as to the releasing of the connection in the same way as for the intermediate nodes.

In state 1401, two messages may occur, in the course of steps 1402 and 1403.

When the incoming message is a LinkTabFree message, step 1402, the resources associated with the management of the connection are released, step 1405.

When, in state 1401, the incoming message is a cncAckWait message originating from the zero-crossing of the value of the clock-signal counter cncAckWait initialised in the course of step 1400 (step 1403) the network module sends an alarm message "alarm_dcnTO" (step 1404) intended for the bridge module, which has the effect of triggering the processing of an alarm by this processing means since the connection has not been released in the normal way.

Following one of steps 1402 or 1404, the resources associated with the management of the connection are released, in accordance with step 1405.

Figure 16:
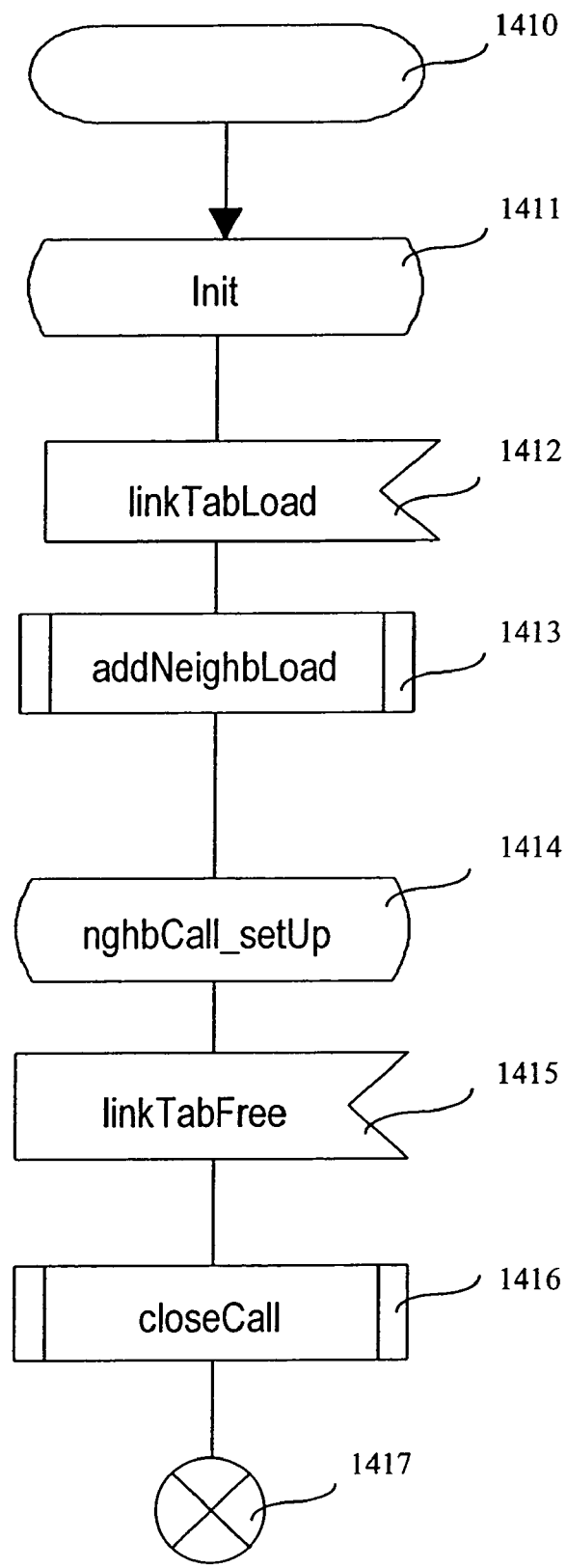

FIG. 16 represents an algorithm implemented by the network module 122 of an adjacent node, for a transmission in connected mode.

As far as each adjacent node is concerned, after having been in an initialisation state 1411, the network module of the adjacent node receives a LinkTabLoad message, particularly comprising the description of the service required as well as the description of the path in terms of links (step 1412).

Next, in the course of a step 1413, the network module of the adjacent node calculates the transmission parameters on the basis of the service required then, independently of the load, updates the load table.

Next, in state 1414, the network module of the adjacent node awaits a change in the connection. Next, in the course of a step 1415, it receives a LinkTabFree message relating to the connection, the message particularly comprising the description of the service required as well as the description of the path in terms of links.

Next, in the course of a step 1416, the network module of the adjacent node updates the load tables associated with the connection which has been released, then, in the course of a step 1417, the resources associated with the management of the connection are released.

It will be observed here that the LinkTabLoad message has, as regards an adjacent node, the function of informing it of the establishing of the connection.

Hence the procedure illustrated here corresponds rather to a notification than to a control of admission.

FIG. 17 represents an algorithm implemented by the "virtual bus portal" 526 of the source node of FIG. 11 which makes it possible to determine the path availability for establishing a connection, which corresponds, in FIG. 13, to step 1302 of the algorithm.

The network module takes account of the description of the service required established by the application or the peripheral which sends the message, in the course of a step 2302.

Next, the network module makes the choice of the most available path, in the course of the step 2304, on the basis of the routing table described by reference to FIG. 8a, then determines the connection identifier of the field 1902 of the signalling messages represented in FIG. 12.

In the course of a test 2305, the network module of the source node determines whether or not a path is available in the course of step 2304.

When the result of the test 2305 is negative, the network module demands that the procedure for setting up the connection be stopped, in the course of an step 2306. When the result of the test 2305 is positive, the network module calculates the transmission parameters, in particular the bandwidth, the size of the packets transmitted, the rates (sending frequencies) of packets and the priority of the communication corresponding to the fields 1111 to 1113 illustrated in FIG. 21, by making use of the load table, in the course of a step 2303.

Then, in the course of a step 2307, the network module:
allocates a FIFO memory, called sending memory, in the memory-storage unit 106 associated with the isochronous channel number for the packets of isochronous type to be transmitted from the bus 541 (FIG. 11), specifying the previously calculated transmission parameters to the packet-scheduling unit 109 (reservation of the virtual channel),
causes the size of the packets to vary as a function of the change in the load on the paths which interfere with the path for which a new connection has just been established, as well as the packet rate on the said paths, and updates its load table (FIG. 8a) for the said paths.

It will be noted that, from this moment, the transfer of the isochronous packets from the serial bus 541 to the switched network 590, via the memory-storage unit 106, is allowed since all the resources necessary for this transfer have been reserved.

Next, in the course of a step 2308, the network module demands that the setting-up of the connection be continued.

The step 1302 of the algorithm of FIG. 13 is then terminated.

FIG. 18 represents an algorithm implemented by the "virtual bus portal" of the intermediate nodes 525 and 532, or of the destination node 529 of FIG. 11, which allows determination of the path availability for establishing a connection, which corresponds, in FIGS. 14 and 15, to the steps 1332 and 1372 of the algorithms in question.

First of all, the network module obtains the description of the path via the fields 1905, 1906 and 1907, and of the required service associated with the new connection, by reading the field 1903 of the set-up message described in FIG. 12 originating from the source node (step 1305 of FIG. 13), in the course of a step 2402.

Next, the network module verifies the availability of the path on the basis of the service required, in the course of step 2404, making use of the load table.

In the course of a test 2405, the network module of the node in question determines whether or not the path is available in the course of the step 2404.

When the result of the test 2405 is negative, the network module requests the procedure for setting up the connection, in the course of an step 2406. When the result of the test 2405 is positive, the network module calculates the transmission parameters, in particular the bandwidth, the size of the packets transmitted, the packet rates (sending frequencies) and priority of the communication, making use of the load table (FIG. 8a), in the course of a step 2403.

Reservation of internal resources is carried out during this step and the network module behaves as a reservation means within the meaning of the invention.

In the case of the destination node, the network module associated with the "virtual bus portal" 529 allocates a FIFO memory known as receiving memory in the memory-storage unit 106 associated with the isochronous channel number for the isochronous-type packets to be sent on the bus 544 (FIG. 11). It will be noted that, from that moment, the transfer of the isochronous packets from the switched network 590 to the serial bus 544, via the memory-storage unit 106, is allowed since all the resources necessary for this transfer have been reserved.

Next, in the course of a step 2407, the network module updates its load table, which amounts to reserving the resources necessary for the connection envisaged, then, in the course of a step 2408, it continues with setting up the connection. At the end of one of the steps 2406 or 2408, the corresponding step of the algorithms of FIGS. 14 and 15 is terminated.

The updating of the load table is accompanied by an updating of the transmission parameters associated with the existing transfers representative of the outgoing traffic for the node in question, through the value of the fields 1111 to 1113, in the case of the connected traffic and 1111, 1113, 1115, 1116 in the case of the non-connected traffic.

FIG. 19 represents an algorithm implemented by the "virtual bus portal" of the adjacent nodes 527, 528, 530 and 531 (FIG. 11) which allows the path availability to be determined for establishing a connection, which corresponds, in FIG. 16, to the steps 1413.

The network module, first of all, obtains the description of the path through the fields 1905, 1906 and 1907, and of the service required (field 1903) associated with the new connection, by reading the Link-TabLoad message (FIG. 12) originating from the source node (step 1313), in the course of a step 2502.

Next, the network module makes a choice of the transmission parameters, in particular of the bandwidth, the size of the packets transmitted, the packet rates (sending frequency) and the priority of the communication, by making use of the load table, in the course of a step 2503. Then, in the course of step 2504, the network module updates its load table. At the end of step 2504, the functions for setting up the connection, by the adjacent node, are terminated.

The description will now be given, by reference to FIG. 20, of the transmission method according to the invention for the data packet originating from the serial communications bus, for example the bus 541 of FIG. 11, and intended for the switched network 590.

As already stated above, the serial communications bus defines a cycle time as a period of time corresponding to an interval at which the isochronous data packets are repeatedly transmitted in the serial bus.

The method according to the invention is implemented within the communications device or node 90 forming part of the switched network 590 and consisting of the "serial bus portal" 521 and of the "virtual bus portal" 526 according to the invention, here called source device or node, and which possesses the structure of the node of FIG. 3a.

In this embodiment, the bus 541 is regarded in the sense of the invention as a first network conveying data packets of isochronous and asynchronous types, and the switched network 590 is regarded as a second network in the sense of the invention.

The source node is able, according to the invention, to transmit isochronous and asynchronous data packets from the bus onto the switched network by making a reserving of resources which is suitable for the types of packets intended for the switched network.

Depending on the type of packets in question, the source node will behave differently as will be explained below.

To summarize, the reserving of resources is carried out in a plurality of modes which includes for instance two modes when considering reserving of resources internal to the communications device.

In a first mode, data storing capacity is reserved in the communications device for storing the isochronous data packets before the isochronous data packets are transmitted via said communications device.

The reservation is prepared for a series of isochronous data packets transferred in a plurality of cycle times.

In a second mode, data storing capacity is reserved in the communications device for storing an asynchronous data packet after said communications device receives the asynchronous data packet.

The latter reservation is prepared for each received asynchronous data packet.

It should be noted that the source node is also able, like all the nodes of the switched network, to transfer data packets coming from other nodes of the switched network to one or more nodes of this network.

FIG. 20 represents the processing algorithm implemented by the control module 107 upon reception of a 1394 packet originating from the bus 541 of FIG. 11 by way of the interfacing means 103 of FIG. 3a.

The control module 107 first of all waits for a new packet of the type in accordance with the IEEE 1394 standard to be received, in accordance with step 200 of the algorithm of FIG. 20.

In the course of the following step 201, the module 107 reads the header of the 1394 packet stored in the GRF FIFO memory of the means 103 via the interface ctrl3 and the data bus 112. This will particularly make it possible to determine the type and the size of the packet received.

In the course of a subsequent step denoted 202, provision is made to determine the type of the packet received and, more particularly, to analyse one of the fields called "tcode" of the 1394 data packet so as to verify whether it is an isochronous-type packet which is involved.

The field "tcode" is denoted 284 in FIG. 8b or 403 in FIG. 10.

If it is an isochronous packet which is involved, then step 202 is followed by a step 203 and, if it is not an isochronous-type packet which is involved, then step 202 is followed by a step 207.

In the course of step 203, a test is performed so as to discover whether resources external to the node have been reserved on the switched network, that is to say whether a connection has been provided for a transmission in connected mode. More precisely, the test consists in searching for the number of the channel of the isochronous packet with a view to determining whether it is a so-called "local" packet, that is to say one intended for the node itself.

If the isochronous packet is "local", it is then intended for the bridge module 123 of FIG. 4 and step 203 is followed by a step 213 which will be described later.

In contrast, if a channel number for the isochronous packet has already been identified as having been allocated for the transmission of the packet on the network, then the packet is said to be "remote" and that means that resources have been reserved on the switched network before reception of the isochronous packet, as well as resources internal to the source node.

This prior reserving of resources forms part of a mechanism for determining an available path on the switched network and has been explained before by reference to FIGS. 13 to 19.

The reservation of internal resources on sending, described by step 2303 of FIG. 17, itself consists in selecting one or more memory areas of the memory-storage unit 106 constituting a so-called sending FIFO memory and in associating this sending FIFO memory with the resources reserved on the switched network, namely, for example, the isochronous channel number.

Hence, in the course of step 204 the size (field 400 described in FIG. 10) of the isochronous packet is stored (fields 335 to 337 of the stream mode described in FIG. 6) in the sending FIFO memory previously associated with the isochronous channel number.

In the course of step 205, the header of the isochronous packet is stored in the sending FIFO memory previously associated with the isochronous channel number.

In this case, step 205 is followed by a step 206 in the course of which provision is made to transfer the rest of the isochronous packet from the GRF FIFO memory of the means 103 to the dual-port memory-storage unit 106 and to write the packet in its entirety into the sending FIFO memory previously associated with the isochronous channel number.

Following step 206, the control module 107 again waits to receive the next 1394 packet in the course of step 200.

If the packet received is not of isochronous type (step 202), in the course of a subsequent step denoted 207, provision is made to determine whether the packet received is of the "cycle start" type. If so, step 208 is performed otherwise step 213 is performed.

Step 213 consists in informing the bridge module 123 of the reception of a 1394 packet by triggering an interrupt on the principal bus 100. Next, step 200 of waiting for packets is again executed.

In contrast, if a packet of "cycle start" type has been received, then step 208 is executed.

Step 208 consists in carrying out synchronisation steps.

The following step 209 consists in verifying whether there exists a so-called reception FIFO memory belonging to the memory-storage unit 106 awaiting the transfer of an isochronous packet intended for the bus 541 of FIG. 11 by way of the interfacing means 103 of FIG. 3a.

This reservation of internal resources on reception, described by step 2403 of FIG. 18, itself consists in selecting one or more memory areas of the memory-storage unit 106 constituting a so-called reception FIFO memory and in associating this reception FIFO memory with the resources reserved on the switched network, namely, for example, the isochronous channel number. This reservation of internal resources on reception falls within the more general context of reserving resources in advance, which forms part of a mechanism for determining a path available on the switched network, explained above by reference to FIGS. 13 to 19.

If yes, the isochronous size (fields 335 to 337 of the stream mode described in FIG. 6) of the isochronous packet to be sent (fields 330 to 334 of the stream mode described in FIG. 6) is read in the course of the following step 210.

Next, in the course of step 211, the header of the isochronous packet is transmitted from the memory area of the unit 106 to the ITF FIFO memory of the interfacing means 103. The write step on the header may possibly be accompanied by an alteration of the "CIP_header" field denoted 406 in FIG. 10 which describes an isochronous packet.

Finally, the rest of the isochronous packet is transferred to the ITF FIFO memory of the interfacing means 103 in the course of step 212.

After executing step 212, step 209 is performed so as to verify that no other FIFO memory exists awaiting a packet transfer in the memory-storage unit 106.

Transfer Onto the Switched Network

In FIG. 21, a table 1100 is seen, including three rows 1101, 1102 and 1103, each of the rows including virtual-channel specifications 1105 to 1110. This table is stored in the data-packet scheduling unit or SAR module 109.

It is reiterated here that each virtual channel is a logic entity associated with a communication between two communications devices and representative of a transfer in control mode, in message mode, or else in stream mode. For the same transfer, the virtual channel number is constant and is associated, on the one hand, with a sending FIFO memory in the memory-storage unit 106 of the source node and, on the other hand, with a receiving FIFO memory in the memory-storage unit 106 of the destination node.

In practice, the number of the sending FIFO memory is determined on the basis of the virtual channel number. On reception, a number of the FIFO memory is associated with each pair of values describing, on the one hand, the virtual channel number and, on the other hand, the identifier of the sender node. The virtual channel number, as well as the identifier of the sender node, are thus present in each packet header as described on the basis of FIGS. 5, 6 and 7.

In the table of FIG. 21, it has been chosen to represent two virtual channels for each level of priority, for reasons of clarity. However, for each priority level, the number of virtual channels may vary from zero to a predetermined number.

Each of the virtual channel specifications includes:
information representative of the size "spec_L" 1111 of the data packets associated with the channel in question;
information representative of the number of packets to be sent "spec_CP" 1112 during the primary time interval in question;
information representative of the duration "spec_CT" 1113 of the primary time interval in question;
information representative of the priority level (high, medium or low) "spec_prio" 1114 associated with the channel;

information "dyn_CP" 1117 representative of the number of packets actually sent on the virtual channel, during the primary time interval in question;

information "dyn_CT" 1118 representative of the number of secondary time intervals elapsed during the primary time interval in question; and information "VC_state" 1119 representative of the state taken by the virtual channel in question, "free", "active" or "asleep" (see FIG. 12); and information "references" 1120 representative, on the one hand, of the number of the FIFO memory in the memory-storage unit 106 in which the data to be transmitted are stored and, on the other hand, the value of the packet header field particularly containing the information representative of the path to be travelled by the packet, or routing information.

Moreover, the specifications of the low-priority level include:

information "spec_CPmin" 1115 representative of the minimum value of the number of packets to be sent "spec_CP" 1112;

information "spec_CPmax" 1116 representative of the maximum value of the number of packets to be sent "spec_CP" 1112, this so as to make it possible to reduce the value of "spec_CP" 1112 in the course of step 1218 of the algorithm of FIG. 22 or to increase it in the course of the step 1215 of this same algorithm, within the limits of these boundaries "spec_CPmin" 1115 and "spec_CPmax" 1116.

Finally, each row, or priority level, is allocated information "prio_state" 1121 representative of the state taken by all the virtual channels of the priority level in question: when there is no channel at the priority level in question, the priority level is "free", when all the channels of the priority level are in an "asleep" state, the priority level is itself in an "asleep" state, and in the other cases the priority level is "active".

The table of specifications and of priorities 1100 is constructed by placing:

on the first row 1101 ("high" priority level) all the virtual channels allocated to transmissions in connected mode of "deterministic real-time" type (or "predictive real-time" type, as the terminology has it);

on the second row 1102 ("medium" priority level) all the virtual channels allocated to transmissions in connected mode of guaranteed real-time type;

on the third row 1103 ("low" priority level) all the virtual channels allocated to transmissions in non-connected mode (known by the names of "asynchronous and "elastic").

For example, the isochronous-type 1394 packets transporting traffic of DV type (the term standing for "Digital Video") will be sent by using virtual channels with "high" priority level. The 1394 isochronous-type packets transporting traffic of MPEG-2 type will be sent by using virtual channels of "medium" priority level. In contrast, in general, the asynchronous-type 1394 packets will be sent by using virtual channels of "low" priority level. In certain cases, for example for sending inter-bridge commands, the asynchronous packets may be sent with the priority of the transfers in control mode, that is to say in a higher-priority manner than the transfers associated with the "high" priority level.

Hence, all the nodes each have available a table of priorities relating to the traffic which they can generate, and each concerns itself with the messages of which it is the source (a principle known by the name of "outgoing traffic" principle).

It is observed here that the transmission parameters are determined by a loadcontrol means on the basis of the contents of a load table. Consequently, the transmission parameters associated with the high- and low-priority virtual channels 1101 and 1102 are calculated on the basis of a knowledge, a priori, of all the connected traffic whereas the transmission parameters associated with the low-priority virtual channels 1103 are estimated on the basis of a knowledge limited to the non-connected traffic leaving the node in question. The initialisation of these registers is carried out by the network-control module 122 via the communications interface module 120.

FIG. 22 represents a functional algorithm for sending packets in connected and non-connected modes. This algorithm is implemented by the data-scheduling unit 109.

The principle of the step used is that the order of sending of the packets is based on the filling of a primary time interval IT-P, which itself comprises secondary time intervals IT-S.

Following the step of initialisation 1201 by re-setting all the variables to zero, a test 1202 determines whether a secondary time interval has elapsed, the start of a secondary time interval being determined on the basis of a real-time clock, not represented. When the result of the test 1202 is positive, in the course of a step 1203, the unit 109 is placed at the start of the table of specifications and of priorities represented in FIG. 21.

Next, in the course of step 1204, the information "dyn_CT" 1118 of the virtual channel in question is decremented. Then, in the course of a test 1205, the unit 109 determines whether or not the value of the information "dyn_CT" 1118 of the virtual channel in question is equal to zero. When the result of the test 1205 is positive, that is to say at the end of a primary time interval, in the course of a test 1217, the unit 109 determines whether or not the value of the information "dyn_CP" 1117 of the virtual channel in question is equal to zero. The test 1217 thus corresponds to each start of a new primary time interval IT-P.

When the result of the test 1217 is negative, in the course of step 1218, the unit 109 manages the priorities in the following way:

for the deterministic traffic, in high priority, the packets not transmitted during the required time interval, which are equal in number to the value "dyn_CP" 1117, are deleted (loss of packets) then, the value "dyn_CP" 1117 is set to zero, and for the guaranteed traffic, at medium priority, the packets not transmitted during the time interval are kept and the value "dyn_CP" 1117 keeps its value, and for the elastic traffic, at low priority, the bandwidth is reduced, by decrementing the value "spec_CT" 1112 within the limits of the authorised boundaries.

Following the step 1218, or when the result of the test 1217 is positive, a step 1206 is performed.

In the course of the step 1206, the transmission parameters and specifications are updated (see FIG. 21):

for the "low" priority level, the information 1111 is updated at the end of each primary time interval on the basis, on the one hand, of the actual load on the network determined in the course of step 1215, and, on the other hand, on the basis of the values of the fields 1114 and 1115.

the value of the information "dyn_CP" 1117 is incremented by the value of information "spec_CP" 1112, the value of the information "dyn_CT" 1118 is incremented by the value of the information "spec_CT" 1113, the value of the information "VC_state" 1119 changes from the "asleep" state to the "active" state.

Following the step 1206, or when the result of the test 1205 is negative, an step 1207 consists, in the case of the unit 109, in looking at the next virtual channel in the table of specifications and of priorities.

Next, the test 1208 determines whether or not the end of the table of specifications and of priorities has been exceeded. When the result of test 1208 is negative, the steps 1204 to 1207 are reiterated. When the result of test 1208 is positive, that is to save a secondary time interval has elapsed, a test 1219 determines whether a transfer of control type should take place. When the test 1219 is positive, the unit 109 requests the sending of the control-type packet to the module 107 (as described during step 1210) in the course of step 1220, otherwise test 1209 is performed.

During step 1220, the sending of a packet is carried out.

Test 1209 determines whether or not the list of the virtual channels of "high"-priority level possesses status information "prio_state" 1120 at the "active" value. When the result of the test 1209 is positive, in the course of an step 1210, depending on the contents of the corresponding "references" field 1120, the unit 109 requests, from the control module 107, the sending of the packet from the memory-storage unit 106 to the switching unit 108. The sequence of the steps implemented by the control module 107 for sending a packet between the memory-storage unit 106 and the switching unit 108 is more fully described by reference to FIG. 23. The unit 109 then updates the specifications of the virtual channel allowing the packet in question to be sent, in the following way:

the information "dyn_CP" 1117 is decremented,
if the information "dyn_CP" 1117 is equal to zero, the value of the information "VC_state" 1119 takes the value "asleep", and the next virtual channel with the same level of priority is considered and, if there is no other virtual channel with the same level of priority, the level of priority has its "prio_state" information 1120 take the value "asleep".

In reality, the sending of the packet is terminated only when the next intermediate node has acknowledged the flow control which it has applied to the data of the said packet, as is described in the standard IEEE-1355 and implemented by the interfacing means 104.

It will be noted here that conflicts of access to the transmission resources (the communications links) are detected by the packet-transmission protocol, which is, for example, in accordance with the IEEE-1355 standard and relayed directly during each packet-sending phase 1220, 1210, 1212 and 1214. The invention thus makes it possible to limit the effects of these access conflicts in order to distribute access to the resources equitably among the various nodes of the network, while guaranteeing a quality of service specified by the service required.

When the result of the test 1209 is negative, a test 1211 determines whether or not the list of the virtual channels of "medium" priority level possesses "prio_state" 1120 information at the "active" value. When the result of the test 1211 is positive, in the course of a step 1212, the unit 109 asks for the packet to be sent to the control module 107 (as described during step 1210) in guaranteed real-time connected mode, and updates the specifications of the virtual channel making it possible to send the packet in question, in the following way:

the information "dyn_CP" 1117 is decremented,
if the information "dyn_CP" 1117 is equal to zero, the value of the information "VC_state" 1119 takes the value "asleep", and the next virtual channel with the same level of priority is considered and, if there is no other virtual channel with the same level of priority, the level of priority has its "prio_state" information 1120 take the value "asleep".

When the result of the test 1211 is negative, a test 1213 determines whether or not the list of the virtual channels of "low" priority level possesses "prio_state" 1120 information at the "active" value.

When the result of the test 1213 is positive, in the course of a step 1214, the unit 109 asks for the packet to be sent to the control module 107 (as described during step 1210) in non-connected mode, and updates the specifications of the virtual channel making it possible to send the packet in question, in the following way:

the information "dyn_CP" 1117 is decremented,
if the information "dyn_CP" 1117 is equal to zero, the value of the information "VC_state" 1119 takes the value "asleep", and the next virtual channel with the same level of priority is considered and, if there is no other virtual channel with the same level of priority, the level of priority has its "prio_state" information 1120 take the value "asleep".

When the result of the test 1213 is negative, in the course of step 1215, the central unit 109 analyses the actual load on the network. To that end, the unit 109 computes the periods of inactivity of the control module 107, in order to adjust the number of packets to be sent per virtual channel, for the low-priority traffic (that is to say in non-connected mode).

Depending on the number of secondary time intervals not used for the actual transmission of packets, the bandwidth is increased, by incrementing the value "spec_CP" 1112 within the limit of the authorised boundaries.

Then, transmissions cease until the result of the test 1202 becomes positive.

The allocation or the releasing of a virtual channel is carried out by manipulating:

the lists 1101 and 1102, when performing the various steps for management of a connection illustrated in FIG. 11.
list 1103, when the entire transfer in message mode has been achieved.

Hence, the network module 122 takes account of the actual load on the network in order to distribute the access rights among the various priority levels.

FIG. 23 represents an algorithm for data-packet transmission towards the switched network of the type in accordance with the IEEE 1355 standard.

This algorithm is implemented by the control module 107 under the control of the scheduling unit (SAR module) 109.

For an understanding of this description, it will be useful to refer, on the one hand, to the description given by reference to FIG. 21 representing various registers configured within the scheduling unit 109 and, on the other hand, the description given by reference to FIG. 22, illustrating an algorithm implemented by the scheduling unit 109 which manages the data-packet transmission.

It will be noted that, in order to optimise the overall performance of the system, several examples of such algorithms can be provided at a given instant so as simultaneously to carry out transmission and reception of data packets.

Returning to FIG. 23, when the control module 107 is queried by the scheduling unit 109, in accordance with step 220 of this algorithm, the said control module has to obtain control information on the packet in question, particularly including the header of this packet, by way of the control signals ctrl 6 represented in FIG. 3a.

The control information allocated to the transfer of the data packet in question is initialised in the following step 221.

The following step denoted 222 consists in waiting until the data bus 113 between the switching unit 108 and the memory-storage unit 106 is available and, when it is available, then the following step 223 is performed.

In the course of the latter, access to the data bus 113 is allocated to the transmission of the packet in question and, in the course of a following step denoted 224, the header of the packet is written into the switching unit 108 which will be briefly described by reference to FIG. 26.

In the course of the following step denoted 225, it is checked that the transmission is terminated.

If the transmission is actually terminated, then the packet in its entirety has been transmitted and, as indicated in the following step denoted 226, the data bus 113 is then released.

Step 226 is followed by a step 227 in the course of which the SAR scheduling unit 109 is informed of the transmission of the data packets by way of control signals ctrl 5, thereby allowing the next packet to be transmitted by this scheduling unit 109.

This terminates the data-packet transmission procedure.

In order to optimise the performance of the data-packet transmission mechanism, the scheduling unit 109 is capable simultaneously of handling multiple data-packet transmissions depending on the availability of the resources of the switching unit 108.

Returning to step 225, when the test performed proves to be negative, it is followed by a step denoted 228 in the course of which the level of filling of the "FIFO"-type storage units of the switching unit 108 is checked.

In the event that these storage units are not filled, then step 228 is followed by a step 229 in the course of which groups of data each consisting of 32 bits and originating from the memory-storage unit 106 are written into the "FIFO"-type storage units of the switching unit 108, whether these data are of isochronous or stream type, form part of a message or are control data.

The test applied at step 225 is then again performed.

When a part of the data packet has been transmitted, and when the "FIFO"-type storage unit of the switching unit 108 has been filled (step 228), then the following step denoted 230 is performed, thus releasing access to the data bus 113.

In the course of the following step denoted 231, provision is made to wait until the corresponding FIFO storage unit of the switching unit 108 is empty.

The following step, denoted 232, updates the transmission status for the data packet in question to be transmitted with respect to what was previously transmitted.

The following step denoted 233 consists in waiting until the data bus 113 is available and, when it is available, the following step denoted 234 is then executed.

In the course of this step, access to the data bus 113 is allocated to the transmission of the data packet in question and step 225, as well as the following steps already described above, are again executed.

FIG. 24 represents an algorithm for reception of a data packet originating from the switched network of the type in accordance with the 1355 standard.

This algorithm is implemented by the control module 107 under the control of the scheduling unit or SAR module 109.

The control module 107 implements this algorithm when it is informed by the switching unit 108, by way of the control signal ctrl 4, of the reception of a new packet originating from the switched network of the type in accordance with the IEEE 1355 standard (step 1220).

In order to optimise the overall performance of the system, several algorithms similar to this one can be run at the same time so as simultaneously to transmit and receive data packets.

The following step 1221 consists in waiting for the availability of the data bus 113 between the switching unit 108 and the memory-storage unit 106.

When this data bus is available, the following step denoted 1222 is performed and access to the bus is allocated to the reception of the data packet in question.

In the course of step 1223, the header of the packet received is first of all read from the FIFO-type storage unit of the switching unit 108, and then is transmitted to the scheduling unit 109 by means of the control signal ctrl 6, this being done so as to know the number of the memory area of the memory-storage unit 106 with a view to the storage of the said data packet.

Simultaneously, step 1260 of the algorithm represented in FIG. 25, and which will be described later, is then performed.

In the course of the following step 1224 of the algorithm of FIG. 24, the control module 107 waits to receive, from the scheduling unit 109, by way of the control signal ctrl 6, the identification of the memory area of the memory-storage unit 106, as indicated in step 1262 of the algorithm of FIG. 25.

The identification of the memory area of the memory-storage unit 106 remains valid for the reception of the data packet 1355.

Returning to FIG. 24, step 1225 consisting in verifying the end of the reception of the data packet is performed.

When the result of the test applied during this step is positive, that means that the entire packet has been received and it is then stored in the memory-storage unit 106.

In the event that the result of this test is negative, then the following step 1226 is performed so as to know the level of fill of the FIFO-type storage unit of the switching unit 108.

If the test applied in the course of the step leads to a negative result, then that means that the FIFO-type storage unit is not empty and the following step 1227 is performed.

In the course of this step, groups of data each consisting of 32 bits are read from the FIFO-type storage unit of the switching unit 108 and are written into the memory area of the memory-storage unit 106, whether these are isochronous data (connected mode), a message or control data.

Next, the test applied at the following step 1228 is performed so as to establish the correct step of the packet-receiving mechanism as far as the overflowing of the memory-storage unit is concerned.

If the results obtained in the course of this test proves to be positive, that means that the corresponding memory area of the memory-storage unit 106 was filled after the last write step provided for in step 1227. In the course of the following step 1229, an error procedure is then performed.

If the result of the test applied at step 1228 is negative, then the following step 1230 is performed.

In the course of step 1230, the fill threshold of the buffer memory is tested solely in the case of the memory areas intended for receiving data of stream type (connected mode). A PCI interrupt is generated and addressed to the communications-interface module 120 when the corresponding buffer memory is half-full for the very first time.

Next, step 1225, already described above, is again performed.

Returning to step 1226, when the result of the test which is applied there proves to be positive, that means that a part of the data packet has been received and that the FIFO-type storage unit of the switching unit 108 is full.

The following step denoted 1231 consists in making available access to the data bus 113.

The following step 1232 then consists in awaiting new data in the corresponding FIFO-type storage unit or units of the switching unit 108.

The following step 1233 updates the state of reception of the data packet in question to be stored in the memory-storage unit 106 on the basis of what has previously been received.

The following step 1234 consists in waiting until the data bus 113 is available.

In the event that the bus is available, the following step 1235 is performed, and access to the data bus 113 is then allocated to receiving the data packet in question. The test performed at step 1225, already described above, is then again performed.

When an entire packet has been received, the test performed at step 1225 proves to be positive, and the following step 1236 is performed, thus freeing access to the data bus 113. In the course of the following step 1237, the scheduling unit 109 (SAR module) is informed of the reception of the packet via the control signal ctrl 6 solely in the case of the memory area is intended to contain control data of messages.

The procedure for receiving packets in accordance with step 1238 is then brought to an end.

FIG. 25, already set out above, represents an algorithm for receiving data constituting a message and control data originating from the switching network of the type in accordance with the IEEE 1355 standard.

This algorithm is implemented by the scheduling unit 109 or SAR module.

In accordance with step 1260, the scheduling unit waits for a new packet header to be read by the control module 107 from the switching unit 108.

In the course of the following step, denoted 1261, the scheduling unit 109 waits for a memory area of the memory-storage unit 106 to be available so as to store in it the data packet in question.

The following step, denoted 1262, consists in informing the control module 107 of the correct outcome of the allocation of memory area in the memory-storage unit 106 by sending the identification of the corresponding memory area by way of the control signal ctrl 6.

In the course of the following step 1263, it is determined whether it is a new packet header which is involved.

In the event that it is a new packet header which is involved, whether it is the first packet of a message or a control packet, then the following step denoted 1264 is performed, otherwise the step 1265 is performed without the step 1264 being performed beforehand.

In the course of step 1264, the scheduling unit 109 waits for a memory area to be freed so as to store the message or the control packet in the RAM storage means, and allocates such a memory area for the purpose of this storage.

In the course of the following step 1265, the transfer of data from the memory-storage unit 106 to the RAM storage means 95, and more particularly to the previously allocated memory area, is initialised.

The following step 1266 consists in awaiting the end of the transfer before releasing the memory area of the memory-storage unit 106 previously allocated at step 1261.

In the course of the following step 1267, it is determined whether a control packet or the last packet of a message has been received and, if so, the following step 1260 is performed, thereby triggering a PCI-type interrupt.

This interrupt is intended to inform the communications-interface module 120 of FIG. 4 of the reception of a new message or of a control packet in the RAM storage means 95 of FIG. 3a.

Step 1268 is then followed by step 1260 which has already been described above.

In the event that the result of the test performed at step 1267 is negative, then the latter is followed by step 1260, described above.

FIG. 26 is a diagrammatic view of a switching unit 108 known to the person skilled in the art.

This unit includes, for example, three external ports 1270, 1271 and 1272, each including an internal storage unit and each being linked to a bus 1274 which is capable of exchanging data and control signals with the interfacing means 104 (FIG. 3a).

The unit 108 also includes three internal ports 1276, 1277 and 1278 each including an internal storage unit and each being linked to bus 1280 which is capable of exchanging data and control signals with the memory-storage unit 106 and the control module 107 (FIG. 3a).

Moreover, the switching unit 108 includes a routing element 1282, which links together the various internal and external ports in the two directions of transfer.

The invention claimed is:

1. A method of data packet transmission from a first network to a second network via a communication device interconnecting the first and second networks, one of the first and second networks being a communication bus transporting data packets in isochronous and asynchronous modes, the other one of the first and second networks being a packet-switching network transporting data packets in connected and non-connected modes, the method comprising the steps of:
   receiving data packets from the first network in a reception memory of the communication device;
   reserving a storage area internal to the communication device, wherein the reserved internal storage area is adapted to the mode in which data packets are received from the first network;
   storing the received data packets in the reserved internal storage area of the communication device; and
   transmitting data packets to the second network through the reserved internal storage area, in a mode associated with the receiving mode;
   wherein in a case in which the isochronous mode is associated with the connected mode, the reserving step is performed before the communication device receives data packets from the first network, and in a case in which the asynchronous mode is associated with the non-connected mode, the reserving step is performed after the communication device receives data packets from the first network.

2. A method according to claim 1, further comprising, in the case of the isochronous mode, a previous step of reserving resources on the second network.

3. A method according to claim 2, wherein the resources previously reserved on the second network include at least channel numbers so that the reserved internal storage area is associated with a channel number.

4. A method according to claim 2, wherein, in a case of the isochronous mode, the reserving step of reserving a storage area internal to the communication device is performed on the basis of the resources previously reserved on the second network.

5. A method according to claim 2, wherein, in a case of the isochronous mode, the method further includes a step of associating a reserved internal storage area with the resources previously reserved on the second network.

6. A method according to claim 1, wherein a processing unit internal to the communication device is associated with a reserved internal storage area adapted to the asynchronous mode.

7. A method according to claim 6, further comprising a storing step of intermediate storing, of asynchronous data packets in an intermediate storage so that the communication device may receive further data packets even when the processing unit cannot process data immediately.

8. A method according to claim 7, wherein the intermediate storing step of storing asynchronous data packets is performed before storing said data packets in the reserved internal storage area.

9. A method according to claim 7, further comprising a step of transferring asynchronous data packets from the intermediate storage to the reserved internal storage area.

10. An information-storage means, completely or partially removable, which can be read by a computer or a processor containing instructions for a computer program, wherein it allows implementation of the method according to claim 1.

11. An information-storage means, which can be read by a computer or a processor, containing data originating from the implementation of the method according to claim 1.

12. A computer program loadable into a programmable device, including sequences of instructions for implementing the steps of the method according to claim 1, when said program is run on the programmable device.

13. A communication device interconnecting first and second networks, for transferring data packets from the first network to the second network, one of the first and second networks being a communication bus transporting data packets in isochronous and asynchronous modes, the other one of the first and second networks being a packet-switching network transporting data packets in connected and non-connected modes, said communication device comprising:
 a reception memory in the communication device for receiving data packets from the first network;
 reserving means for reserving a storage area internal to the communication device, wherein the reserved internal storage area is adapted to the mode in which data packets are received from the first network;
 storing means for storing the received data packets in the internal storage area of the communication device; and
 transmitting means for transmitting data packets to the second network through the reserved internal storage area, in a mode associated with the receiving mode; and
 wherein, in a case in which the isochronous mode is associated with the connected mode, the reserving means reserves the storage area before the reception of data packets from the first network, and in a case in which the asynchronous mode is associated with the non-connected mode, the reserving means reserves the storage area after the reception of data packets from the first network.

14. A communication device according to claim 13, further comprising reserving means for reserving resources on the second network in case of transmission of data packets in the isochronous mode.

15. A communication device according to claim 14, wherein the resources reserved on the second network include at least channel numbers so that the reserved internal storage area is associated with a channel number.

16. A communication device according to claim 14, wherein, in the case of the isochronous mode, the reserving means for reserving the storage area internal to the communication device are adapted to take into account the resources reserved on the second network.

17. A communication device according to claim 14, further comprising means for associating a reserved internal storage area with the resources reserved on the second network, in the case of the isochronous mode.

18. A communication device according to claims 13, wherein a processing unit internal to the communication device is associated with a reserved internal storage area adapted to the asynchronous mode.

19. A communication device according to claim 18, further comprising means for intermediate storing asynchronous data packets in an intermediate storage so that the communication device may receive data even when the processing unit is not able to process data immediately.

20. A communication device according to claim 19, further comprising means for transferring asynchronous data packets from the intermediate storage to the adapted reserved storage area.

* * * * *